(12) United States Patent
Chan et al.

(10) Patent No.: US 11,225,989 B2
(45) Date of Patent: Jan. 18, 2022

(54) INDEXING PINS AND INDEXING CLAMPS FOR ALIGNING A FIRST BODY AND A SECOND BODY OF A STRUCTURE

(71) Applicant: The Boeing Company, Chicago, IL (US)

(72) Inventors: Kwok Tung Chan, Seattle, WA (US); Tanni Sisco, Mukilteo, WA (US); Monica J. Brockway, Bothell, WA (US)

(73) Assignee: The Boeing Company, Chicago, IL (US)

( * ) Notice: Subject to any disclaimer, the term of this patent is extended or adjusted under 35 U.S.C. 154(b) by 472 days.

(21) Appl. No.: 16/136,406

(22) Filed: Sep. 20, 2018

(65) Prior Publication Data
US 2020/0096024 A1    Mar. 26, 2020

(51) Int. Cl.
*F16B 5/02*        (2006.01)

(52) U.S. Cl.
CPC .................... *F16B 5/025* (2013.01)

(58) Field of Classification Search
CPC .... F16B 5/025; F16B 33/004; F16B 23/0092; F16B 35/041; F16B 11/006; F16J 15/02; B25B 31/005; B64F 5/10
USPC ............... 403/373, 374, 378; 29/464, 466
See application file for complete search history.

(56) References Cited

U.S. PATENT DOCUMENTS

| | | | | |
|---|---|---|---|---|
| 1,406,804 A | * | 2/1922 | Alexander | B25B 31/005 411/368 |
| 3,189,075 A | * | 6/1965 | Garland | F16B 37/0807 411/272 |
| 3,739,451 A | * | 6/1973 | Jacobson | B25B 27/16 29/237 |
| 5,816,761 A | * | 10/1998 | Cassatt | F16B 19/1063 411/34 |
| 6,123,301 A | * | 9/2000 | Schroeder | G01R 33/02 248/200 |
| 6,609,765 B2 | * | 8/2003 | Radke | B60B 11/02 301/111.03 |
| 2010/0301536 A1 | * | 12/2010 | Wilson | B25B 31/005 269/53 |

(Continued)

FOREIGN PATENT DOCUMENTS

| | | |
|---|---|---|
| EP | 3 225 555 | 10/2017 |
| EP | 3 364 050 | 8/2018 |

(Continued)

OTHER PUBLICATIONS

European Patent Office, Extended European Search Report, App. No. 19196233.1 (dated Jan. 21, 2020).

*Primary Examiner* — John W Miller
*Assistant Examiner* — Sean N. Haiem
(74) *Attorney, Agent, or Firm* — Walters & Wasylyna LLC

(57) ABSTRACT

An indexing pin comprises a central axis. The indexing pin further comprises a threaded portion, extending along the central axis. The indexing pin also comprises a stem, extending along the central axis opposite the threaded portion. The indexing pin further comprises a cylindrical surface, extending along the central axis between the threaded portion and the stem. The indexing pin further comprises a tapered surface, extending between the threaded portion and the cylindrical surface. The indexing pin further comprises a flange, located between the stem and the cylindrical surface.

20 Claims, 49 Drawing Sheets

(56) References Cited

U.S. PATENT DOCUMENTS

| | | | |
|---|---|---|---|
| 2015/0277432 A1* | 10/2015 | Ikeda | B21J 15/147 |
| | | | 700/97 |
| 2016/0325853 A1* | 11/2016 | Stone | B64F 5/10 |
| 2017/0327248 A1* | 11/2017 | Stone | B64F 5/10 |

FOREIGN PATENT DOCUMENTS

| | | |
|---|---|---|
| GB | 2 123 510 | 2/1984 |
| JP | 2019 060440 | 4/2019 |

\* cited by examiner

INDEXING PINS AND INDEXING CLAMPS FOR ALIGNING A FIRST BODY AND A SECOND BODY OF A STRUCTURE

TECHNICAL FIELD

The present disclosure relates to indexing pins, indexing clamps, and methods of aligning a first body and a second body of a structure, utilizing the indexing pins and the indexing clamps.

BACKGROUND

Various manufactured structures include at least two structural bodies, coupled together using mechanical fasteners. Assembly of such structures often includes arranging the structural bodies in a stack, machining openings through the stack, and installing fasteners through the machined openings to couple the structural bodies together in a stacked configuration. However, certain types of structures, such as composite structures, used in the aerospace industry, may be susceptible to undesirable electromagnetic environmental effects (EME), such as electrostatic discharges and lighting strikes. To address EME, once the openings are machined through the stack, the structural bodies are separated to undergo one or more finishing operations, such as deburring. Thereafter, the structural bodies are re-assembled in the stacked configuration. However, perfectly realigning the openings, previously machined in the structural bodies for installation of the fasteners, is often difficult. Misalignment of the openings may cause structural damage to one or more of the structural bodies during fastener installation. To prevent damage to the structural bodies, fastener sleeves may be utilized in the machined openings. However, the use of fastener sleeves increases the weight of the structure, parts count, and manufacturing cost.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter, according to the invention, relates to an indexing pin, comprising a central axis and a threaded portion, extending along the central axis. The indexing pin also comprises a stem, extending along the central axis opposite the threaded portion. The indexing pin further comprises a cylindrical surface, extending along the central axis between the threaded portion and the stem. The indexing pin additionally comprises a tapered surface, extending between the threaded portion and the cylindrical surface. The indexing pin further comprises a flange, located between the stem and the cylindrical surface.

The indexing pin aligns a first body of a structure and a second body of the structure by urging alignment of first openings of the first body with second openings of the second body when the indexing pin is inserted through one of the first openings and a corresponding one of the second openings.

Another example of the subject matter, according to the invention, relates to an indexing clamp, comprising an indexing pin. The indexing pin comprises a central axis and a threaded portion, extending along the central axis. The indexing pin also comprises a stem, extending along the central axis. The indexing pin further comprises a cylindrical surface, extending along the central axis between the threaded portion and the stem. The indexing pin additionally comprises a tapered surface, extending between the threaded portion and the cylindrical surface. The indexing pin further comprises a flange, located between the stem and the cylindrical surface. The indexing clamp further comprises a nut, configured to be threadably coupled with the threaded portion of the indexing pin. The indexing clamp also comprises a protective clamping member, having an external protective-clamping-member diameter and configured to be coupled to the nut and configured be located between the nut and the flange.

The indexing pin aligns a first body of a structure and a second body of the structure by urging alignment of first openings of the first body with second openings of the second body when the indexing pin is inserted through one of the first openings and a corresponding one of the second openings. Following alignment of the structure, the nut clamps the first body and the second body together between the indexing pin and the protective clamping member. The protectively clamping member protects the second-body second surface when the nut is preloaded against the protective clamping member.

Another example of the subject matter, according to the invention, relates to a method of aligning a first body and a second body of a structure. The first body comprises a first-body first surface, a first-body second surface, opposite the first-body first surface, and first openings, extending, inclusively, between the first-body first surface and the first-body second surface. The second body comprises a second-body first surface, a second-body second surface, opposite the second-body first surface, and second openings extending, inclusively, between the second-body first surface and the second-body second surface. The method comprises preparing for use indexing pins. Each one of the indexing pins comprises a central axis. Each one of the indexing pins further comprises a threaded portion, extending along the central axis. Each one of the indexing pins also comprises a stem, extending along the central axis. Each one of the indexing pins further comprises a cylindrical surface, extending along the central axis between the threaded portion and the stem. Each one of the indexing pins additionally comprises a tapered surface, extending between the threaded portion and the cylindrical surface. Each one of the indexing pins further comprises a flange, located between the stem and the cylindrical surface. At least a portion of the flange is larger than a diameter of any one of the first openings. The method further comprises orienting the first body so that each one of the first openings extends vertically and the first-body first surface is upwardly facing. The method also comprises inserting each one of the indexing pins into a corresponding one of the first openings of the first body with a clearance fit so that a portion of the cylindrical surface of each one of the indexing pins is located in a corresponding one of the first openings and a portion of the cylindrical surface of each one of the indexing pins extends past the first-body second surface. The method further comprises orienting the second body so that each one of the second openings extends vertically and the second-body first surface faces the first-body second surface. The method also comprises aligning each one of the second openings of the second body with a corresponding one of the indexing pins, extending past the first-body second surface, so that, in plan view, the threaded portion of each one of the indexing pins is surrounded by and is spaced away from a second wall of a corresponding one of the second openings of the second body. The method additionally comprises moving the first body and the second body toward each other a first distance, until the threaded portion of each one of the indexing pins, extending past the first-body second surface, is inserted into a corresponding one of the second openings of the second body. The method also comprises moving the first body and the second body toward each other a second distance, until at least a portion of the tapered surface of each one of the indexing pins is inserted into a corresponding one of the second openings of the second body, while: allowing the first body and the second body to move relative to each other in a direction, perpendicular to the central axis of each one of the indexing pins; and applying a downward force to each one of the indexing pins that has a magnitude sufficient to cause at least the portion of the tapered surface of each one of the indexing pins to be inserted into the corresponding one of the second openings of the second body once the first body and the second body are moved toward each other the second distance. The method further comprises moving the first body and the second body toward each other a third distance, until a portion of the cylindrical surface of each one of the indexing pins is inserted into a corresponding one of the second openings of the second body, while: allowing the first body and the second body to move relative to each other in the direction, perpendicular to the central axis of each one of the indexing pins; and applying a downward force to each one of the indexing pins that has a magnitude sufficient to cause the portion of the cylindrical surface of each one of the indexing pins to be inserted into the corresponding one of the second openings of the second body once the first body and the second body are moved toward each other the third distance. The method also comprises moving the first body and the second body toward each other a fourth distance, until the first-body second surface contacts the second-body first surface and the threaded portion of each one of the indexing pins extends past the second-body second surface, while applying the downward force to each one of the indexing pins that has a magnitude sufficient to cause the threaded portion of each one of the indexing pins to extend past the second-body second surface once the first body and the second body are moved toward each other the fourth distance.

The method facilitates aligning the first body of the structure and the second body of the structure by urging alignment of the first openings of the first body with the second openings of the second body when the first body and the second body are moved into contact with each other and each one of the indexing pins is inserted through the one of the first openings and the corresponding one of the second openings.

Another example of the subject matter, according to the invention, relates to a method of aligning a first body and a second body of a structure. The first body comprises a first-body first surface, a first-body second surface, opposite the first-body first surface, and first openings, extending, inclusively, between the first-body first surface and the first-body second surface. The second body comprises a second-body first surface, a second-body second surface, opposite the second-body first surface, and second openings extending, inclusively, between the second-body first surface and the second-body second surface. The method comprises preparing for use indexing pins. Each one of the indexing pins comprises a central axis. Each one of the indexing pins further comprises a threaded portion, extending along the central axis. Each one of the indexing pins also comprises a stem, extending along the central axis. Each one of the indexing pins additionally comprises a cylindrical surface, extending along the central axis between the threaded portion and the stem. Each one of the indexing pins also comprises a tapered surface, extending between the threaded portion and the cylindrical surface. Each one of the indexing pins further comprises a flange, located between the stem and the cylindrical surface. At least a portion of the flange is larger than a diameter of any one of the first openings. The method further comprises orienting the second body so that each one of the second openings extends vertically and the second-body first surface is upwardly facing. The method also comprises orienting the first body so that each one of the first openings extends vertically and the first-body second surface faces the second-body first surface. The method further comprises aligning each one of the first openings of the first body with a corresponding one of the second openings of the second body so that, in plan view, a circumferentially closed contour, formed by a first wall of each one of the first openings of the first body and a second wall of a corresponding one of the second openings of the second body is large enough to receive the threaded portion of any one of the indexing pins with a clearance fit. The method also comprises moving the first body and the second body toward each other until the first-body second surface contacts the second-body first surface. The method further comprises inserting each one of the indexing pins into a corresponding one of the first openings of the first body with a clearance fit until a portion of the cylindrical surface of each one of the indexing pins is located in a corresponding one of the first openings of the first body and at least a portion of the tapered surface of each one of the indexing pins is inserted into a corresponding one of the second openings of the second body. The method also comprises applying a downward force on each one of the indexing pins that has a magnitude sufficient to cause the portion of the cylindrical surface of each one of the indexing pins to be inserted into the corresponding one of the second openings of the second body and the threaded portion of each one of the indexing pins to extend past the second-body second surface, while allowing the first body and the second body to move relative to each other in a direction, perpendicular to the central axis of each one of the indexing pins.

The method facilitates aligning the first body of the structure and the second body of the structure by urging alignment of the first openings of the first body with the second openings of the second body when the first body and the second body are in contact with each other and each one of the indexing pins is inserted through the one of the first openings and the corresponding one of second openings.

BRIEF DESCRIPTION OF THE DRAWINGS

Figure 1A:
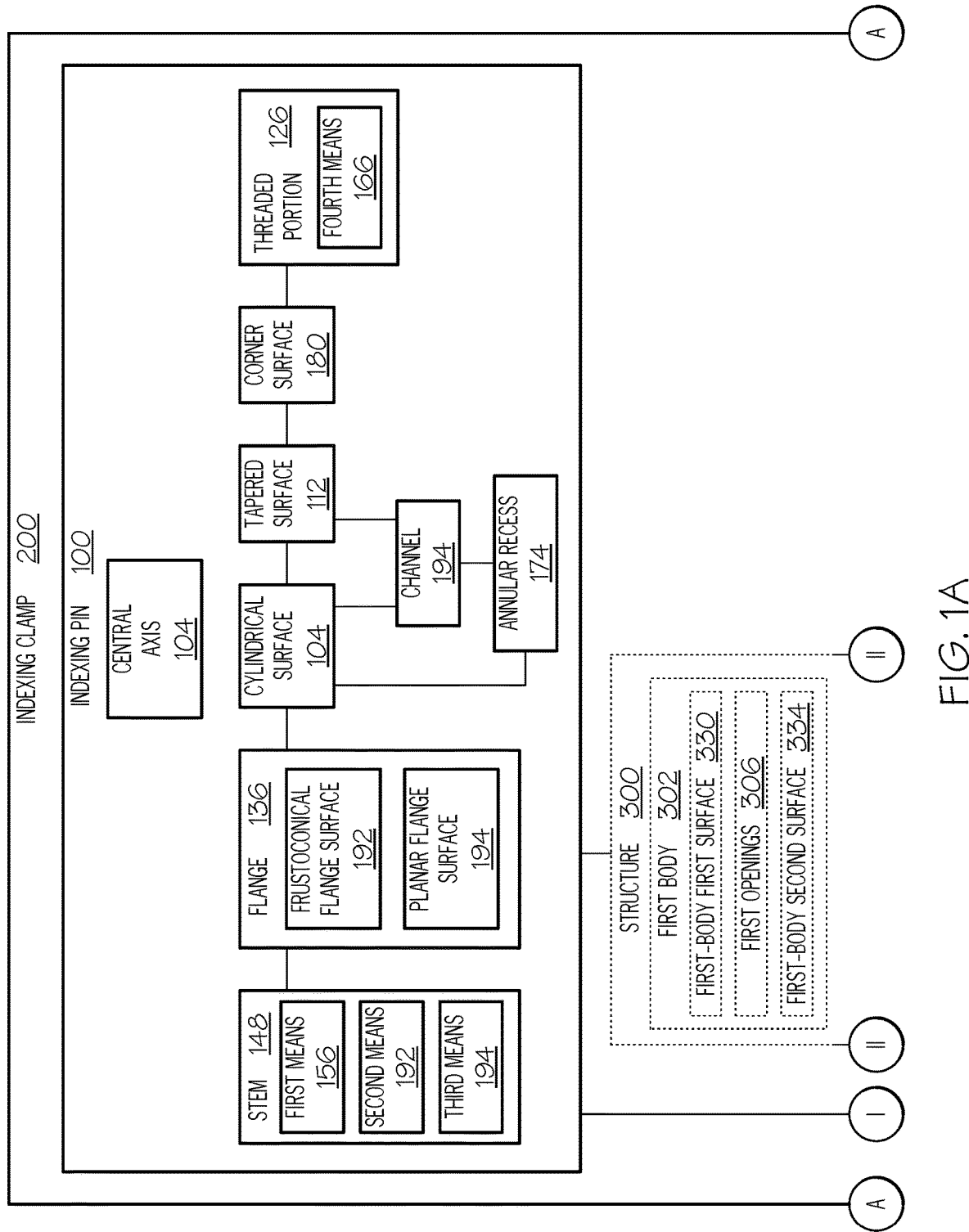
Figure 1B:
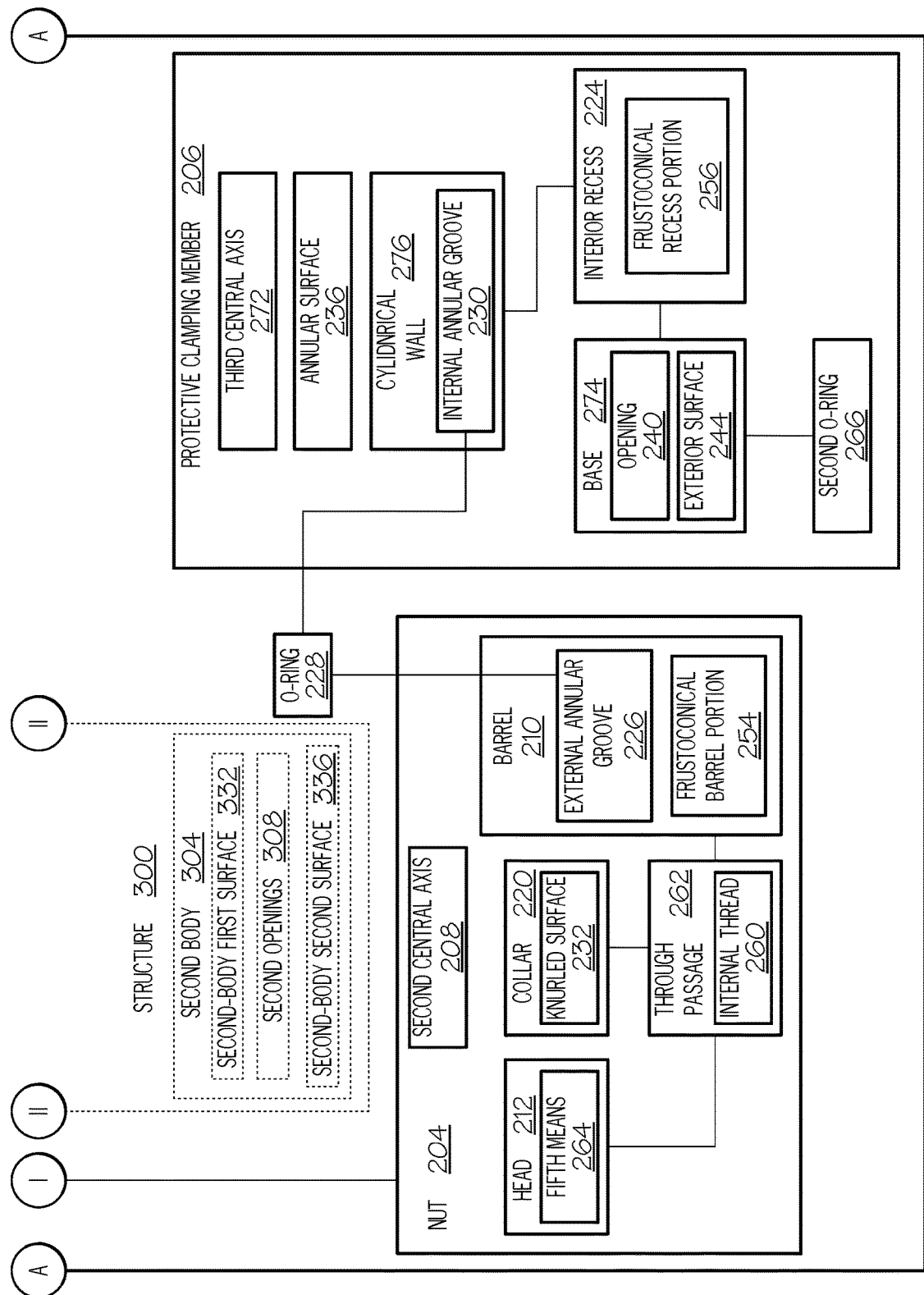
Figure 2:
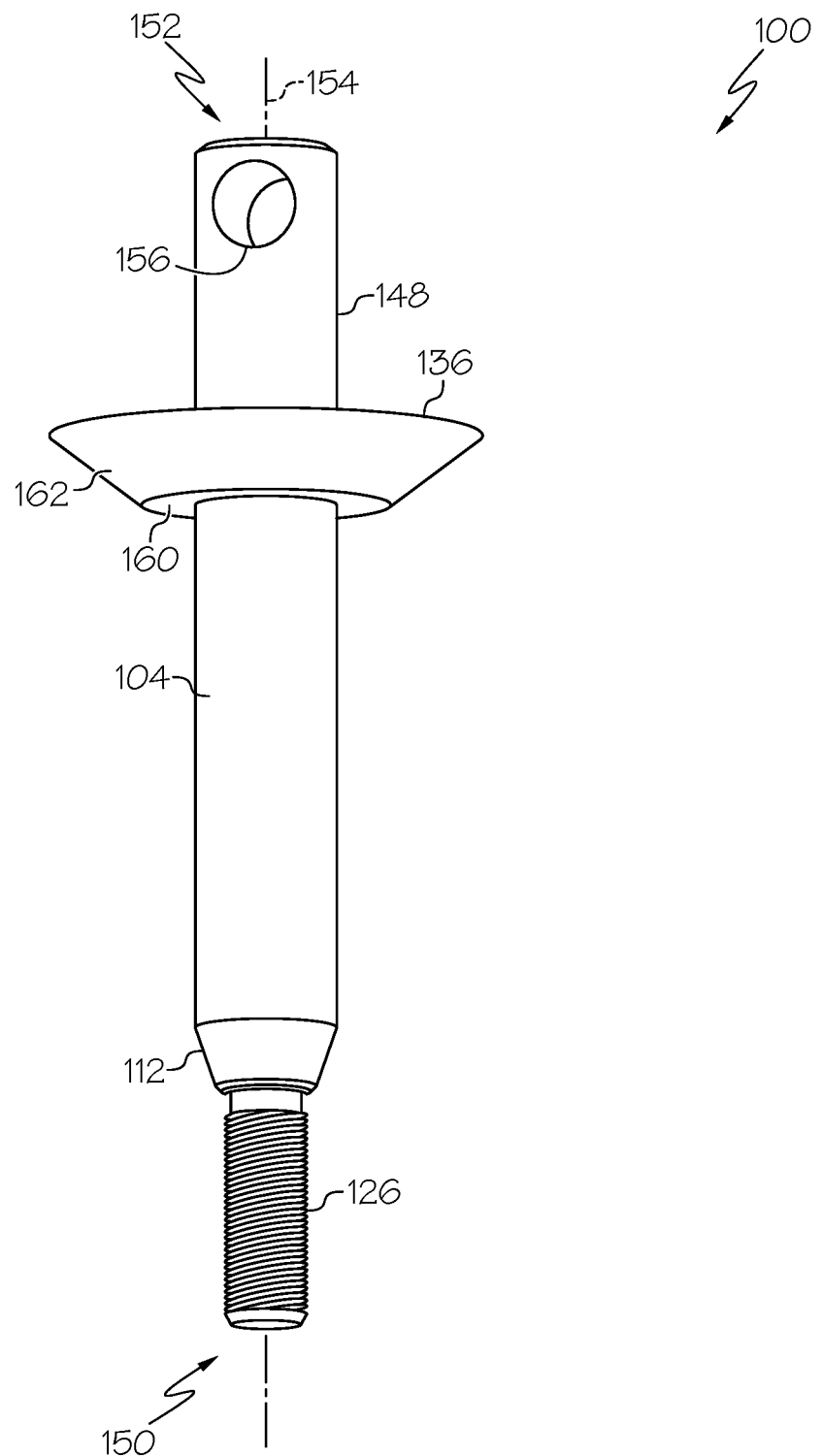
Figure 3:
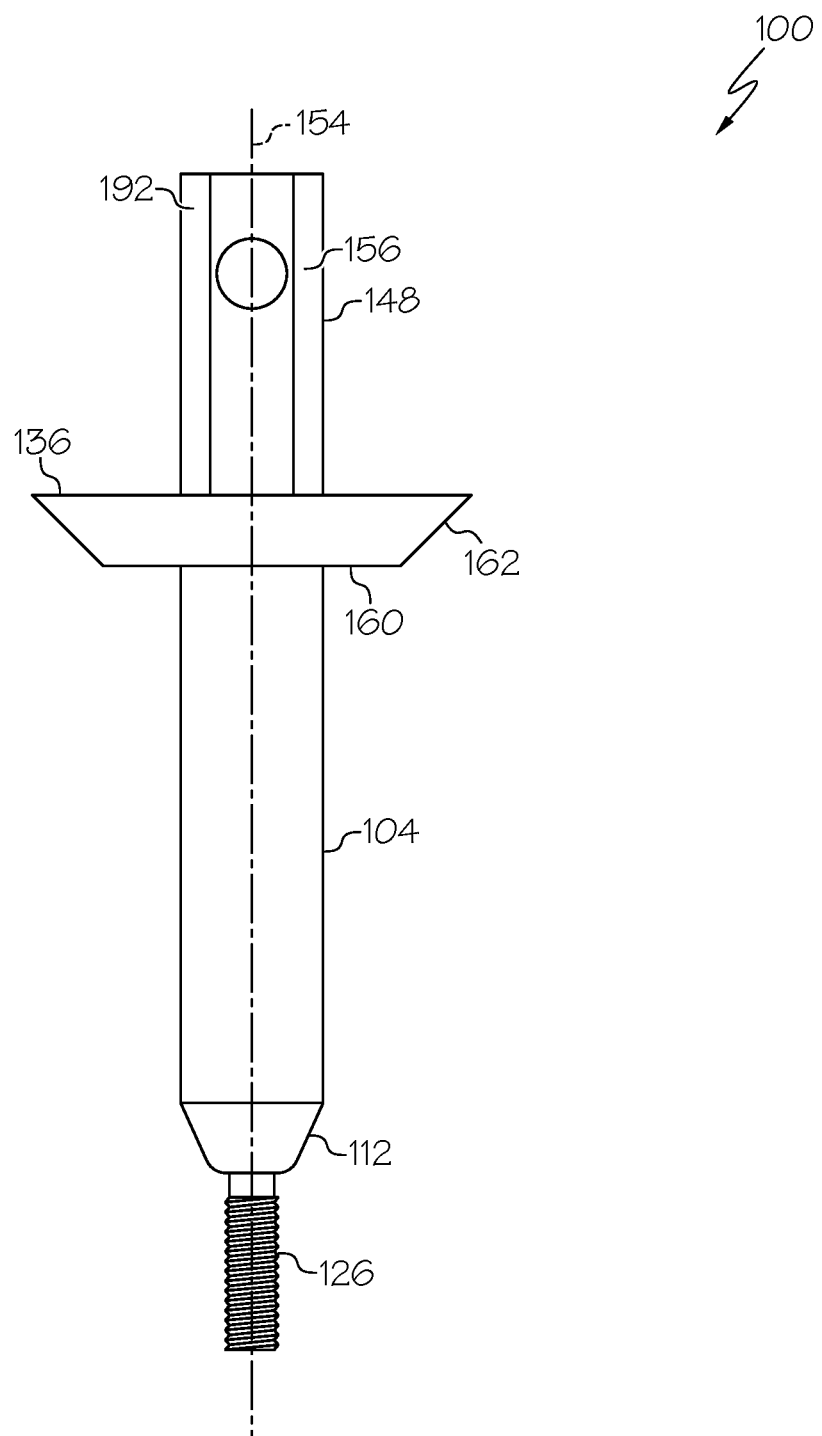
Figure 4:
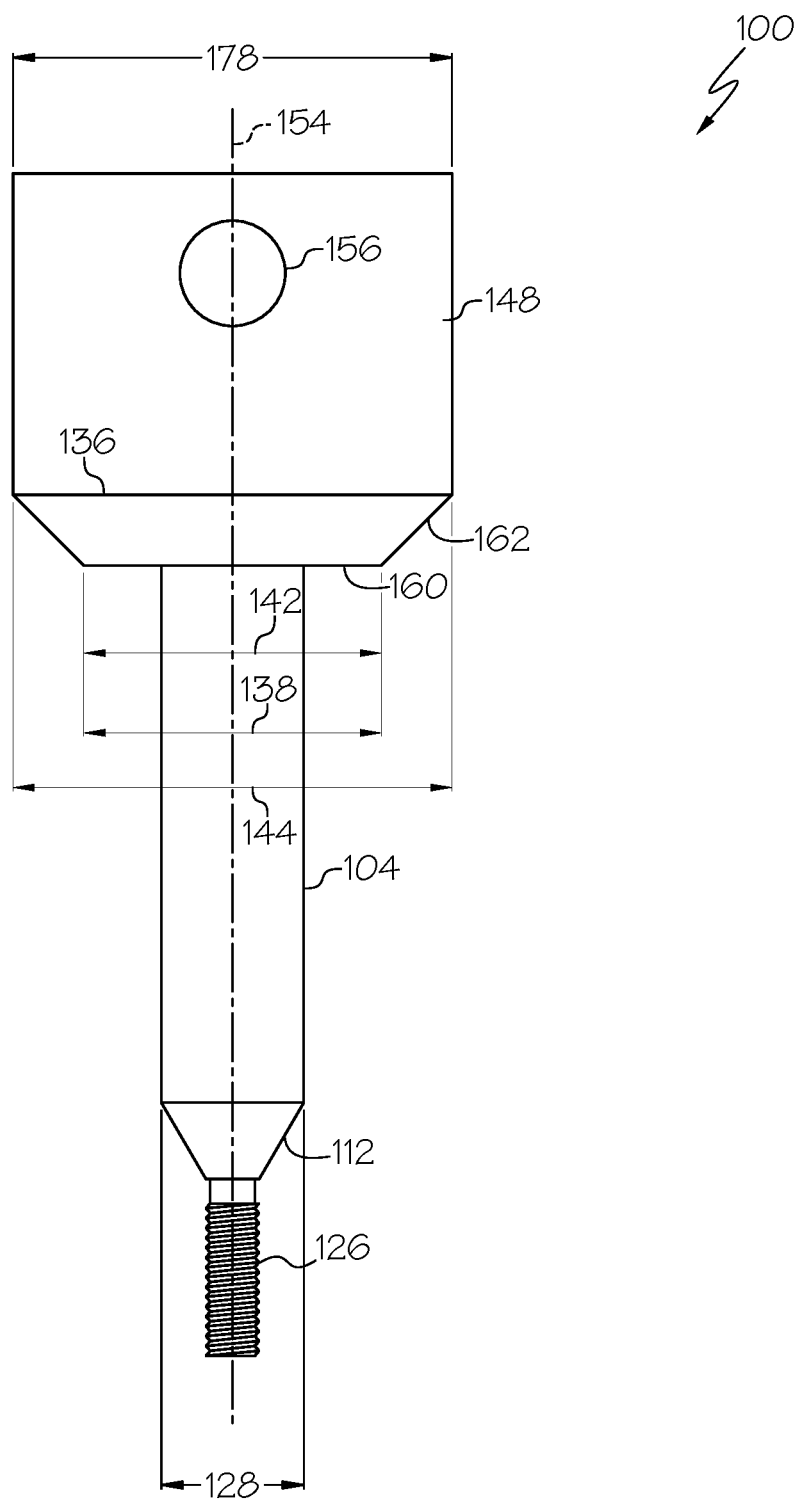
Figure 5A:
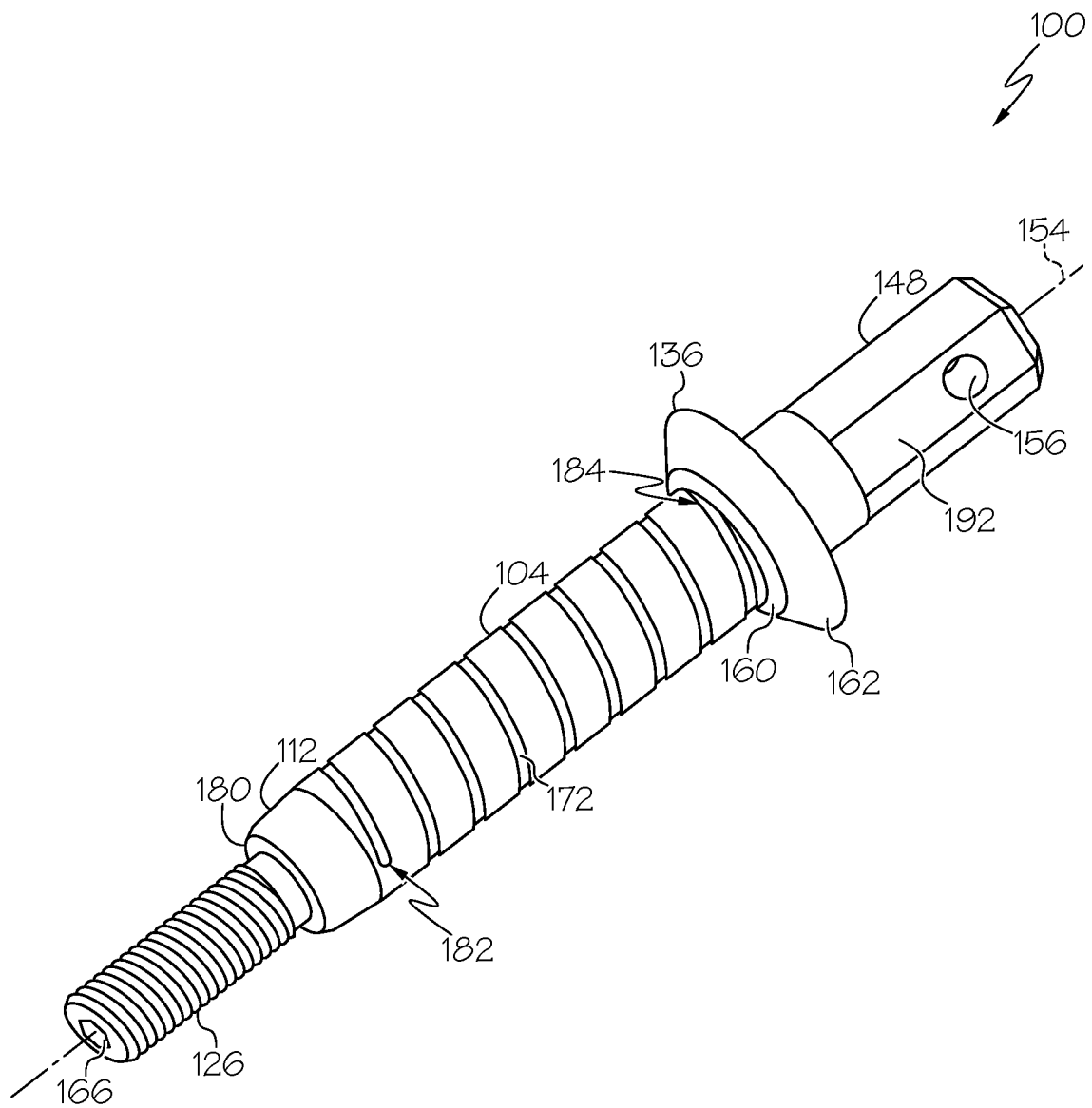
Figure 5B:
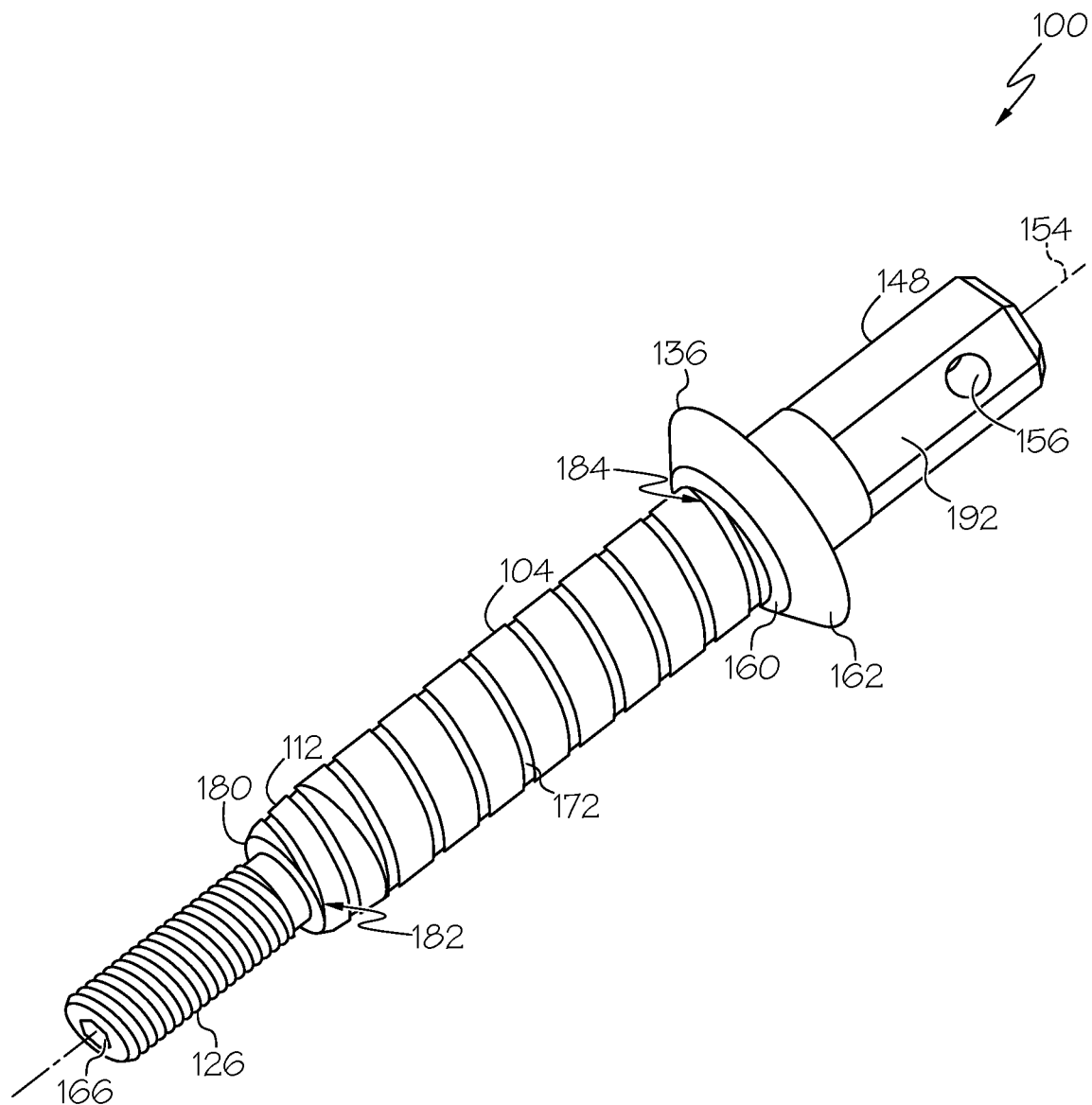
Figure 6A:
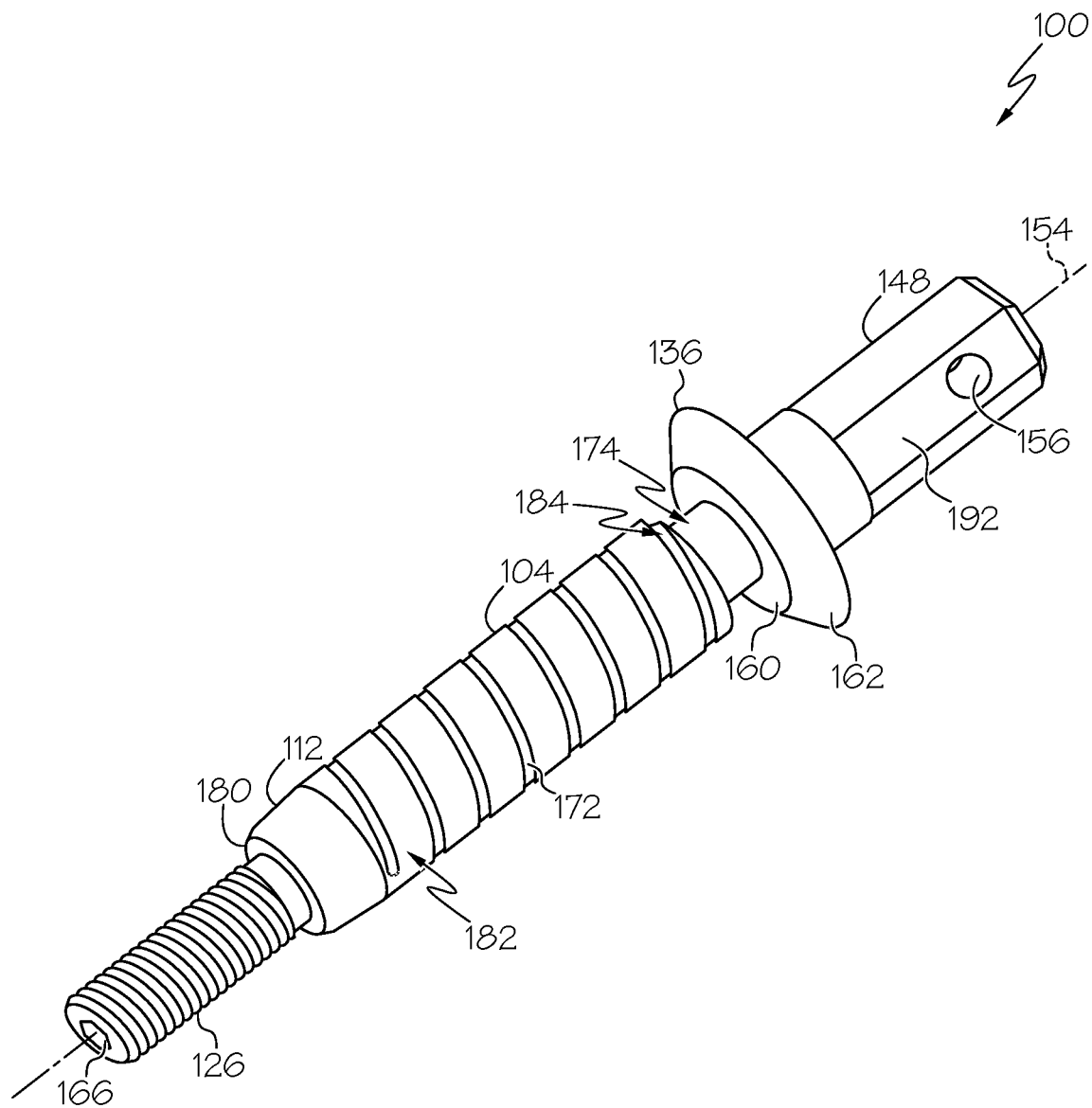
Figure 6B:
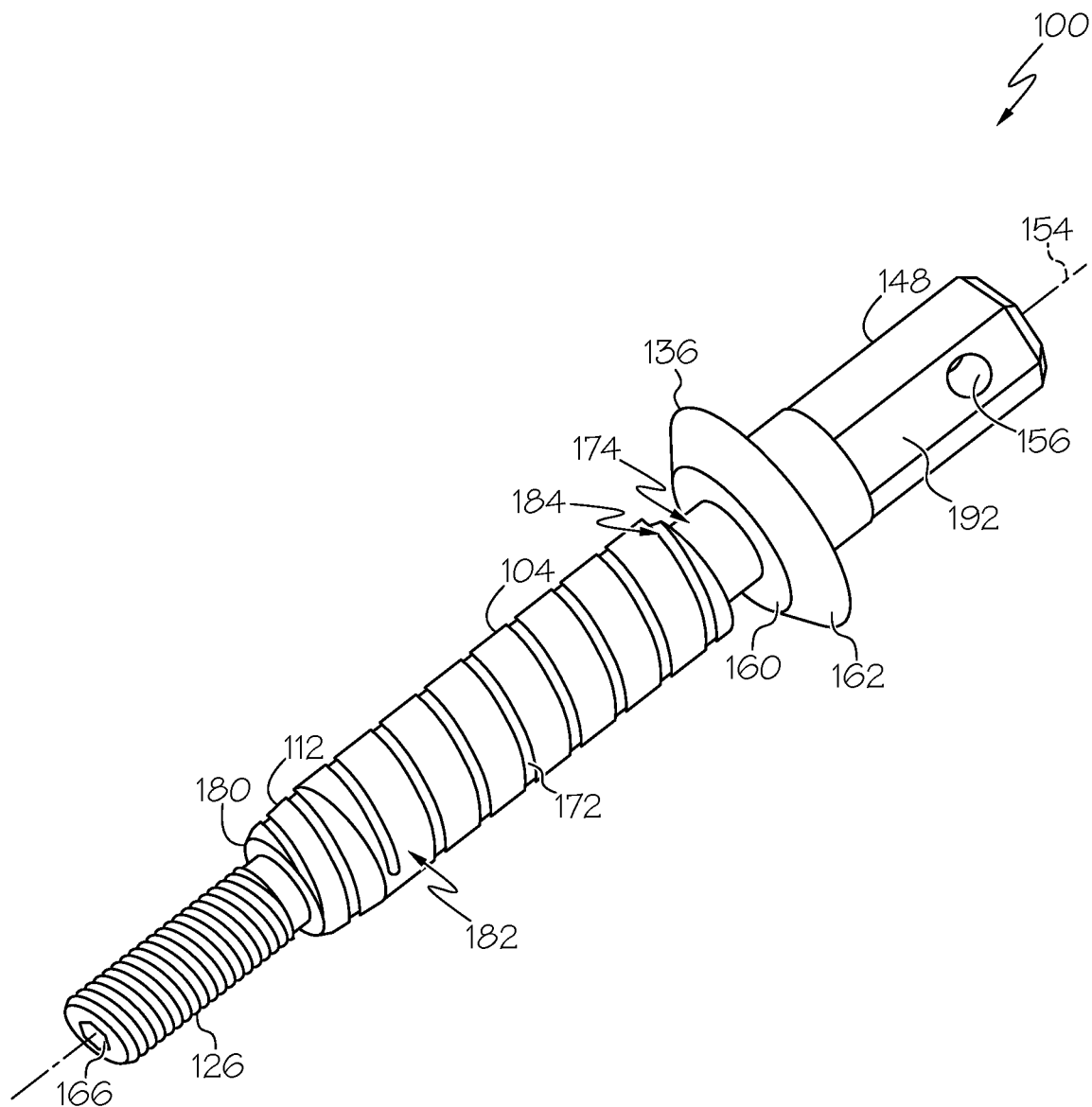
Figure 7:
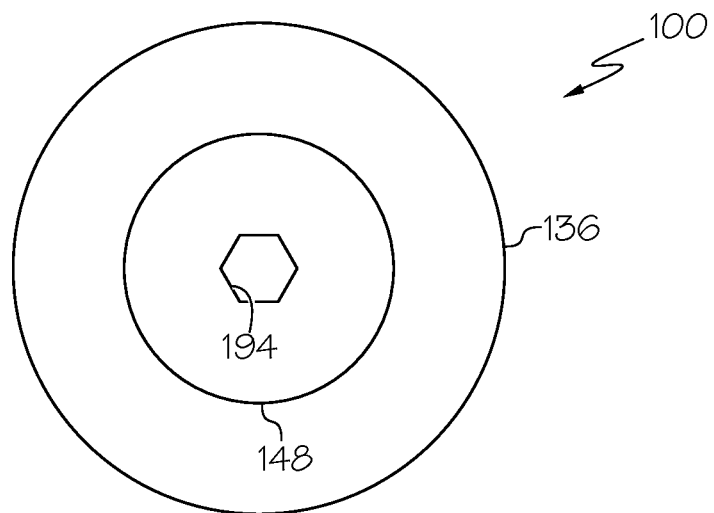
Figure 8:
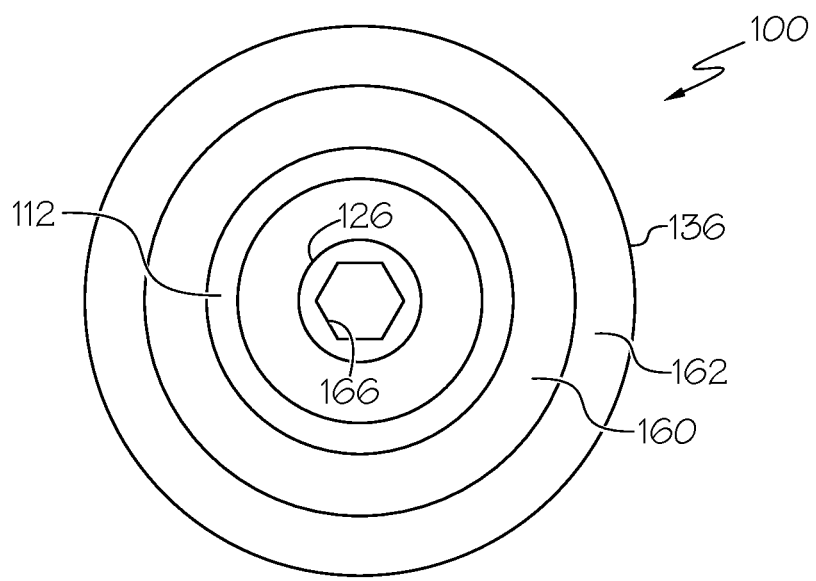
Figure 9:
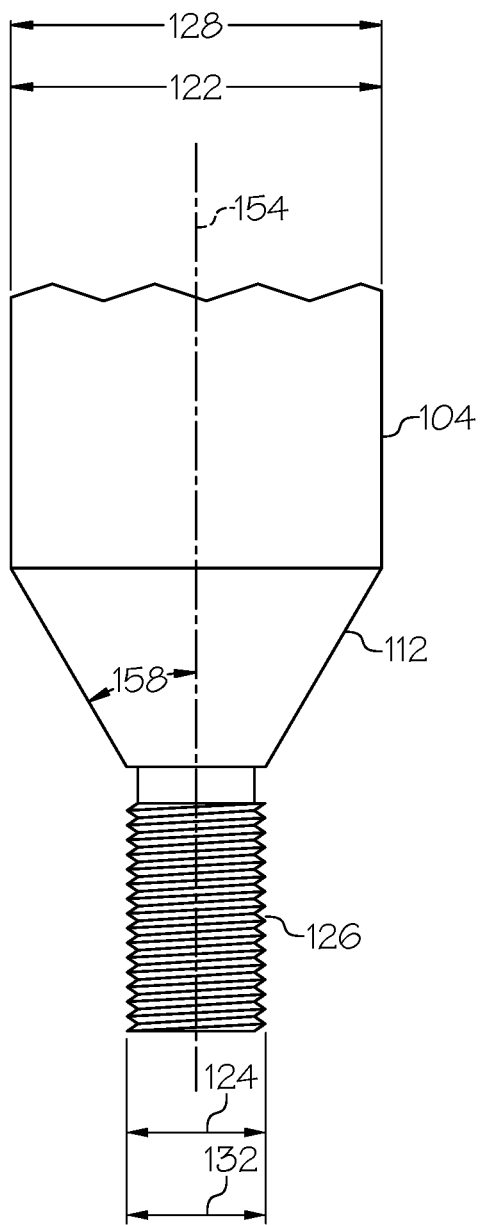
Figure 10:
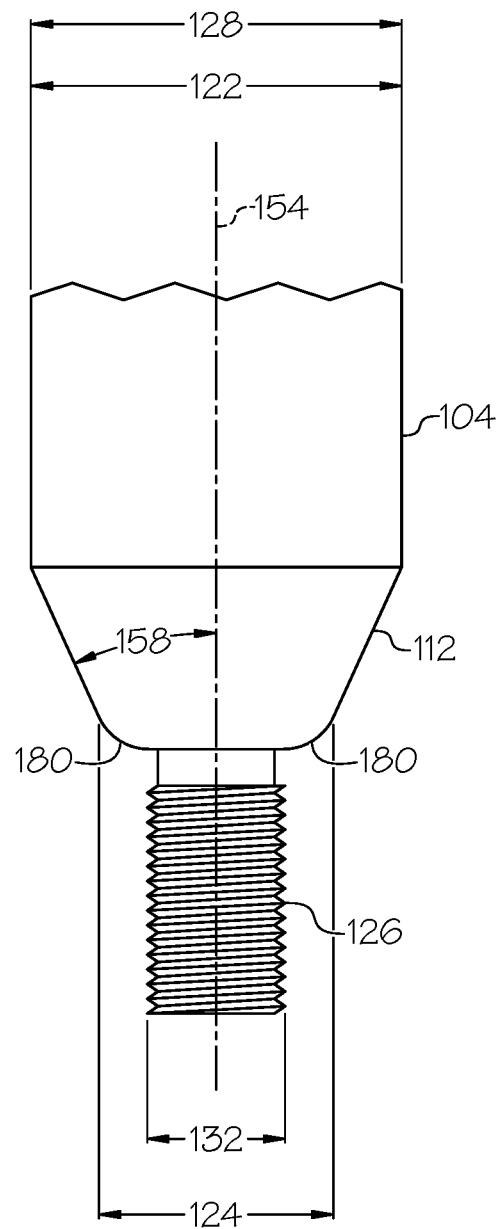
Figure 11:
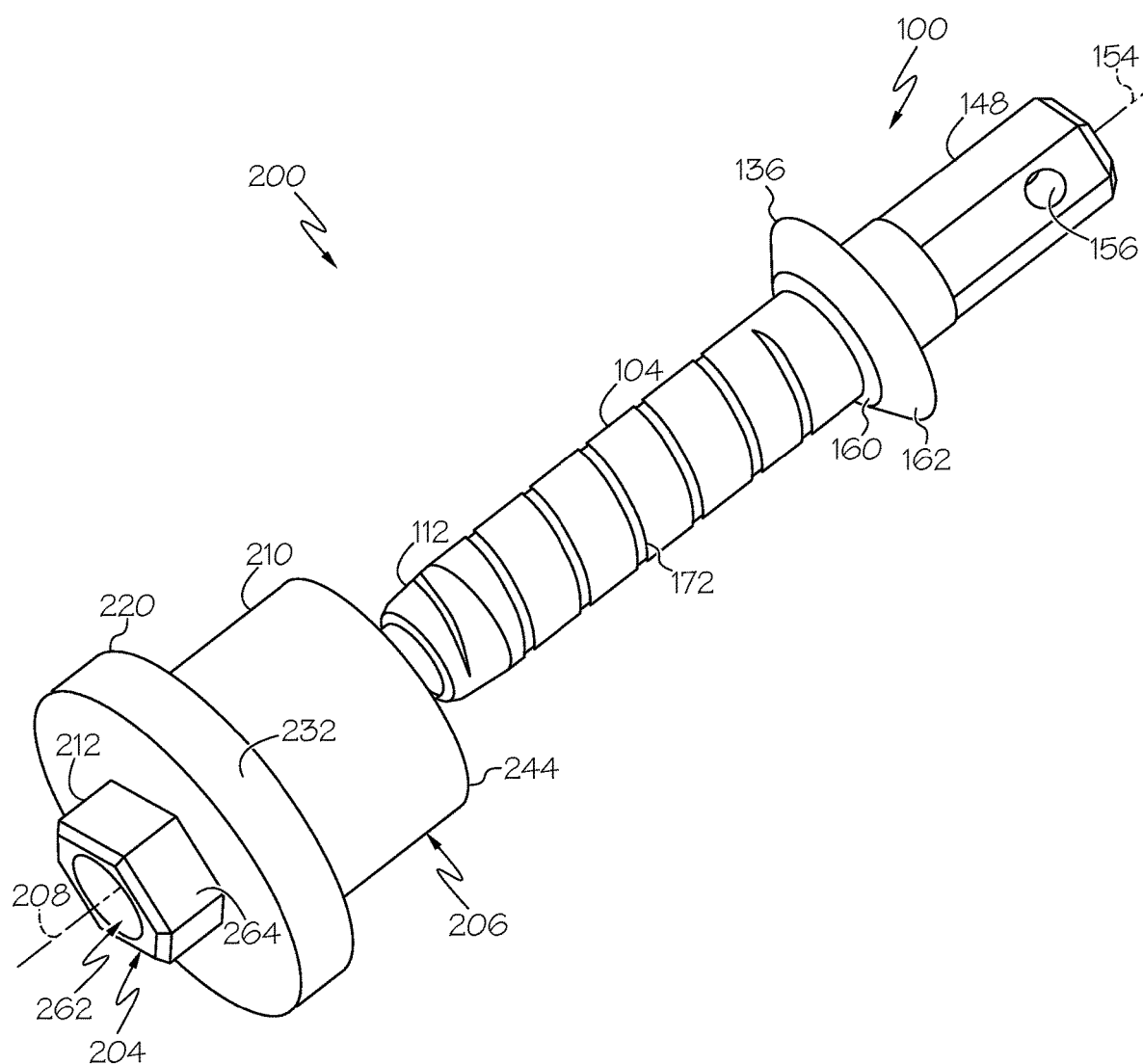
Figure 12:
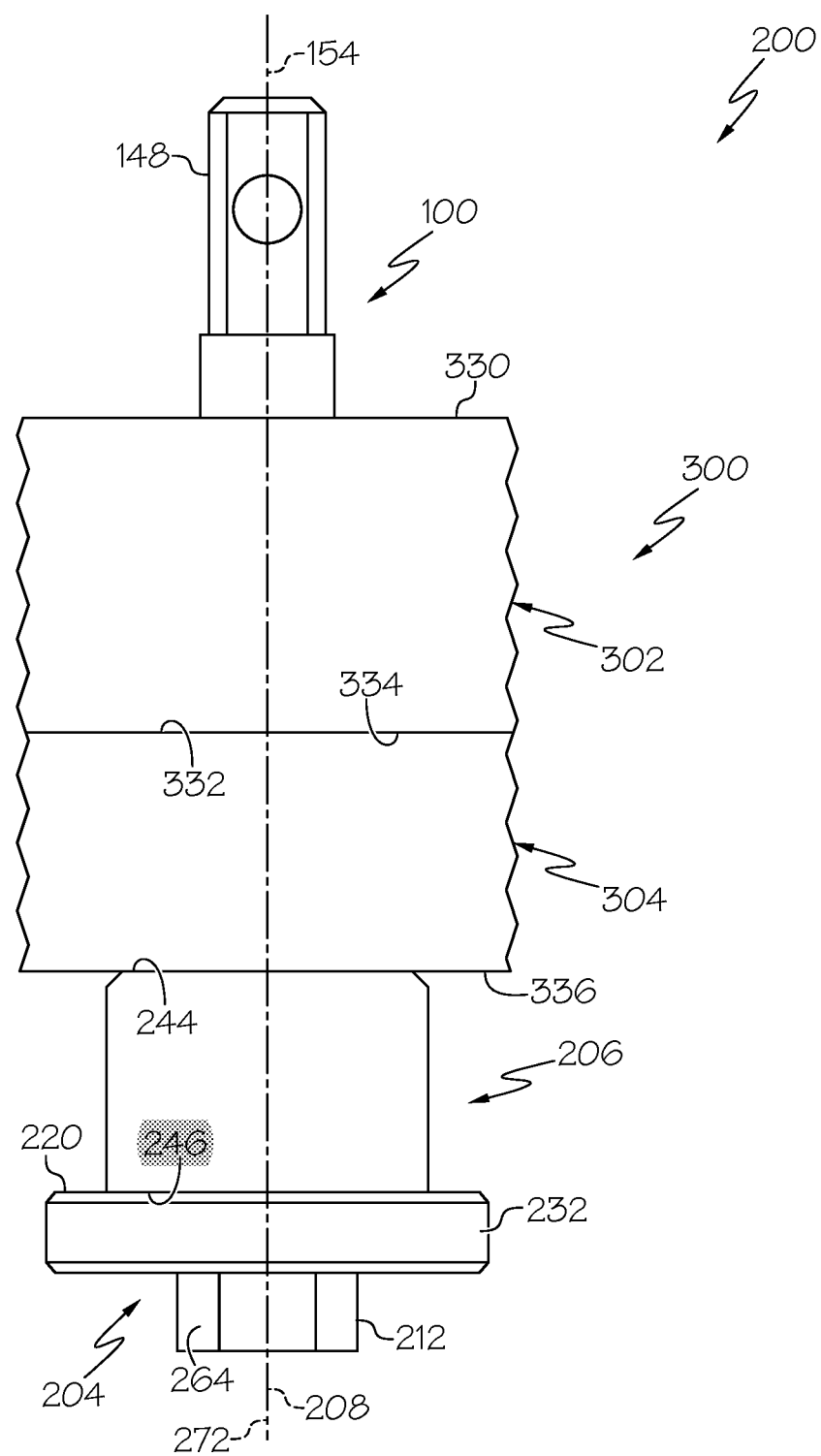
Figure 13:
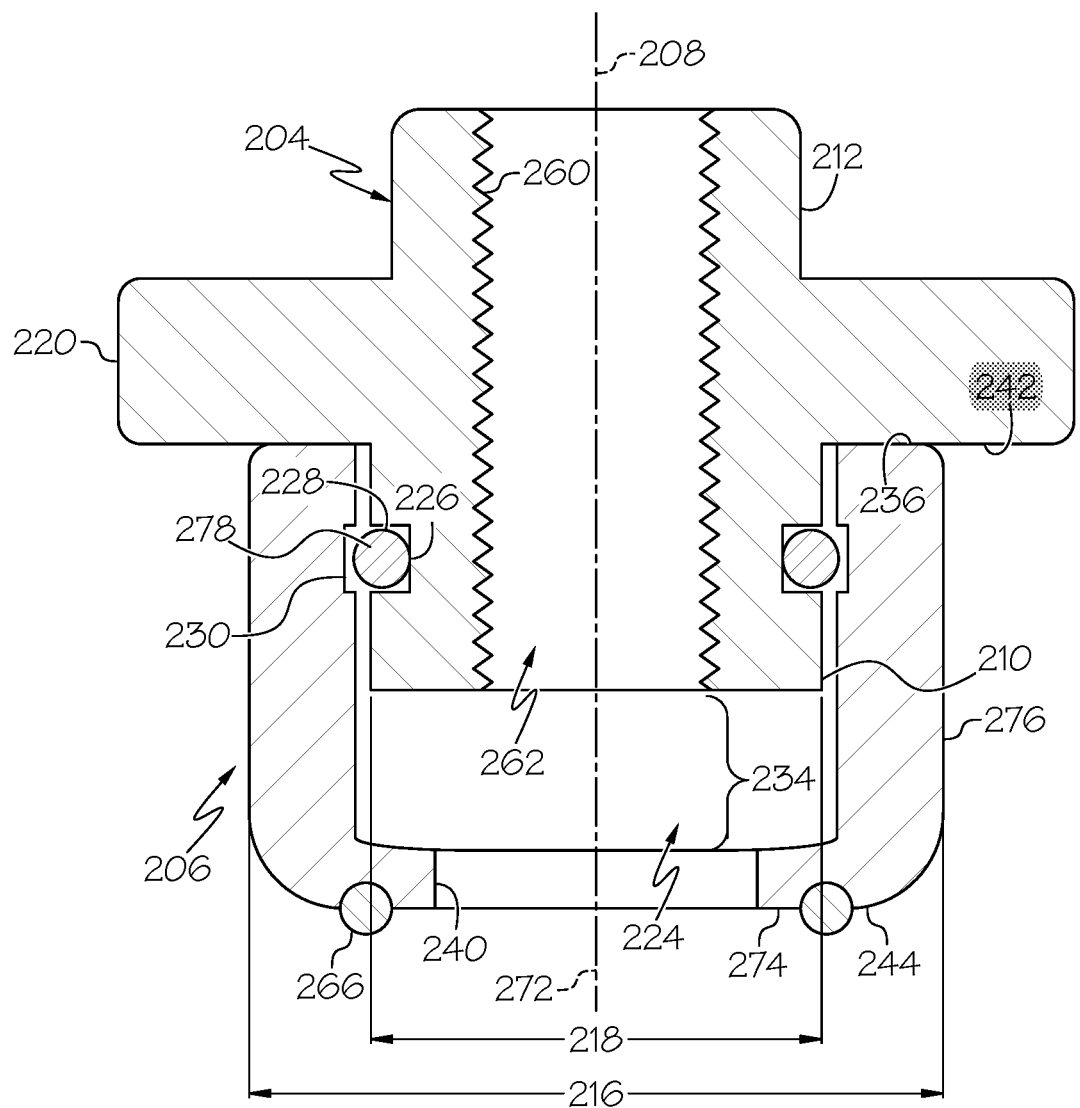
Figure 14:
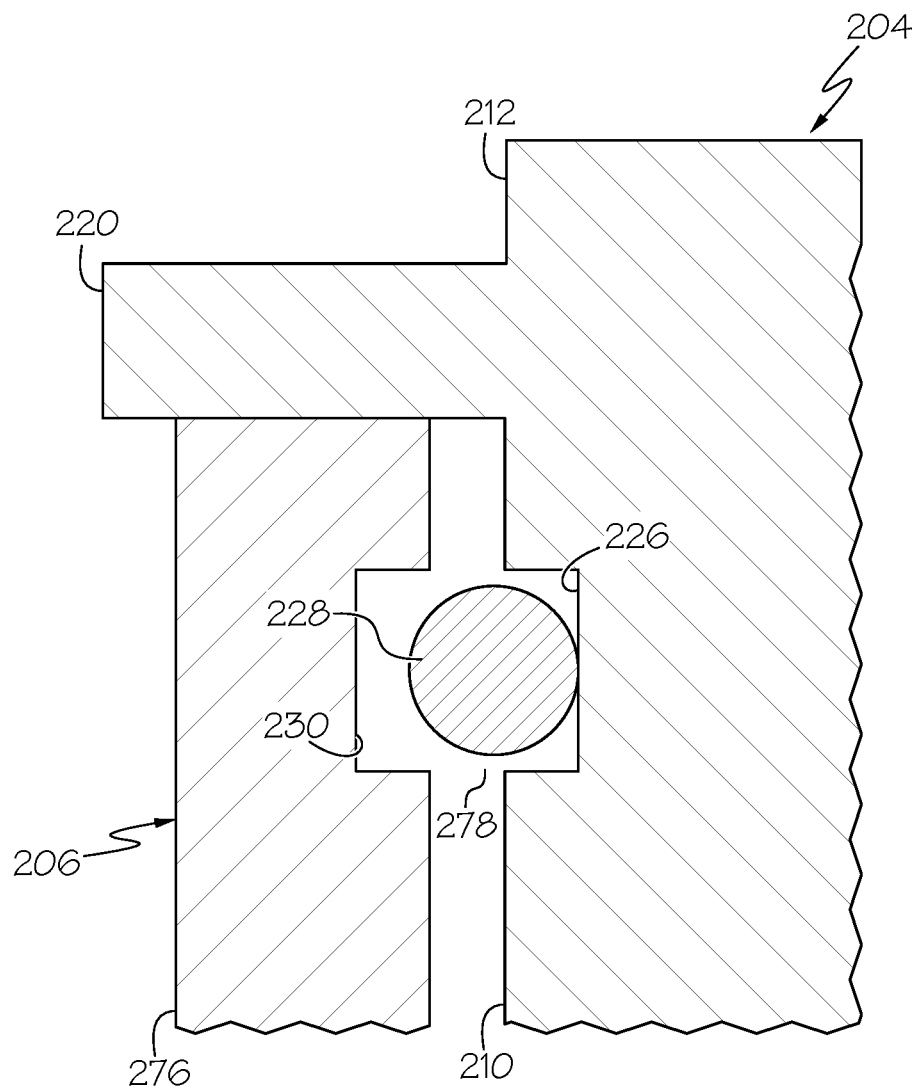
Figure 15:
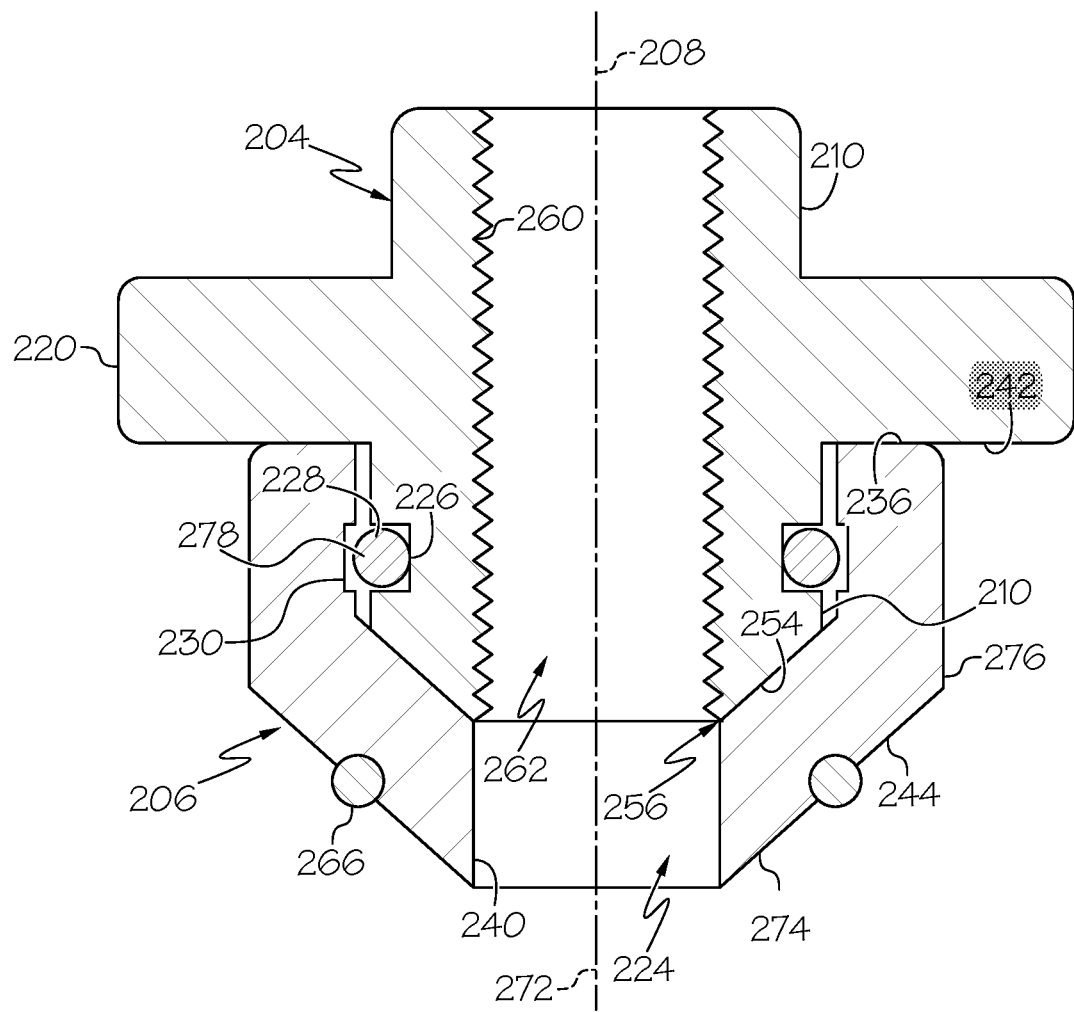
Figure 16:
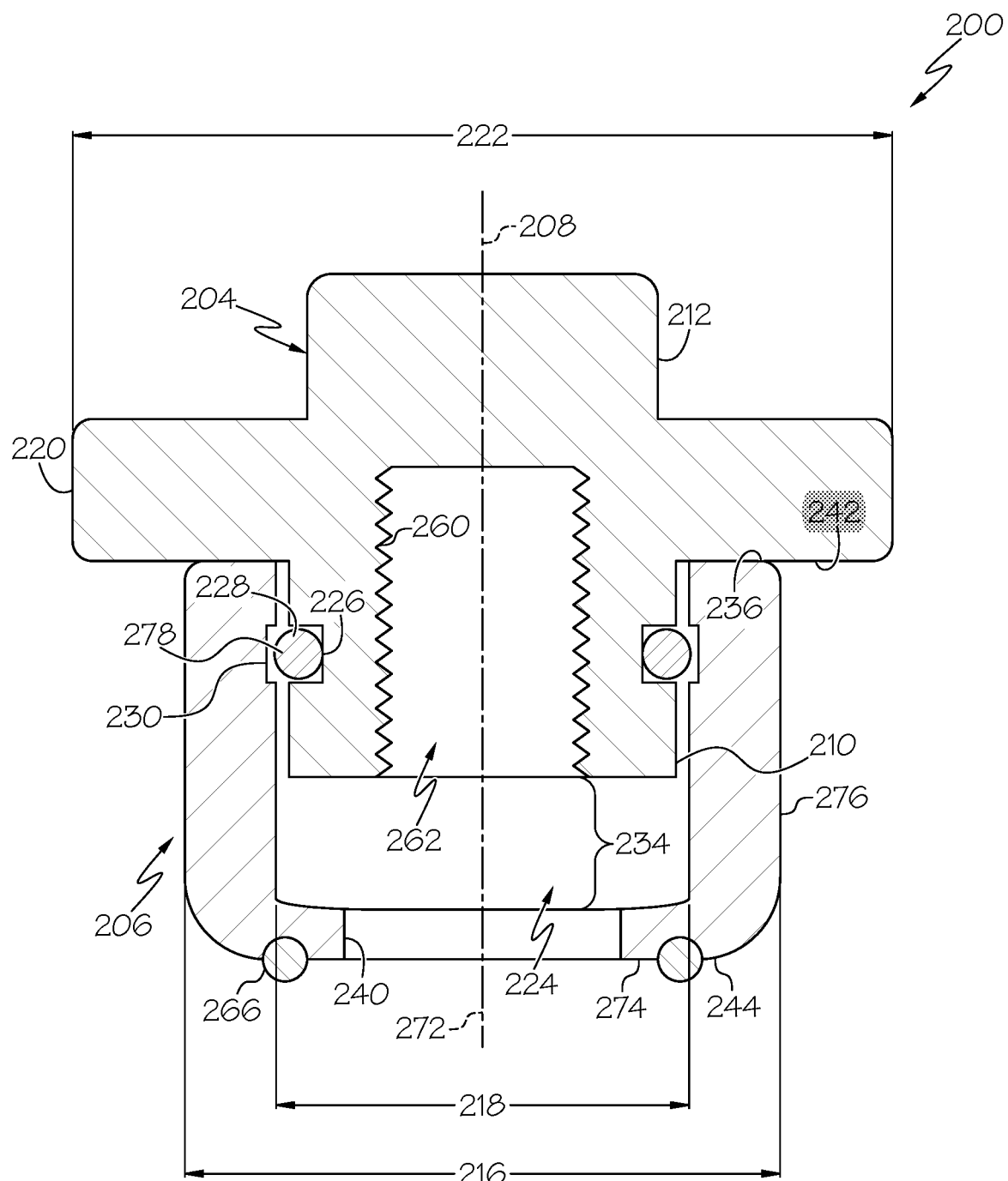
Figure 17:
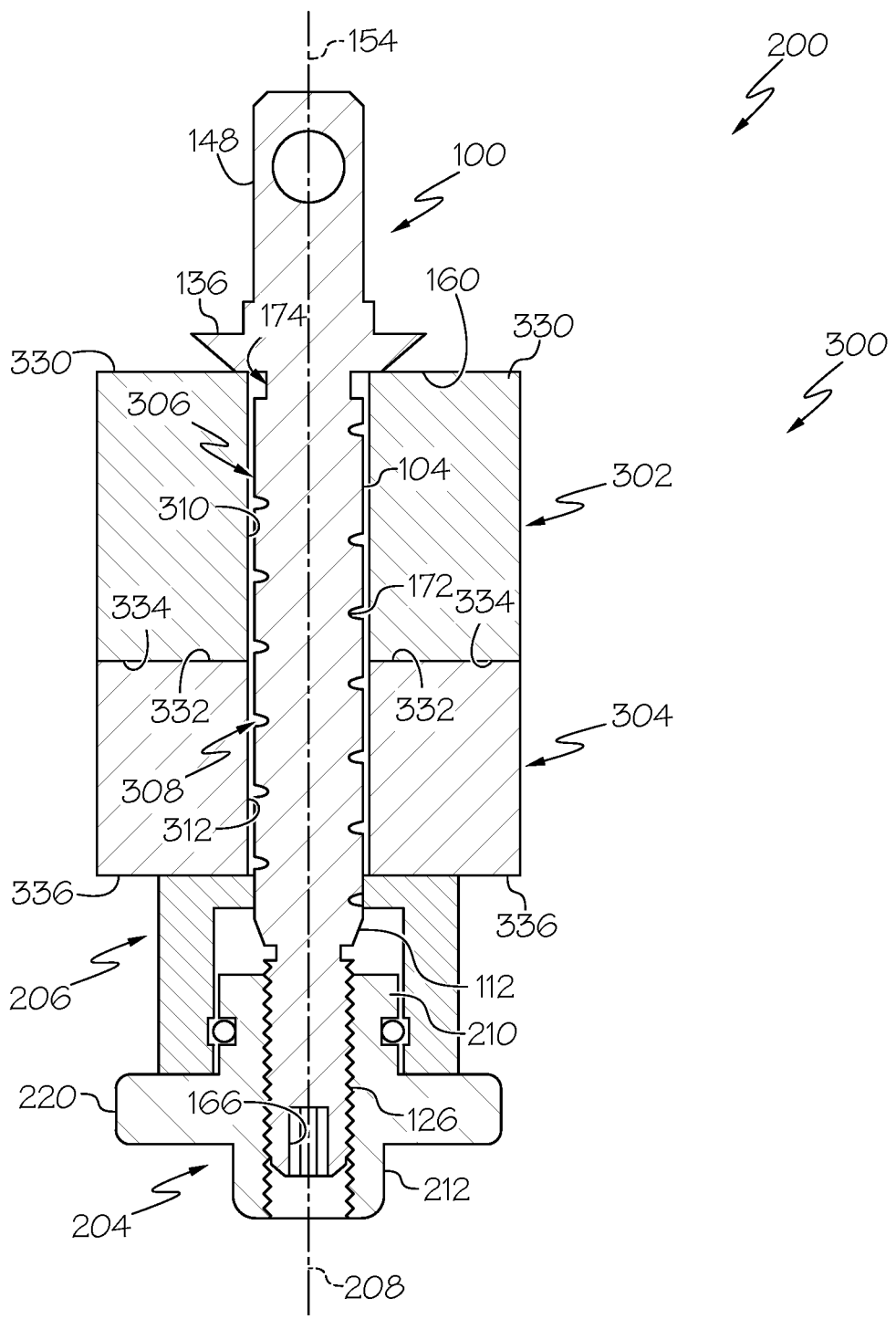
Figure 18:
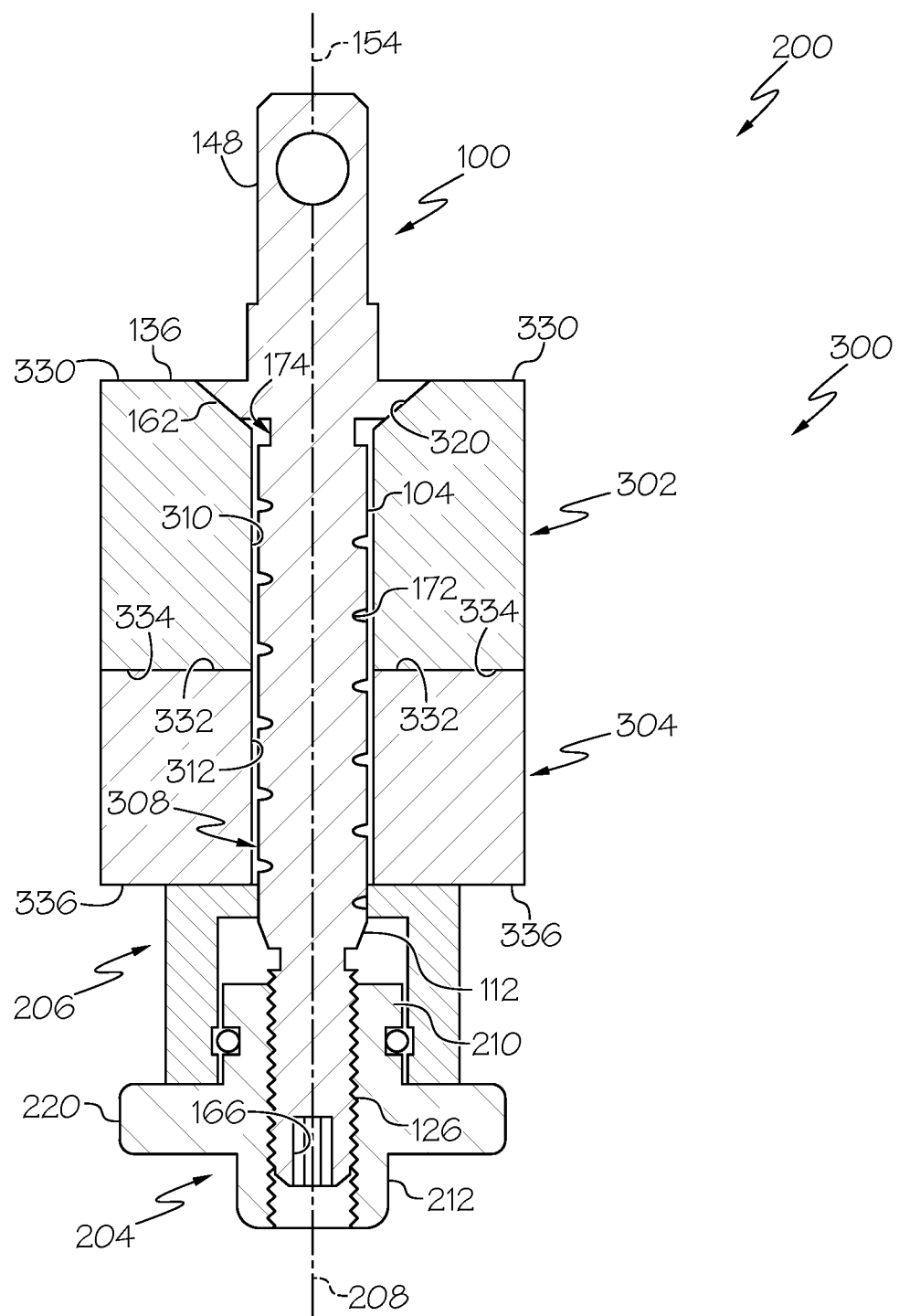
Figure 19:
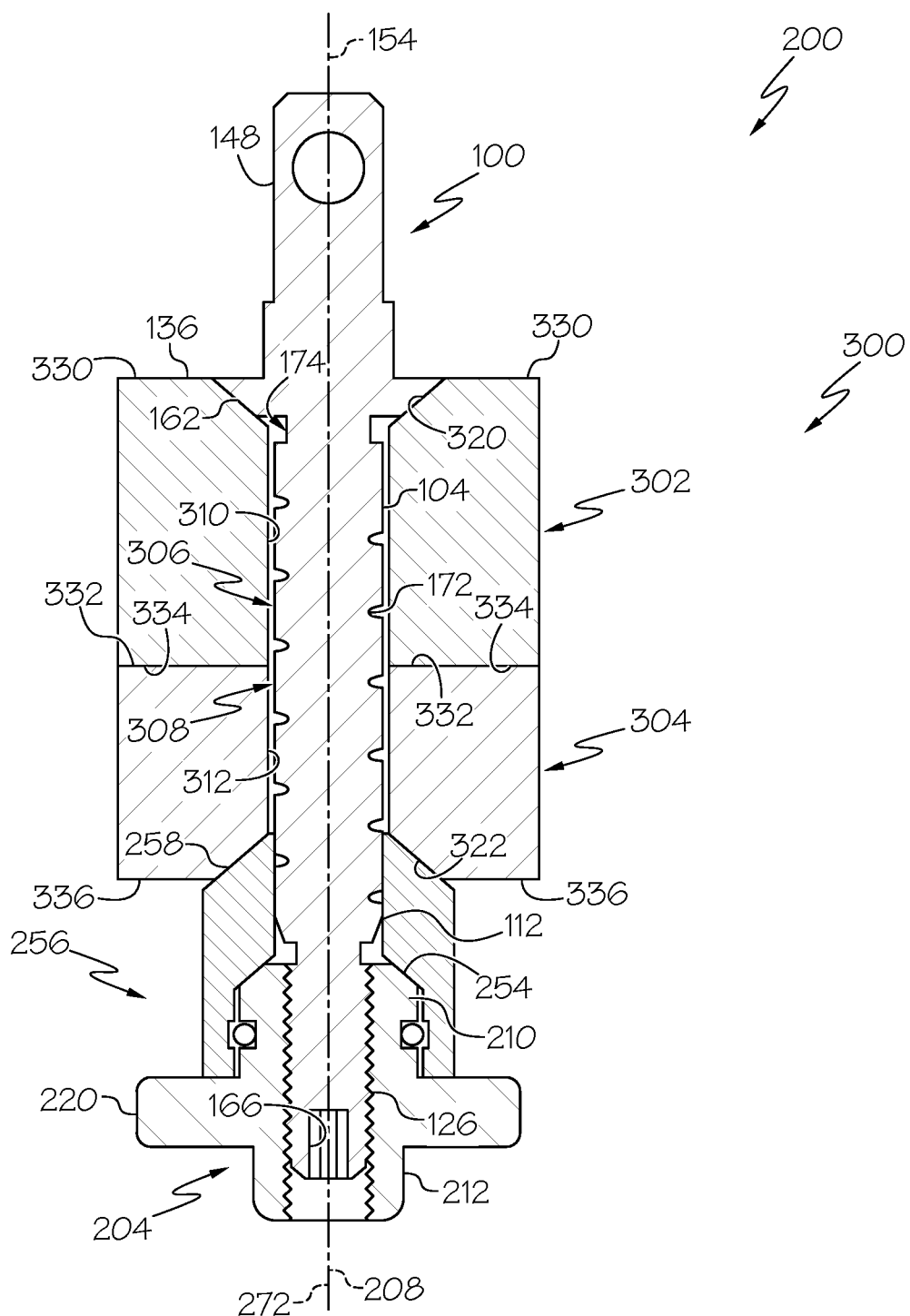
Figure 20:
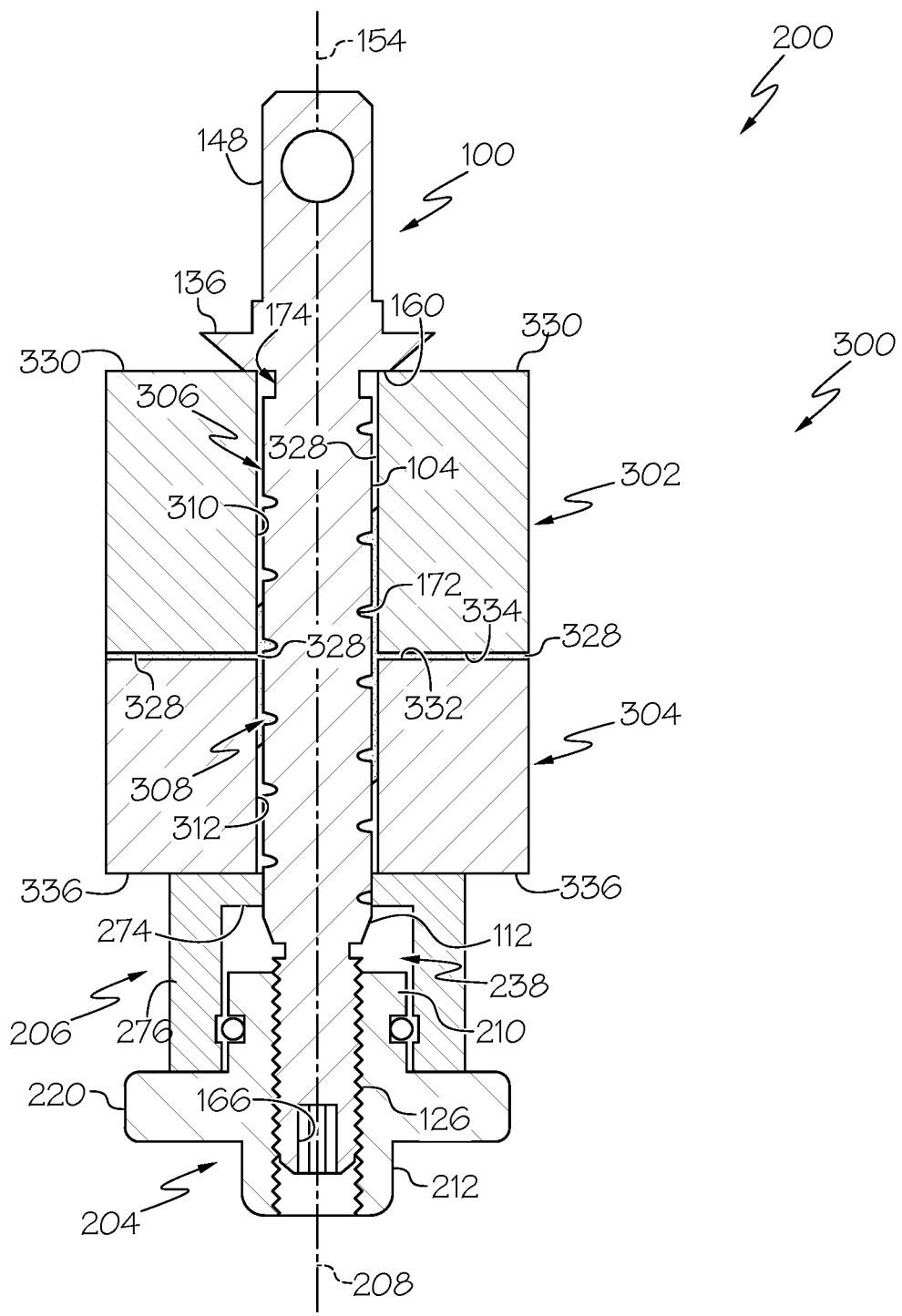
Figure 21:
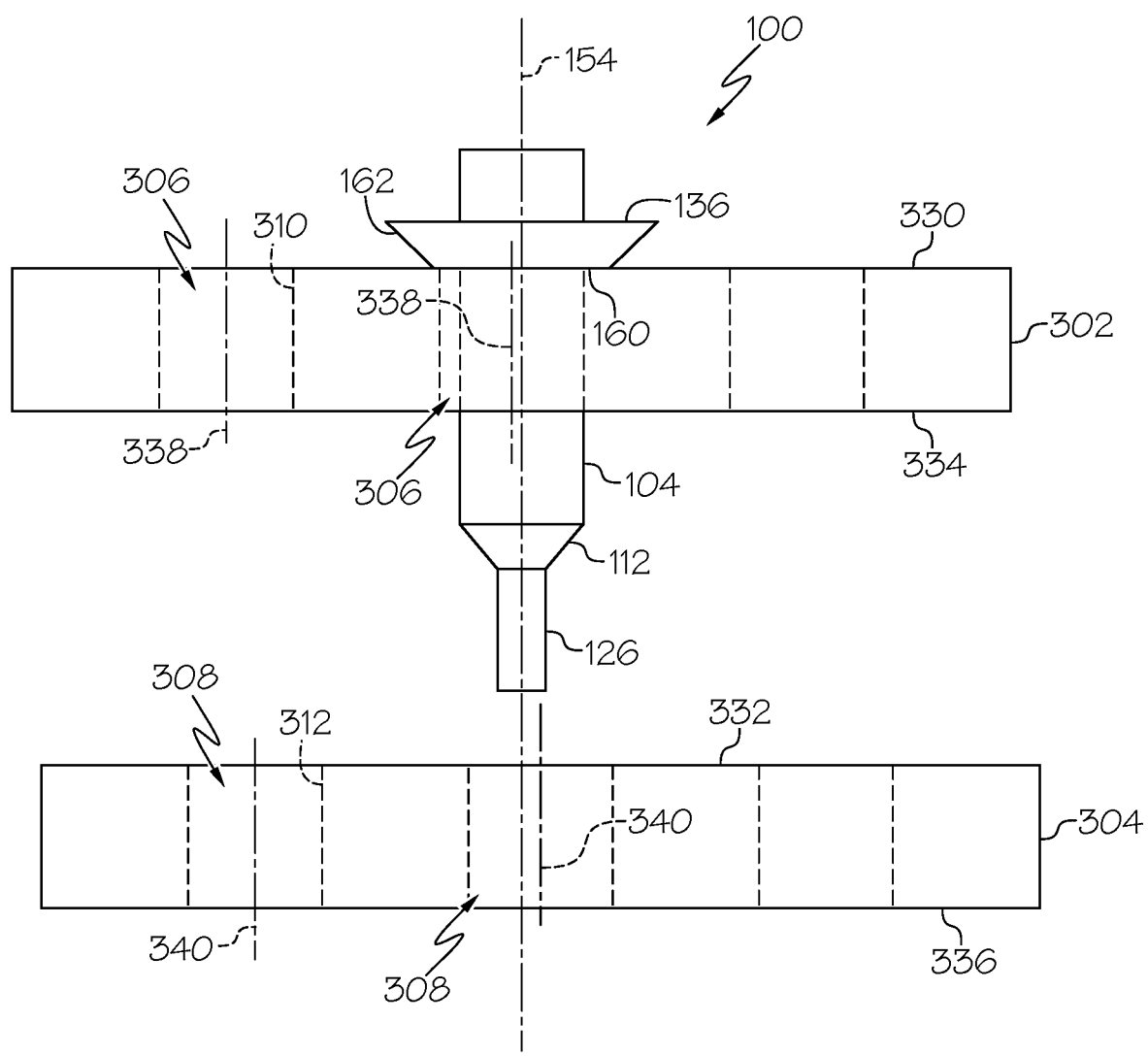
Figure 22:
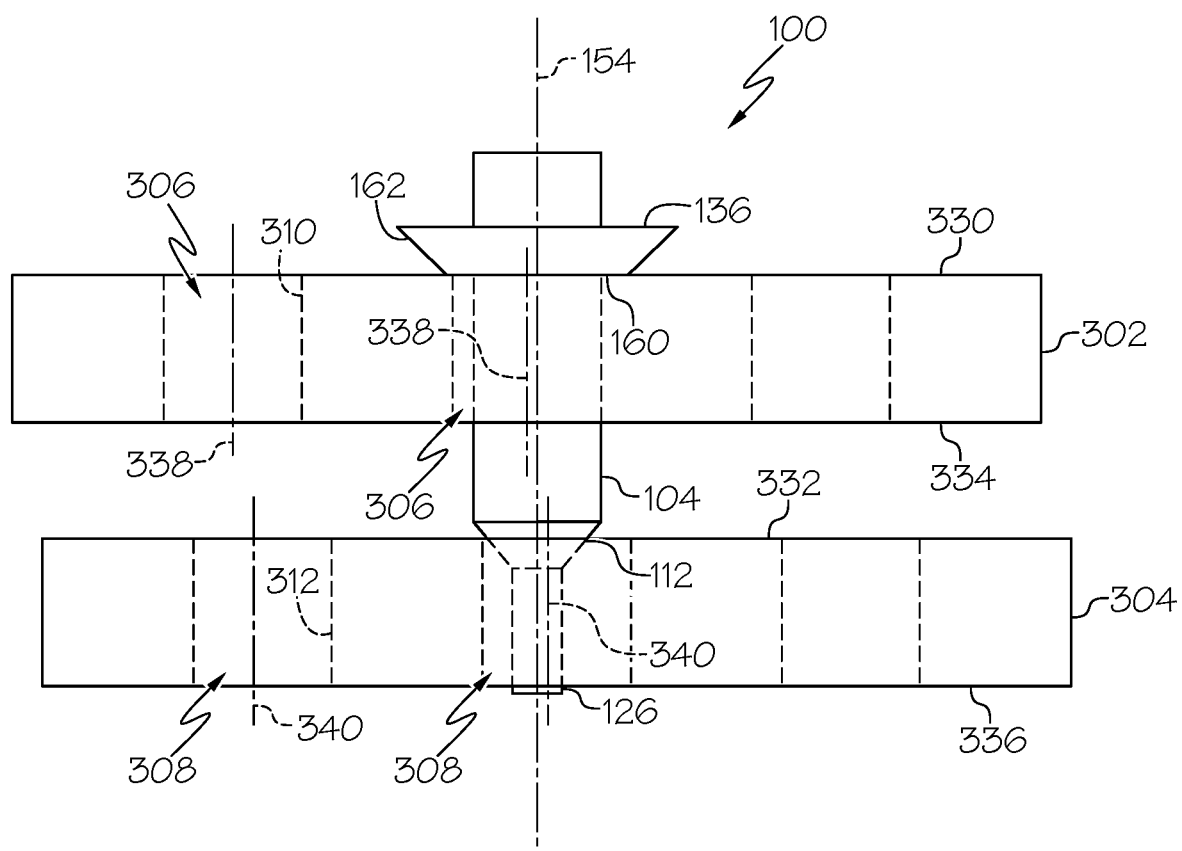
Figure 23:
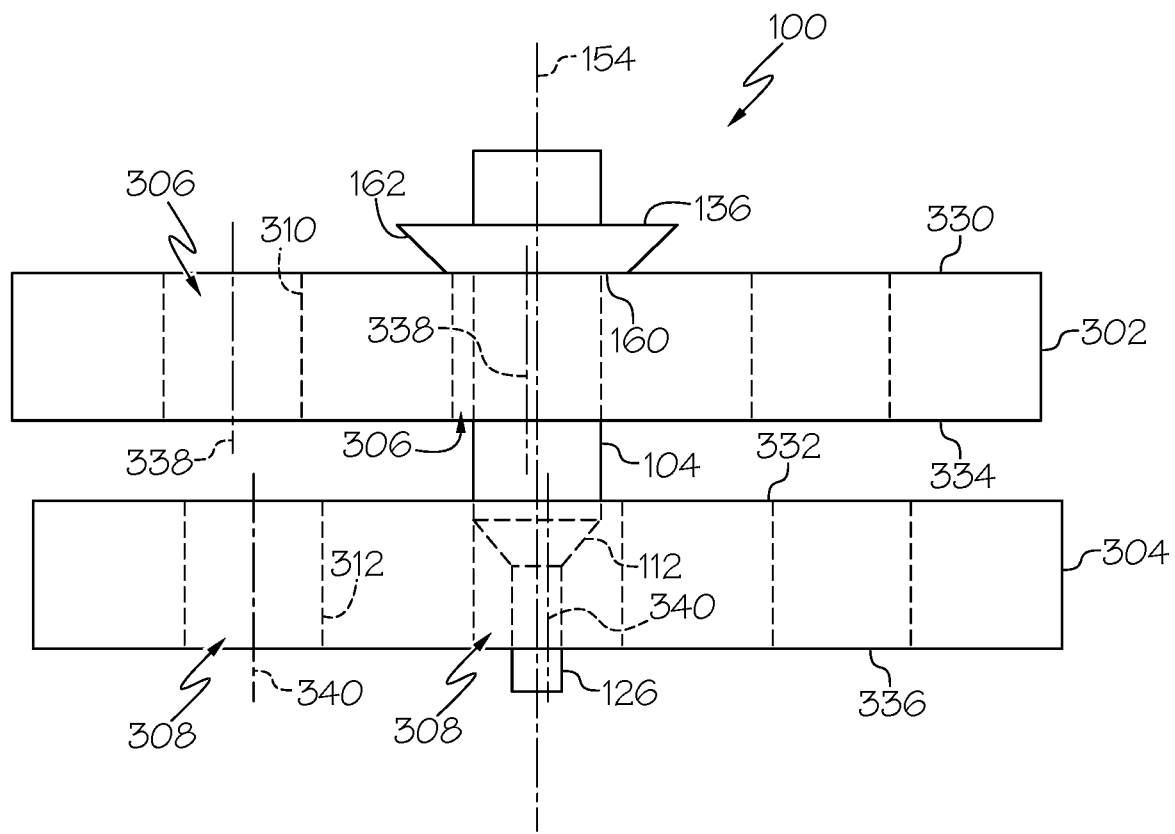
Figure 24:
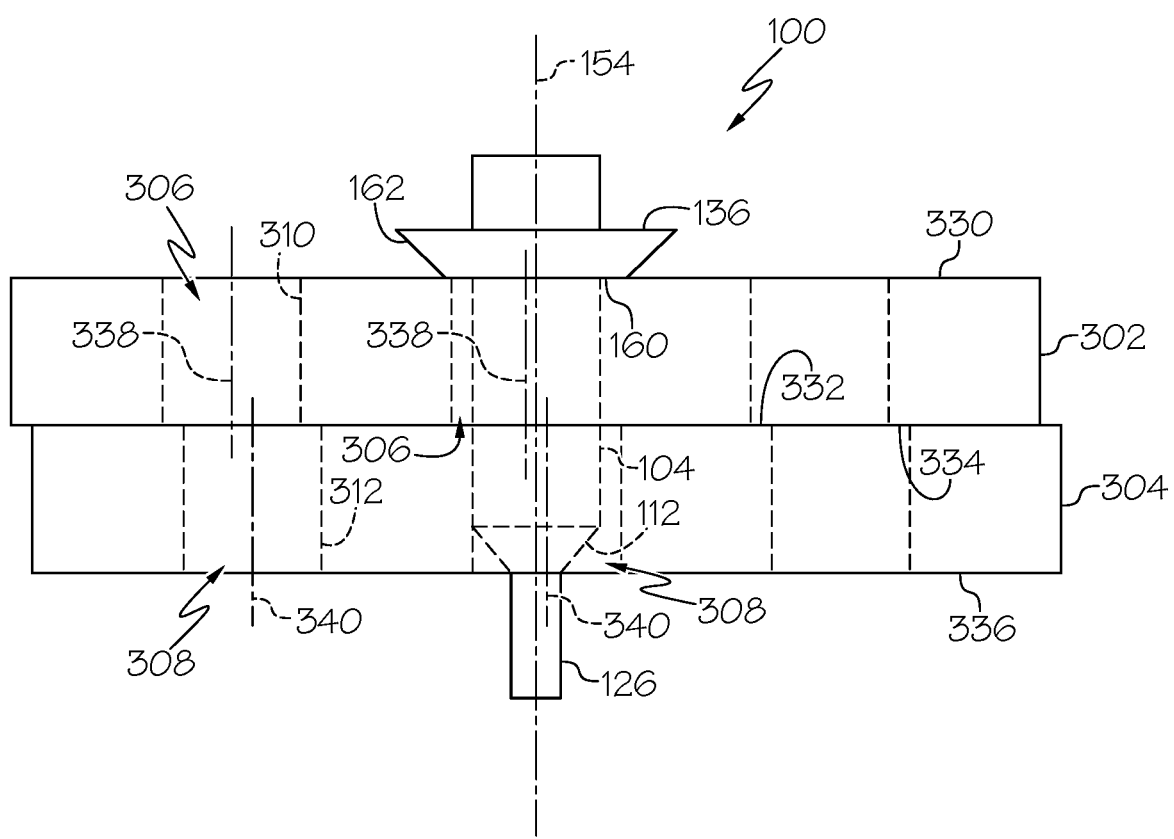
Figure 25:
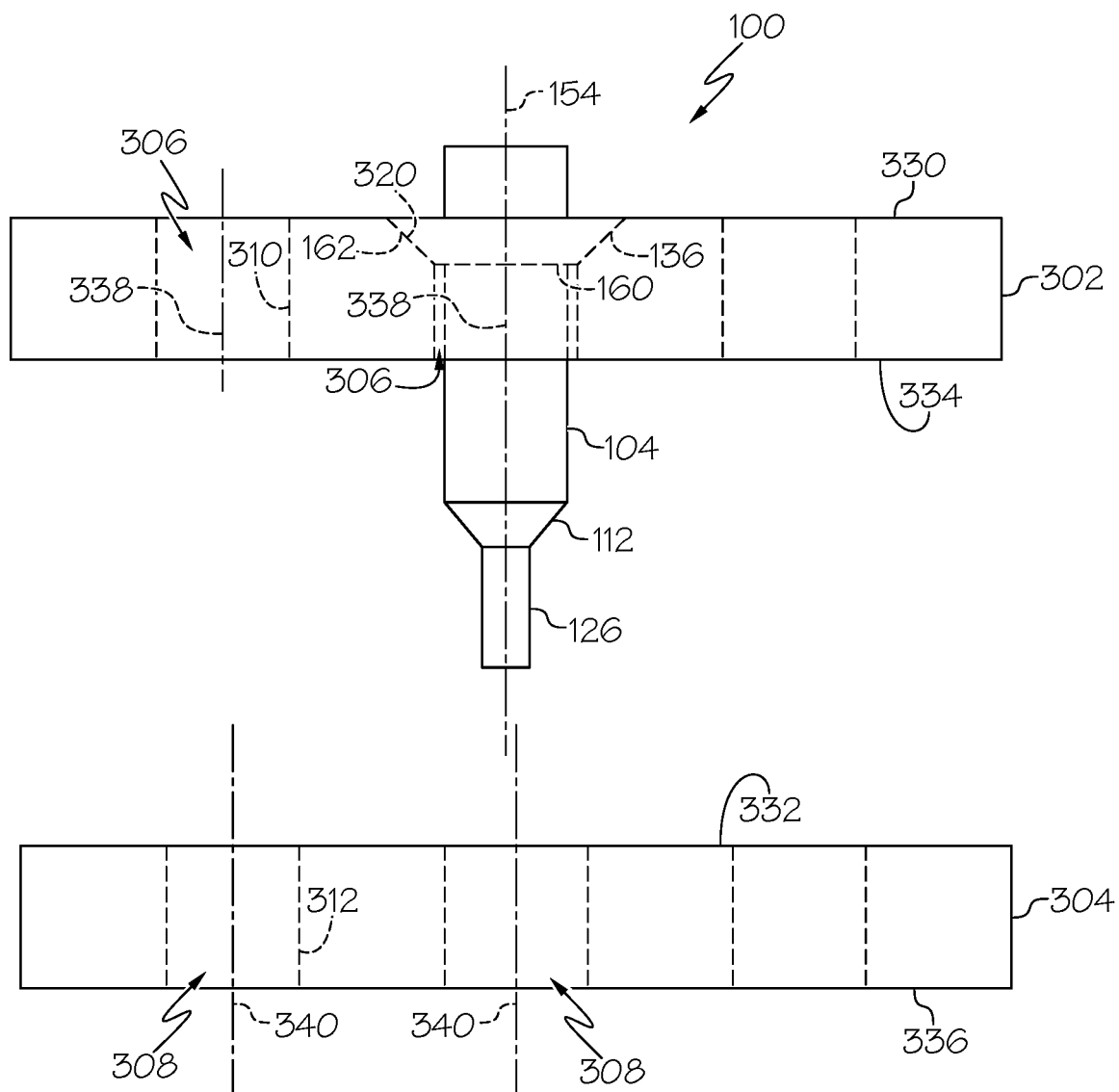
Figure 26:
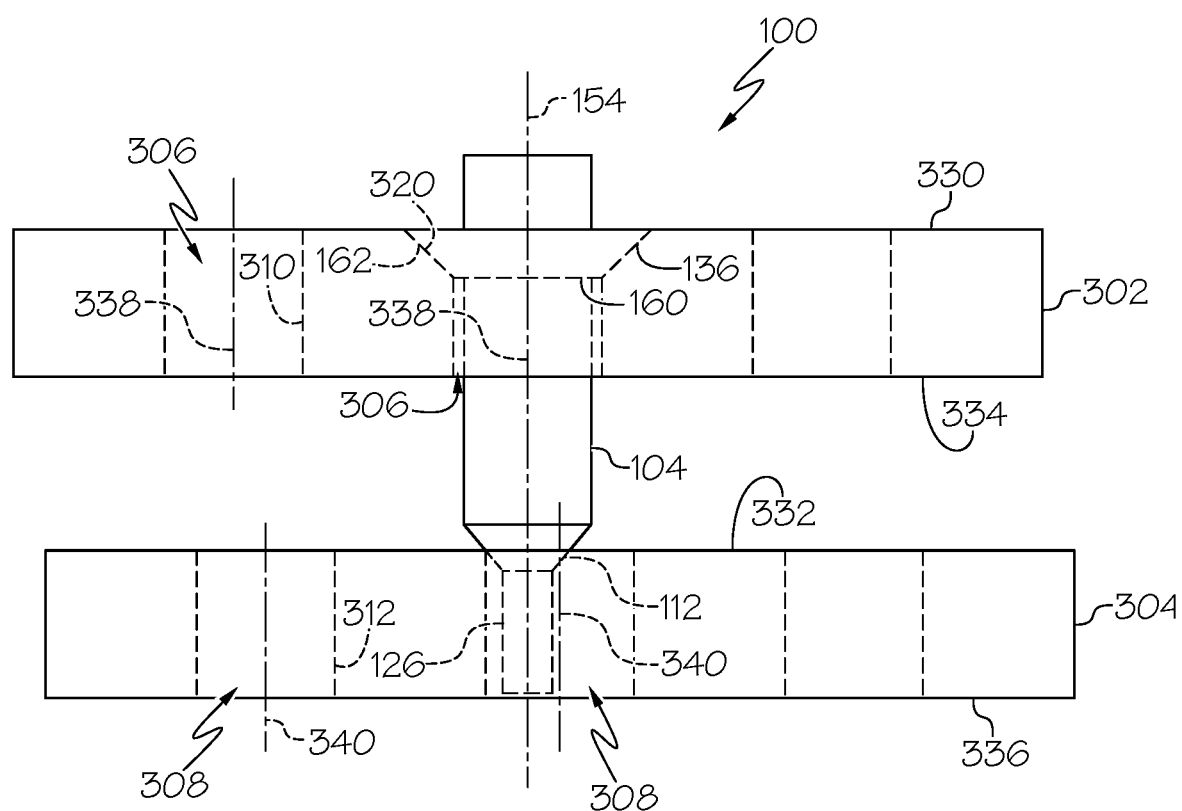
Figure 27:
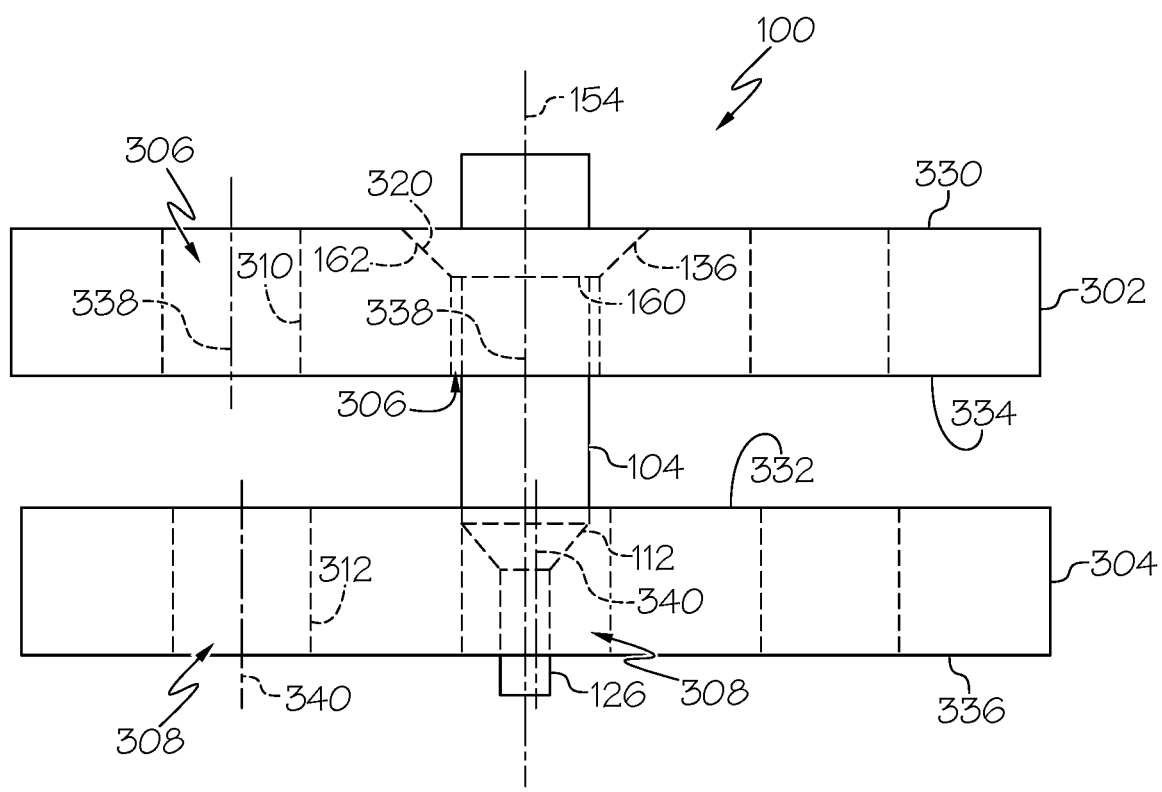
Figure 28:
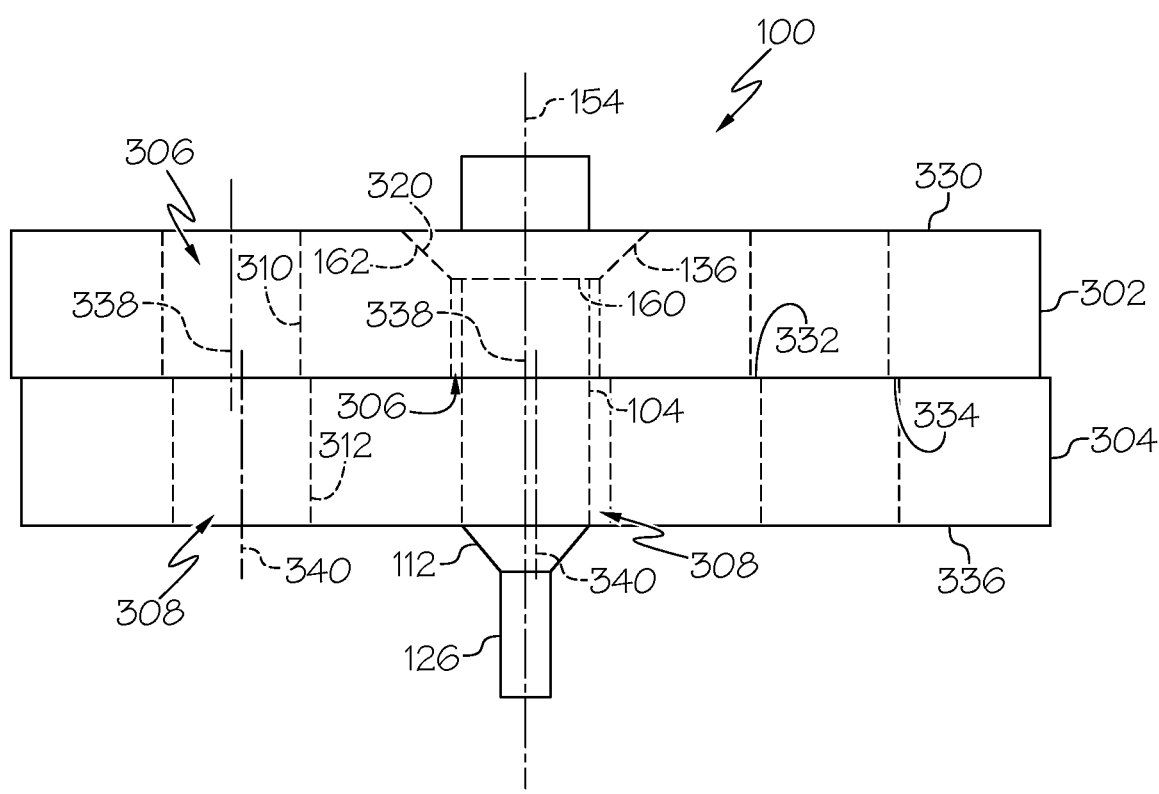
Figure 29:
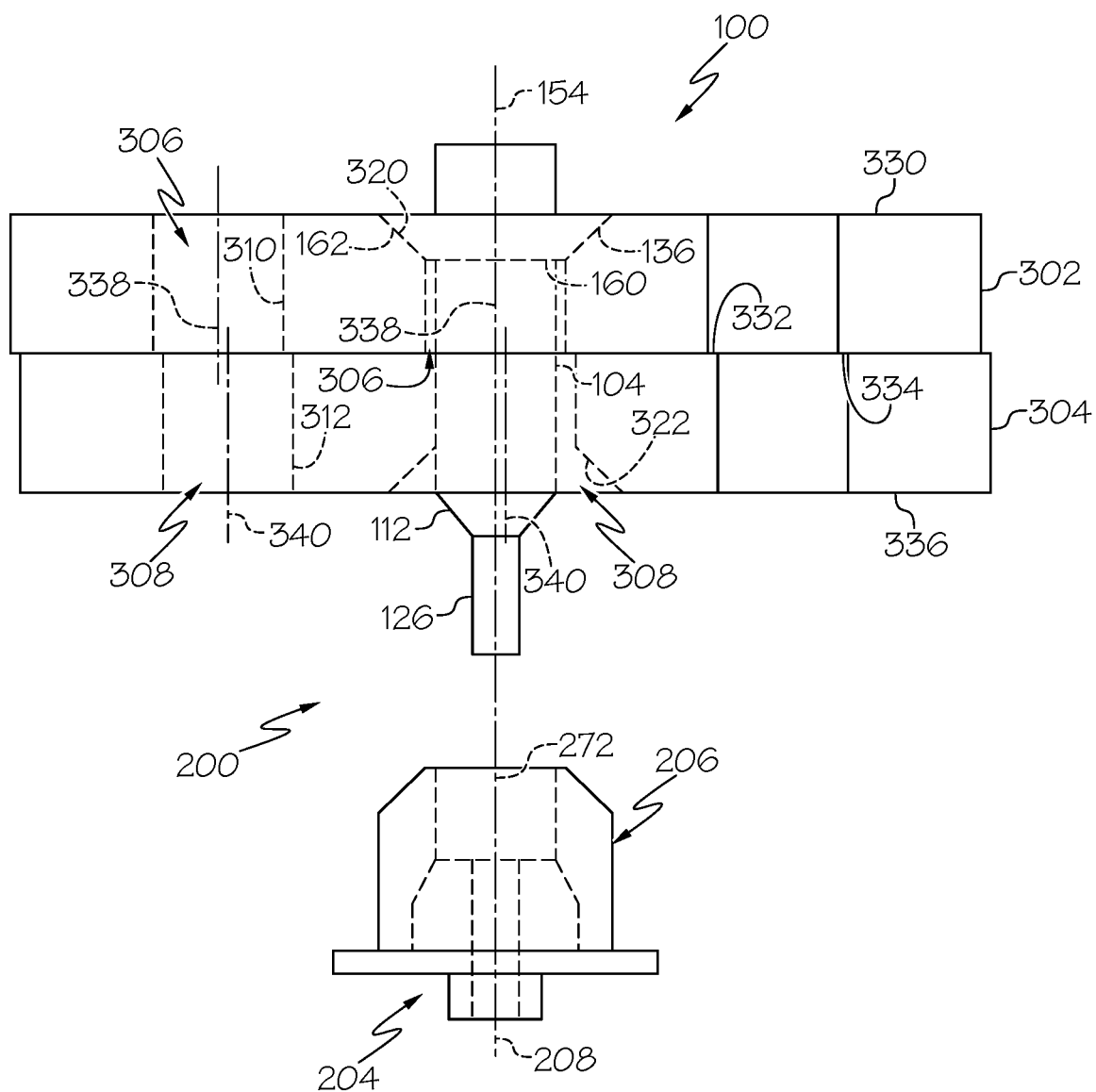
Figure 30:
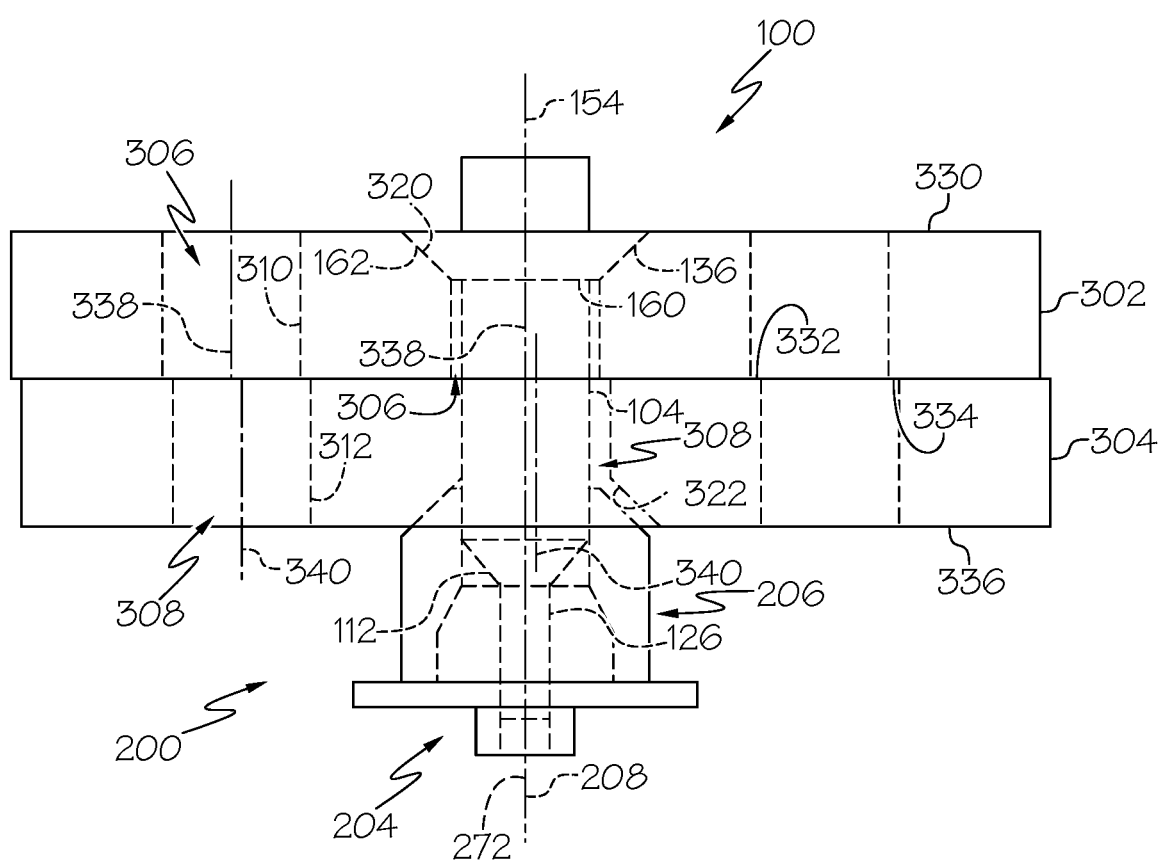
Figure 31:
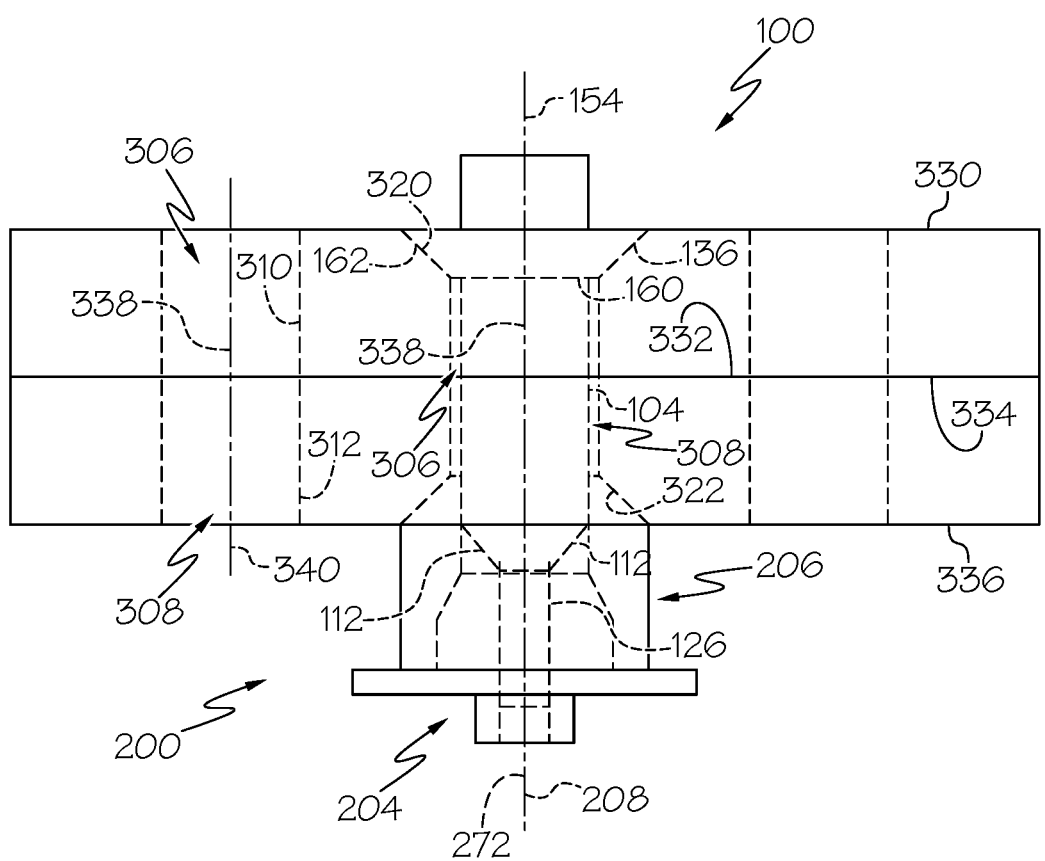
Figure 32:
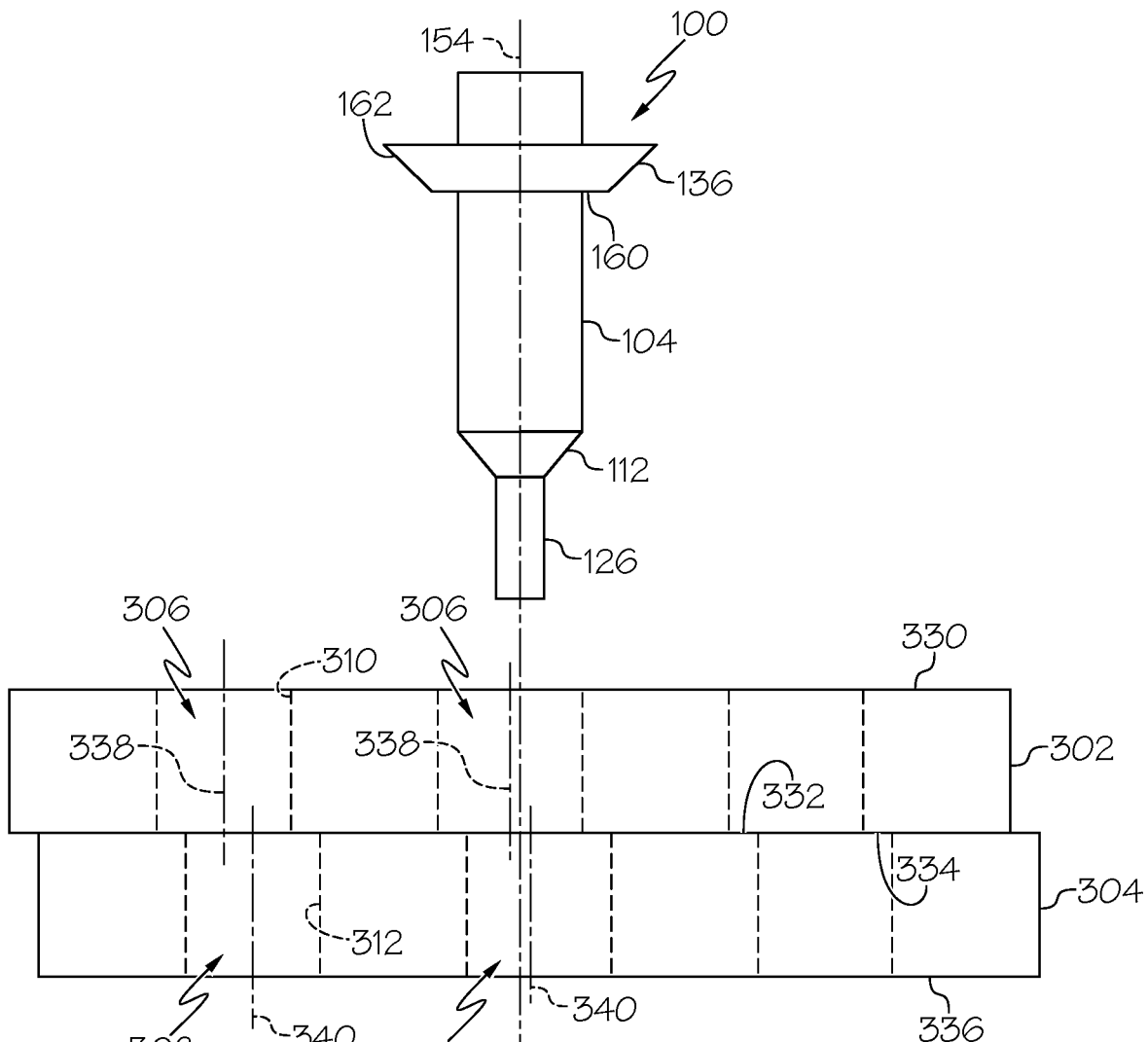
Figure 33:
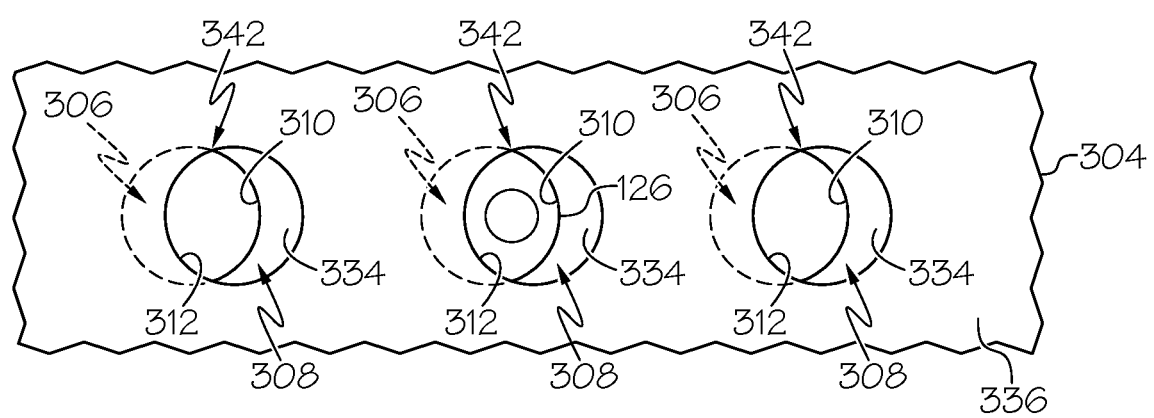
Figure 34:
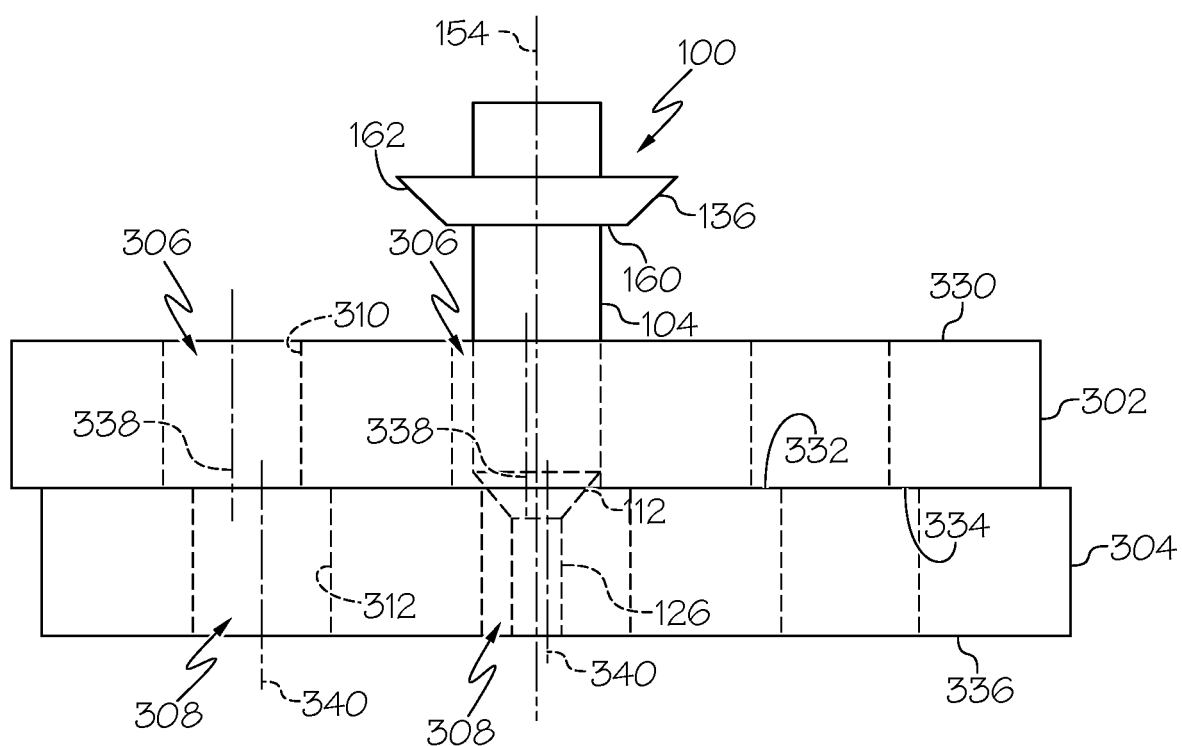
Figure 35:
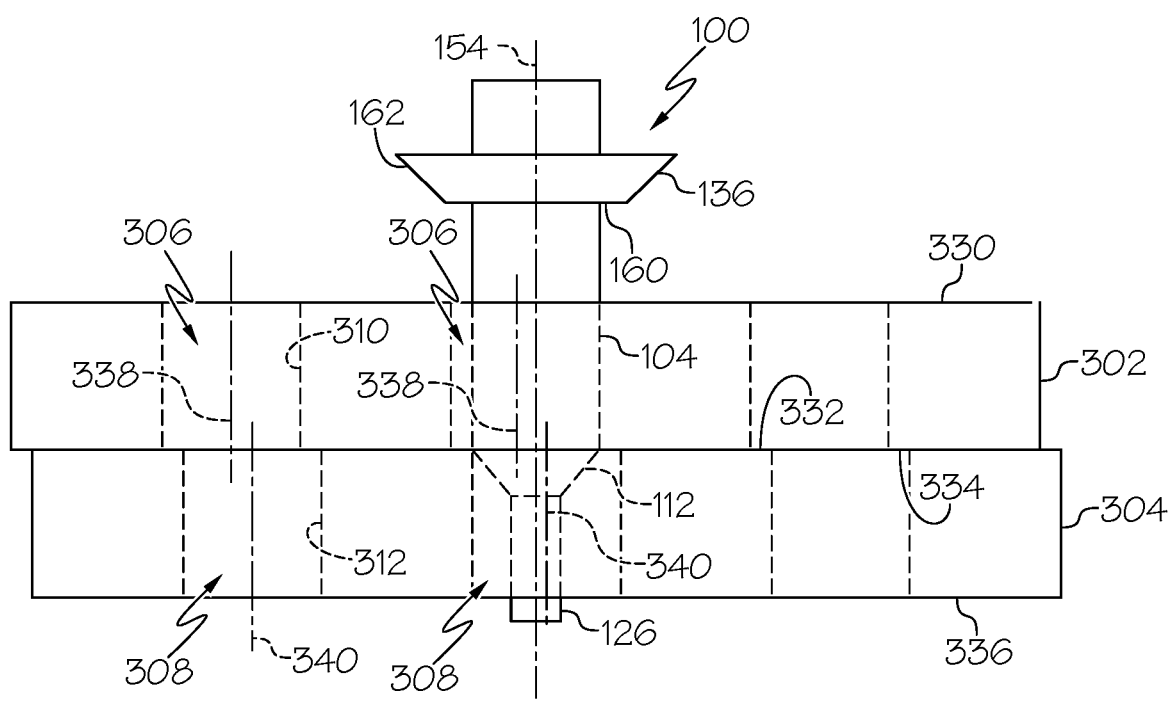
Figure 36:
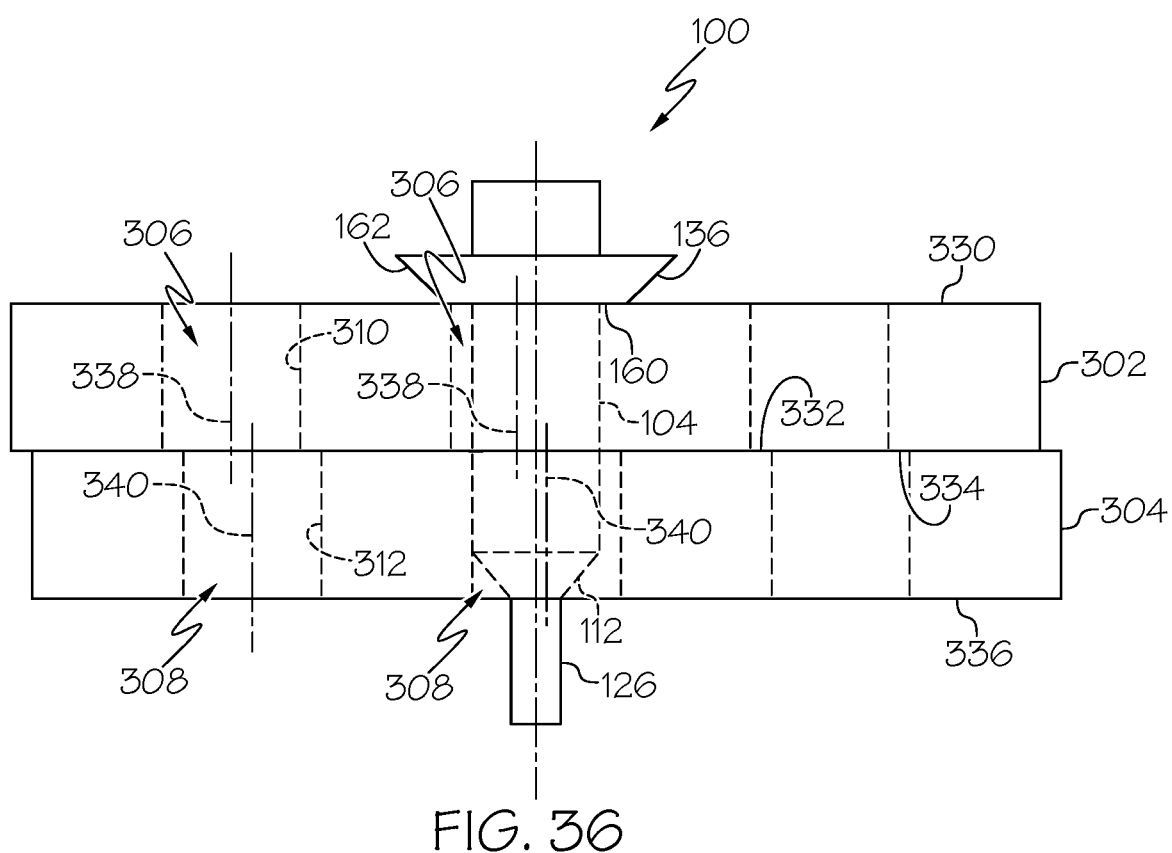
Figure 37:
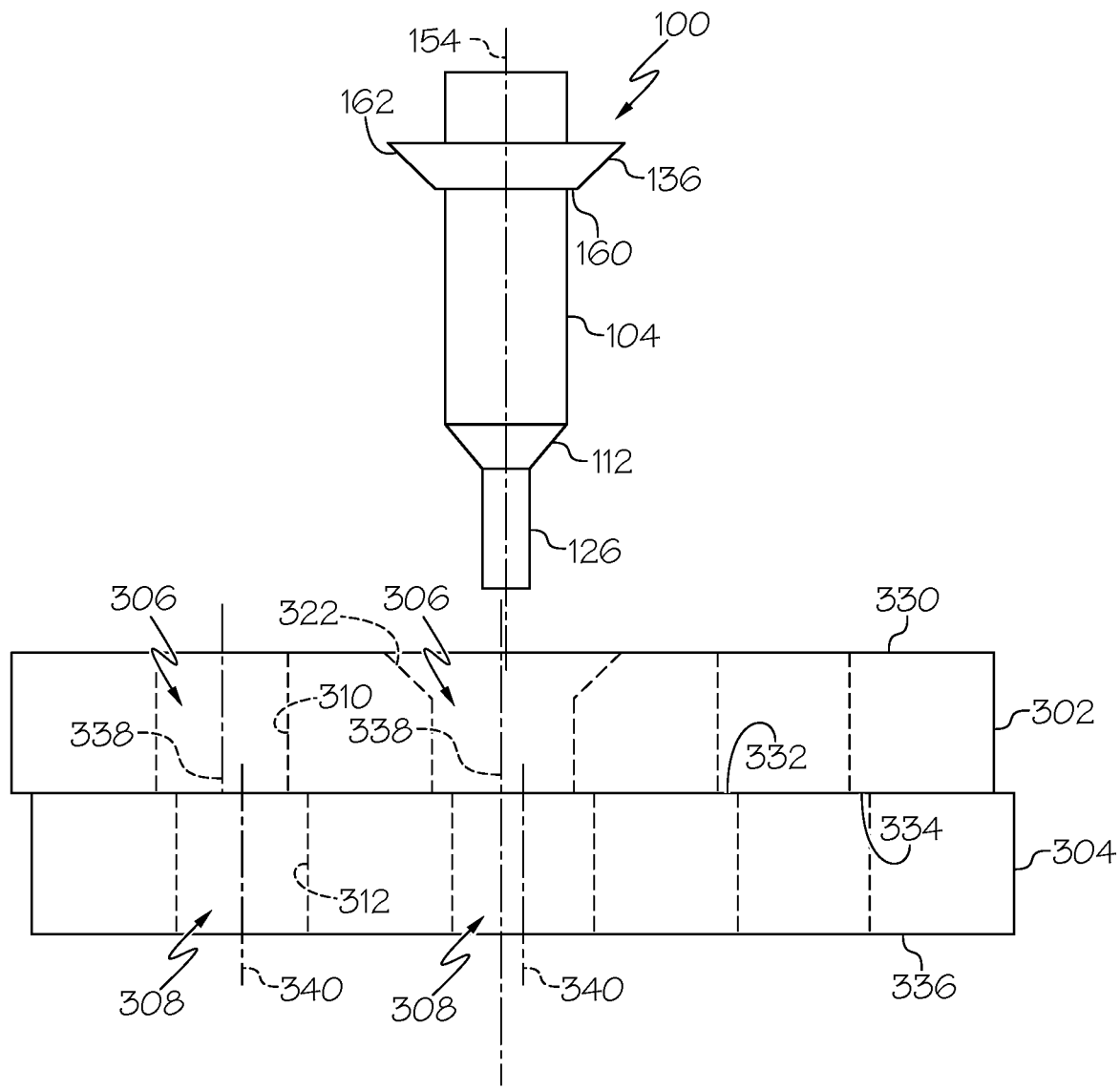
Figure 38:
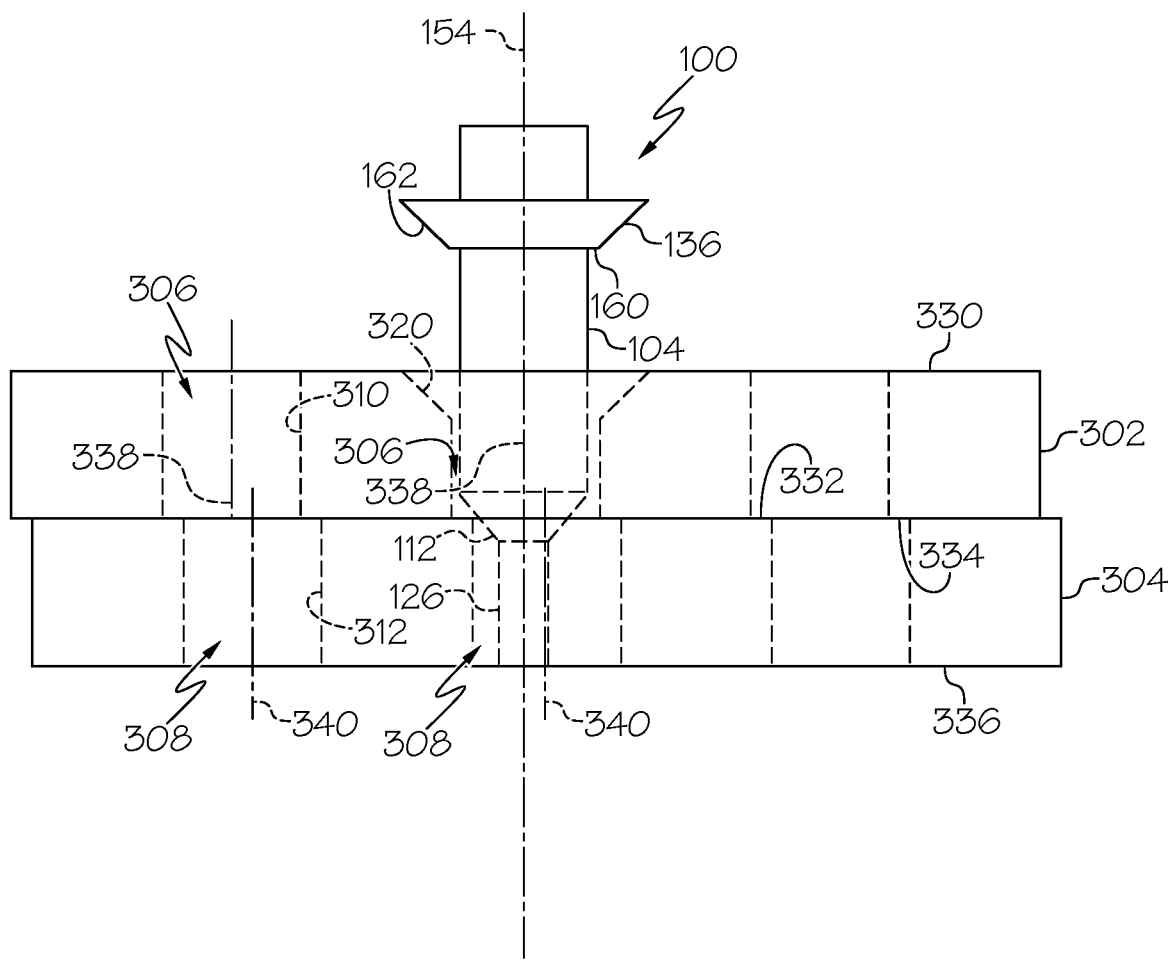
Figure 39:
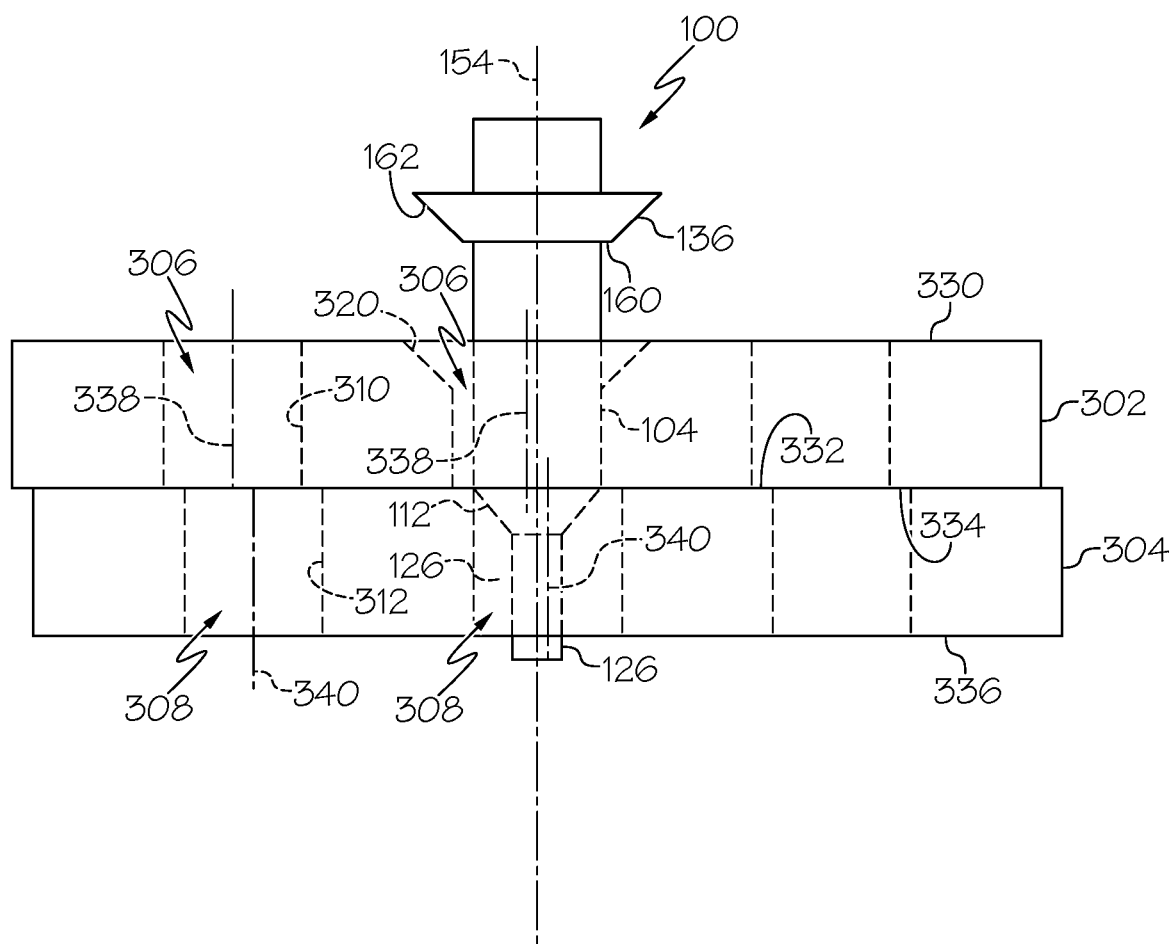
Figure 40:
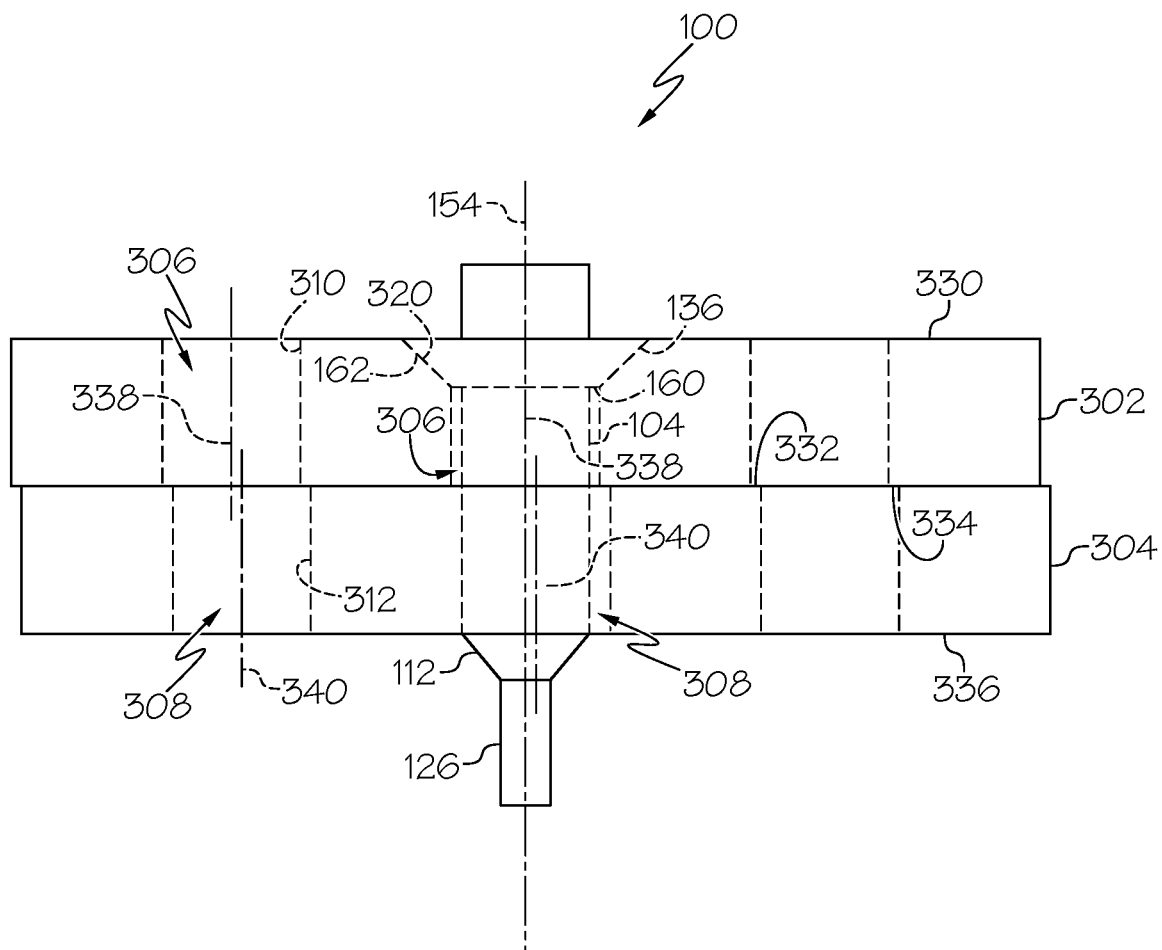
Figure 41A:
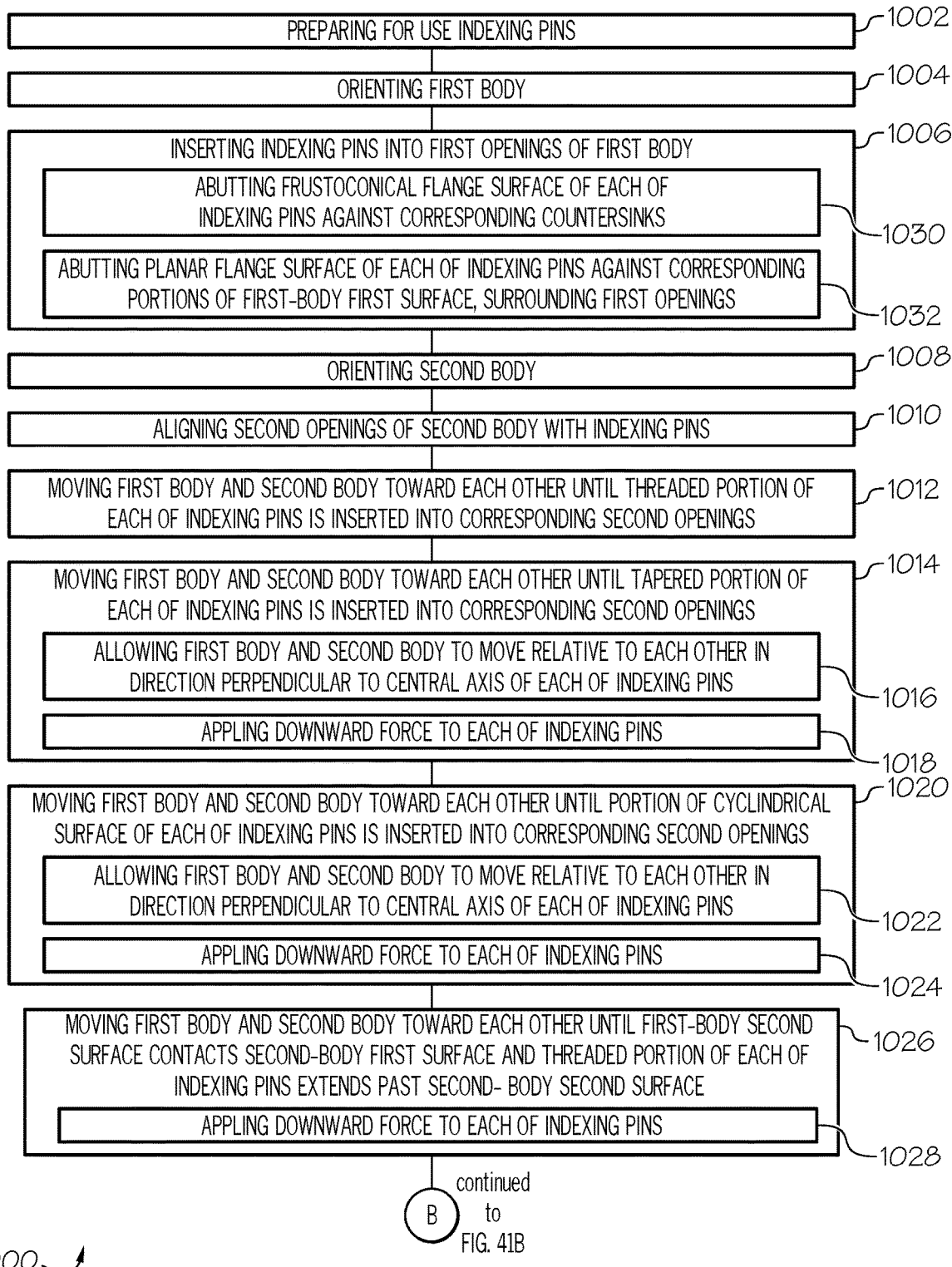
Figure 41B:
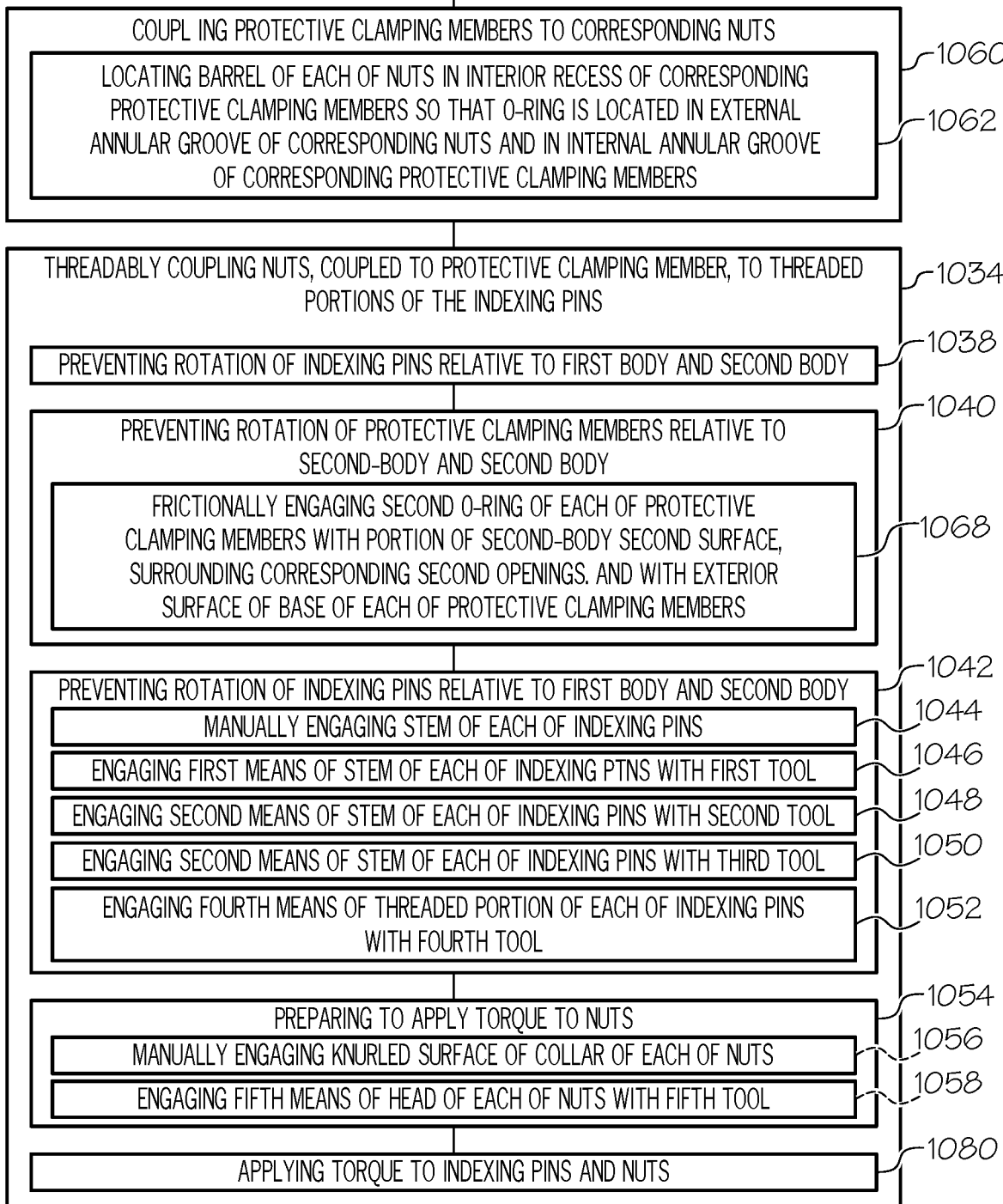
Figure 41C:
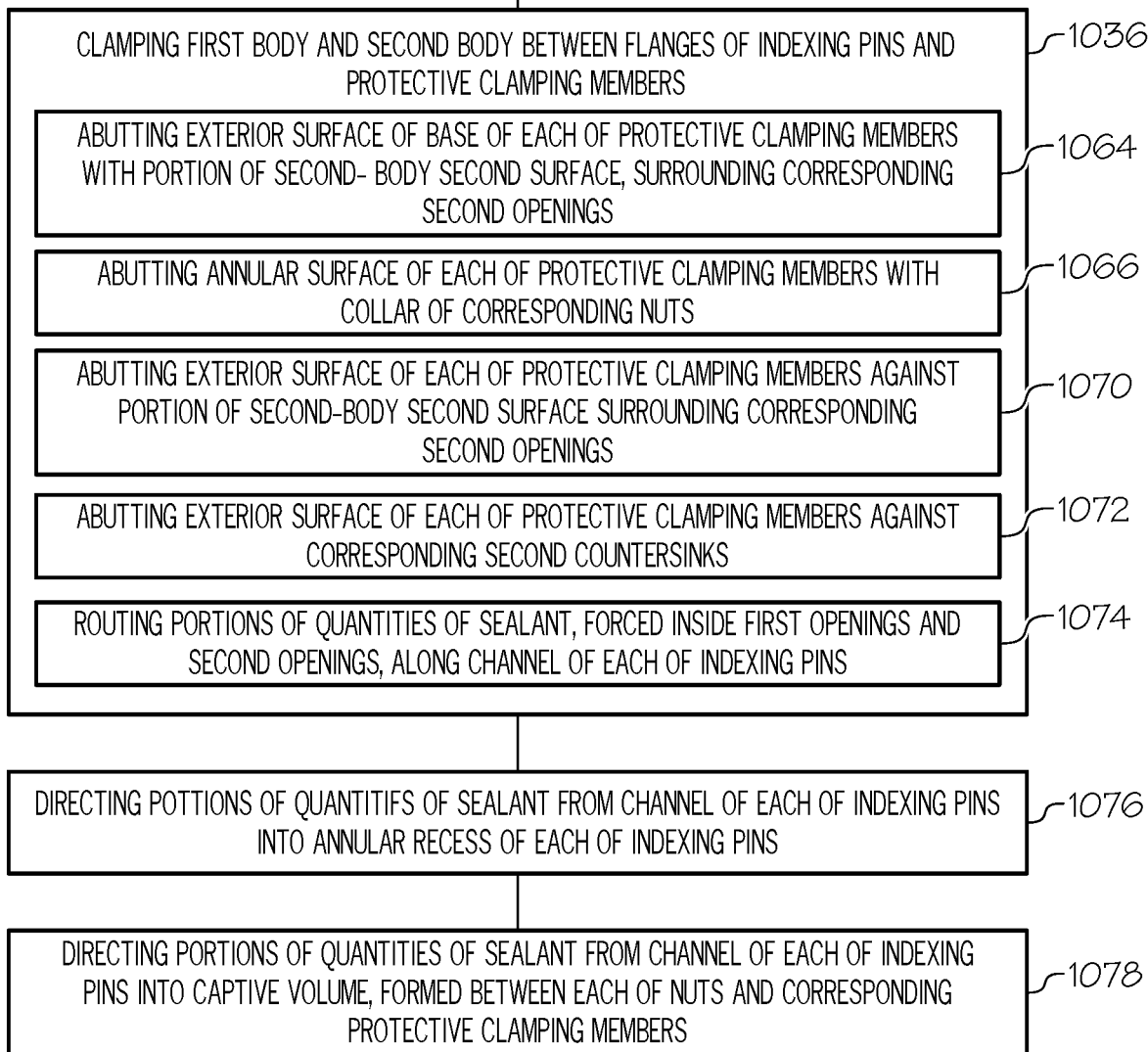
Figure 42A:
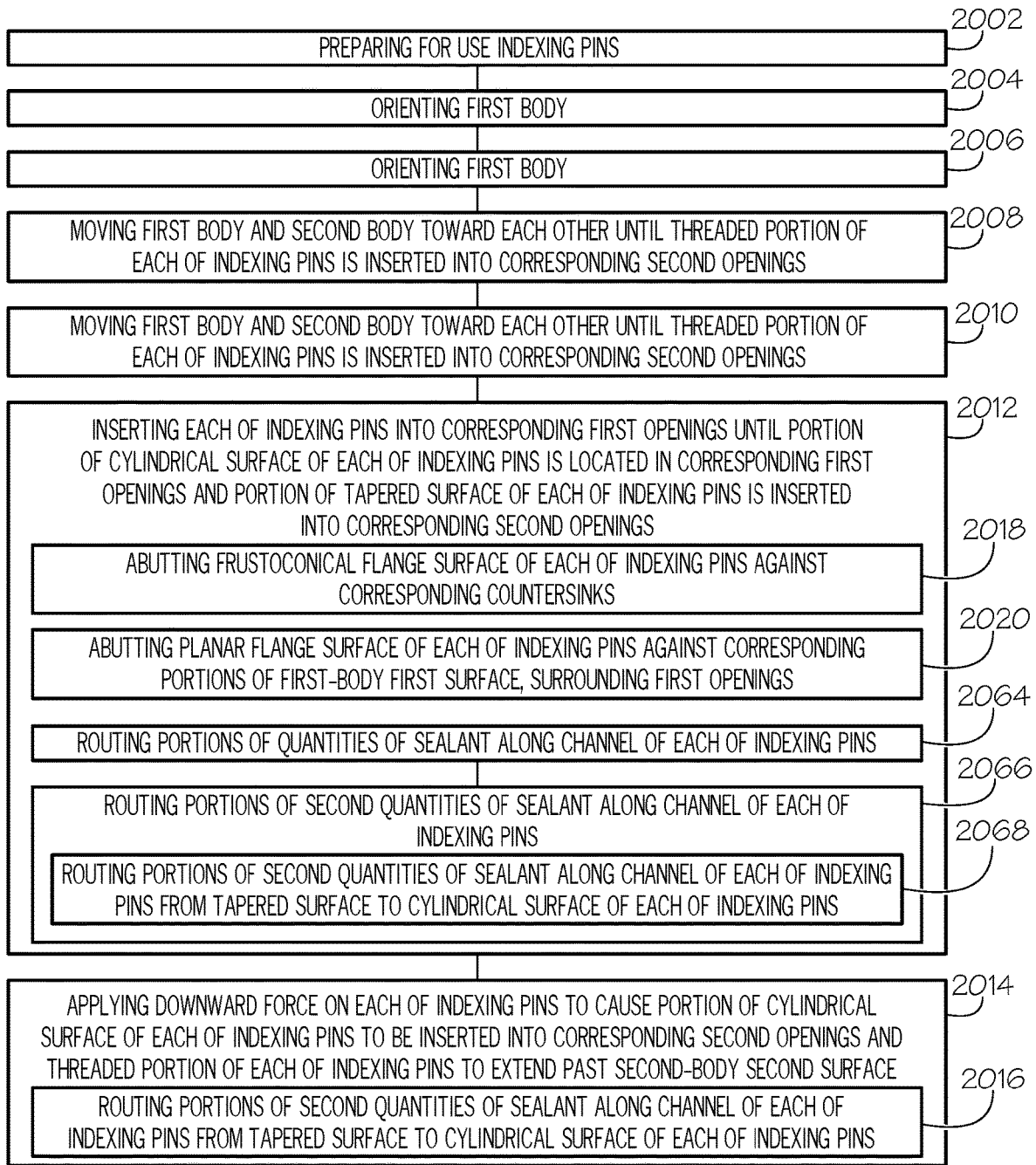
Figure 42B:
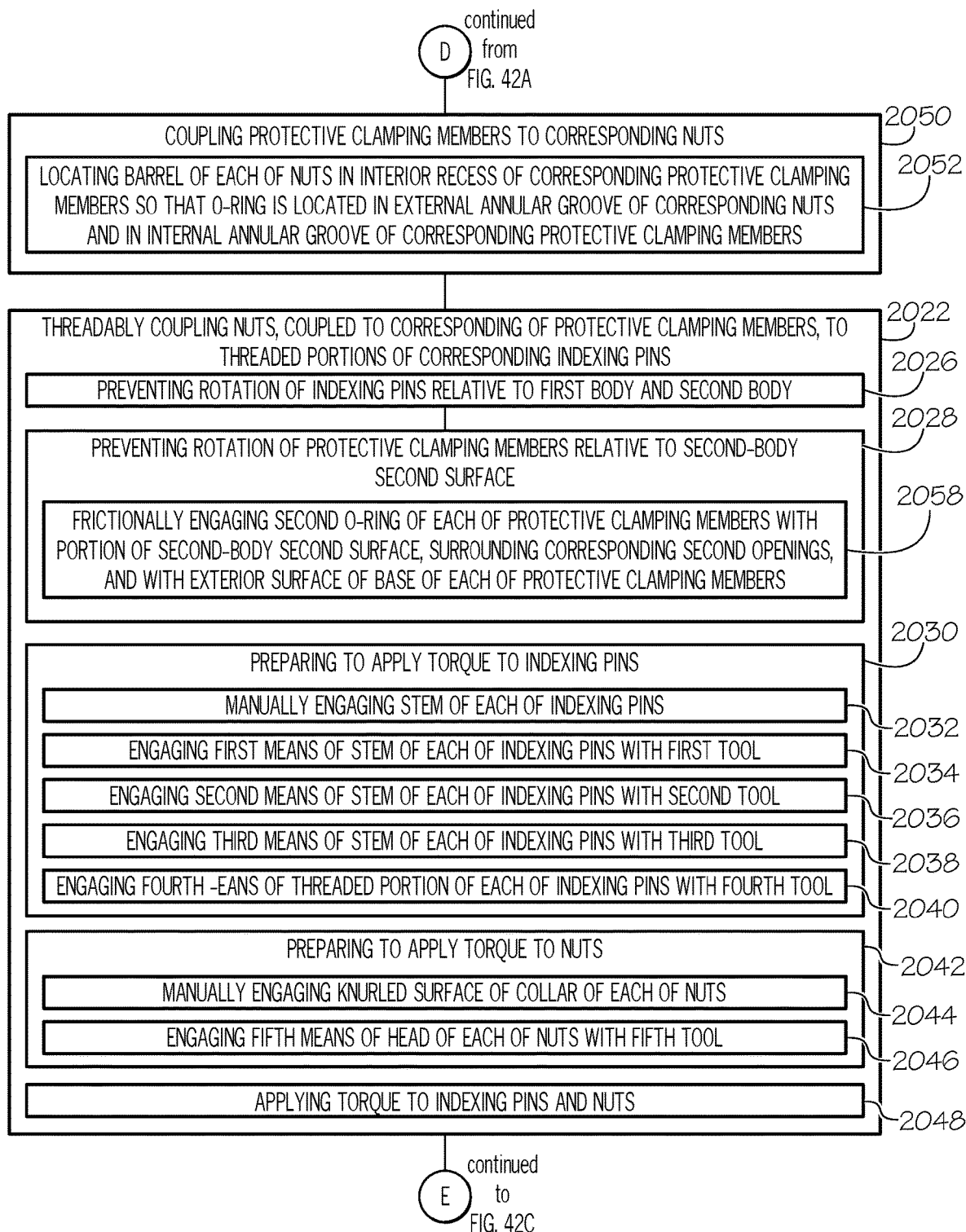
Figure 42C:
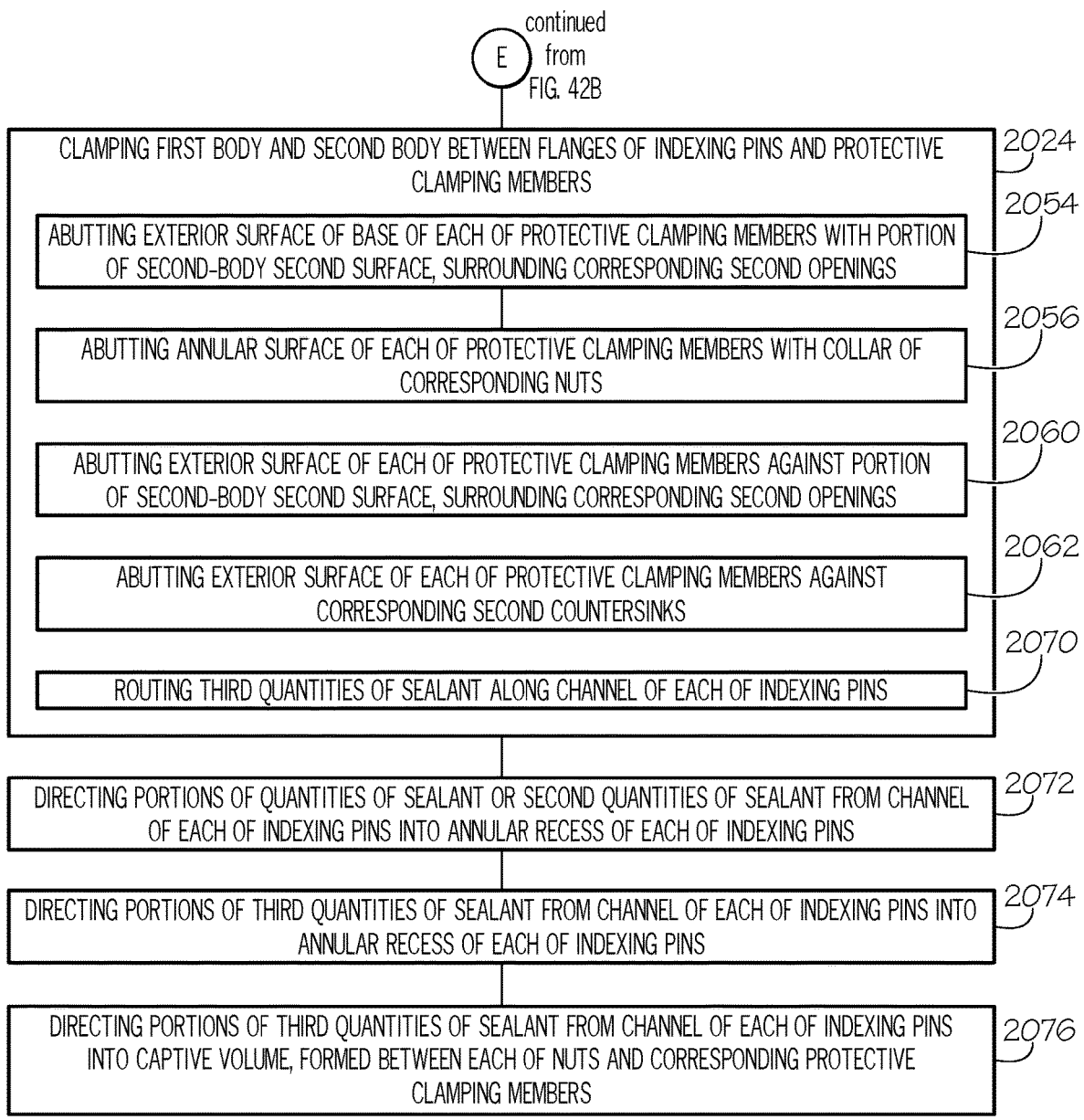
Figure 43:
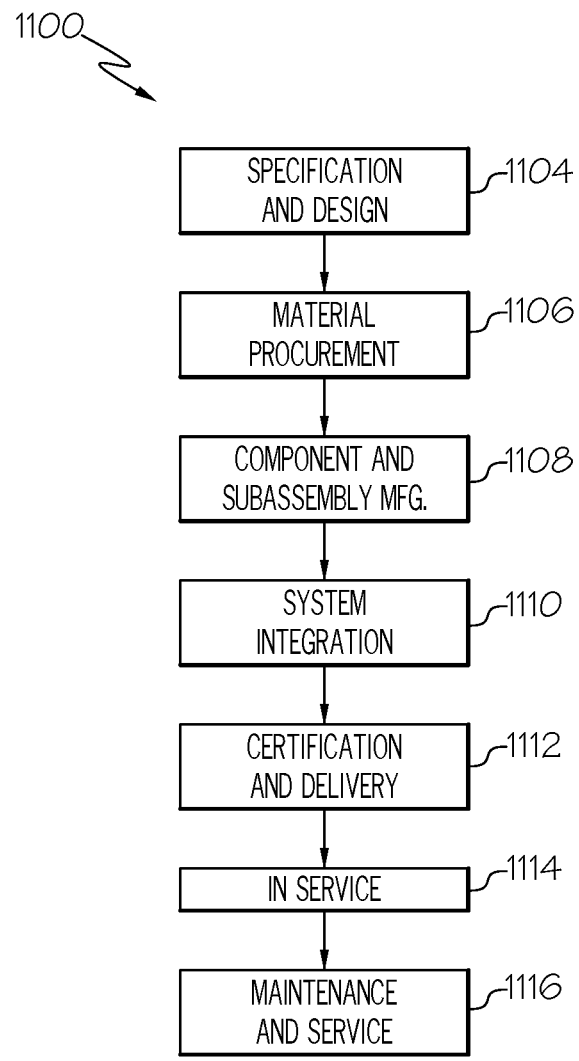

Having thus described one or more examples of the invention in general terms, reference will now be made to the accompanying drawings, which are not necessarily drawn to scale, and wherein like reference characters designate the same or similar parts throughout the several views, and wherein:

FIGS. 1A and 1B, collectively, are a block diagram of an indexing clamp, according to one or more examples of the present disclosure;

FIG. 2 is a schematic, perspective view of an indexing pin of the indexing clamp of FIGS. 1A and 1B, according to one or more examples of the present disclosure;

FIG. 3 is a schematic, elevational view of the indexing pin of the indexing clamp of FIGS. 1A and 1B, according to one or more examples of the present disclosure;

FIG. 4 is a schematic, elevational view of the indexing pin of the indexing clamp of FIGS. 1A and 1B, according to one or more examples of the present disclosure;

FIG. 5A is a schematic, perspective view of the indexing pin of the indexing clamp of FIGS. 1A and 1B, according to one or more examples of the present disclosure;

FIG. 5B is a schematic, perspective view of the indexing pin of the indexing clamp of FIGS. 1A and 1B, according to one or more examples of the present disclosure;

FIG. 6A is a schematic, perspective view of the indexing pin of the indexing clamp of FIGS. 1A and 1B, according to one or more examples of the present disclosure;

FIG. 6B is a schematic, perspective view of the indexing pin of the indexing clamp of FIGS. 1A and 1B, according to one or more examples of the present disclosure;

FIG. 7 is a schematic, top plan view of the indexing pin of the indexing clamp of FIGS. 1A and 1B, according to one or more examples of the present disclosure;

FIG. 8 is a schematic, bottom plan view of the indexing pin of the indexing clamp of FIGS. 1A and 1B, according to one or more examples of the present disclosure;

FIG. 9 is a schematic, partial, elevational view of the indexing pin of the indexing clamp of FIG. 8, according to one or more examples of the present disclosure;

FIG. 10 is a schematic, partial, elevational view of a sleeve, a cartridge, and an annular plunger of the apparatus of FIGS. 1A and 1B, according to one or more examples of the present disclosure;

FIG. 11 is a schematic, perspective view of the indexing clamp of FIGS. 1A and 1B, according to one or more examples of the present disclosure;

FIG. 12 is a schematic, elevation, environmental view of the indexing clamp of FIGS. 1A and 1B, according to one or more examples of the present disclosure;

FIG. 13 is a schematic, elevation, sectional view of a protective clamping member of the indexing clamp of FIGS. 1A and 1B, according to one or more examples of the present disclosure;

FIG. 14 is a schematic, partial, elevation, sectional view of the protective clamping member of the indexing clamp of FIGS. 1A and 1B, according to one or more examples of the present disclosure;

FIG. 15 is a schematic, elevation, sectional view of the protective clamping member of the indexing clamp of FIGS. 1A and 1B, according to one or more examples of the present disclosure;

FIG. 16 is a schematic, elevation, sectional view of the protective clamping member of the indexing clamp of FIGS. 1A and 1B, according to one or more examples of the present disclosure;

FIG. 17 is a schematic, elevation, section, environmental view of the indexing clamp of FIGS. 1A and 1B, according to one or more examples of the present disclosure;

FIG. 18 is a schematic, elevation, section, environmental view of the indexing clamp of FIGS. 1A and 1B, according to one or more examples of the present disclosure;

FIG. 19 is a schematic, elevation, section, environmental view of the indexing clamp of FIGS. 1A and 1B, according to one or more examples of the present disclosure;

FIG. 20 is a schematic, elevation, section, environmental view of the indexing clamp of FIGS. 1A and 1B, according to one or more examples of the present disclosure;

FIG. 21 is a schematic, elevation, environmental view of the indexing pin of the indexing clamp of FIGS. 1A and 1B, according to one or more examples of the present disclosure;

FIG. 22 is a schematic, elevation, environmental view of the indexing pin of the indexing clamp of FIGS. 1A and 1B, according to one or more examples of the present disclosure;

FIG. 23 is a schematic, elevation, environmental view of the indexing pin of the indexing clamp of FIGS. 1A and 1B, according to one or more examples of the present disclosure;

FIG. 24 is a schematic, elevation, environmental view of the indexing pin of the indexing clamp of FIGS. 1A and 1B, according to one or more examples of the present disclosure;

FIG. 25 is a schematic, elevation, environmental view of the indexing pin of the indexing clamp of FIGS. 1A and 1B, according to one or more examples of the present disclosure;

FIG. 26 is a schematic, elevation, environmental view of the indexing pin of the indexing clamp of FIGS. 1A and 1B, according to one or more examples of the present disclosure;

FIG. 27 is a schematic, elevation, environmental view of the indexing pin of the indexing clamp of FIGS. 1A and 1B, according to one or more examples of the present disclosure;

FIG. 28 is a schematic, elevation, environmental view of the indexing pin of the indexing clamp of FIGS. 1A and 1B, according to one or more examples of the present disclosure;

FIG. 29 is a schematic, elevation, environmental view of the indexing clamp of FIGS. 1A and 1B, according to one or more examples of the present disclosure;

FIG. 30 is a schematic, elevation, environmental view of the indexing clamp of FIGS. 1A and 1B, according to one or more examples of the present disclosure;

FIG. 31 is a schematic, elevation, environmental view of the indexing clamp of FIGS. 1A and 1B, according to one or more examples of the present disclosure;

FIG. 32 is a schematic, elevation, environmental view of the indexing pin of the indexing clamp of FIGS. 1A and 1B, according to one or more examples of the present disclosure;

FIG. 33 is a schematic, bottom plan, environmental view of the indexing pin of the indexing clamp of FIGS. 1A and 1B, according to one or more examples of the present disclosure;

FIG. 34 is a schematic, elevation, environmental view of the indexing pin of the indexing clamp of FIGS. 1A and 1B, according to one or more examples of the present disclosure;

FIG. 35 is a schematic, elevation, environmental view of the indexing pin of the indexing clamp of FIGS. 1A and 1B, according to one or more examples of the present disclosure;

FIG. 36 is a schematic, elevation, environmental view of the indexing pin of the indexing clamp of FIGS. 1A and 1B, according to one or more examples of the present disclosure;

FIG. 37 is a schematic, elevation, environmental view of the indexing pin of the indexing clamp of FIGS. 1A and 1B, according to one or more examples of the present disclosure;

FIG. 38 is a schematic, elevation, environmental view of the indexing pin of the indexing clamp of FIGS. 1A and 1B, according to one or more examples of the present disclosure;

FIG. 39 is a schematic, elevation, environmental view of the indexing pin of the indexing clamp of FIGS. 1A and 1B, according to one or more examples of the present disclosure;

FIG. 40 is a schematic, elevation, environmental view of the indexing pin of the indexing clamp of FIGS. 1A and 1B, according to one or more examples of the present disclosure;

FIGS. 41A, 41B, and 41C, collectively, are a block diagram of a method of aligning a first body and a second body of a structure utilizing the indexing clamp of FIGS. 1A and 1B, according to one or more examples of the present disclosure;

FIGS. 42A, 42B, and 42C, collectively, are a block diagram of a method of aligning a first body and a second body of a structure utilizing the indexing clamp of FIGS. 1A and 1B, according to one or more examples of the present disclosure;

FIG. 43 is a block diagram of aircraft production and service methodology; and

Figure 44:
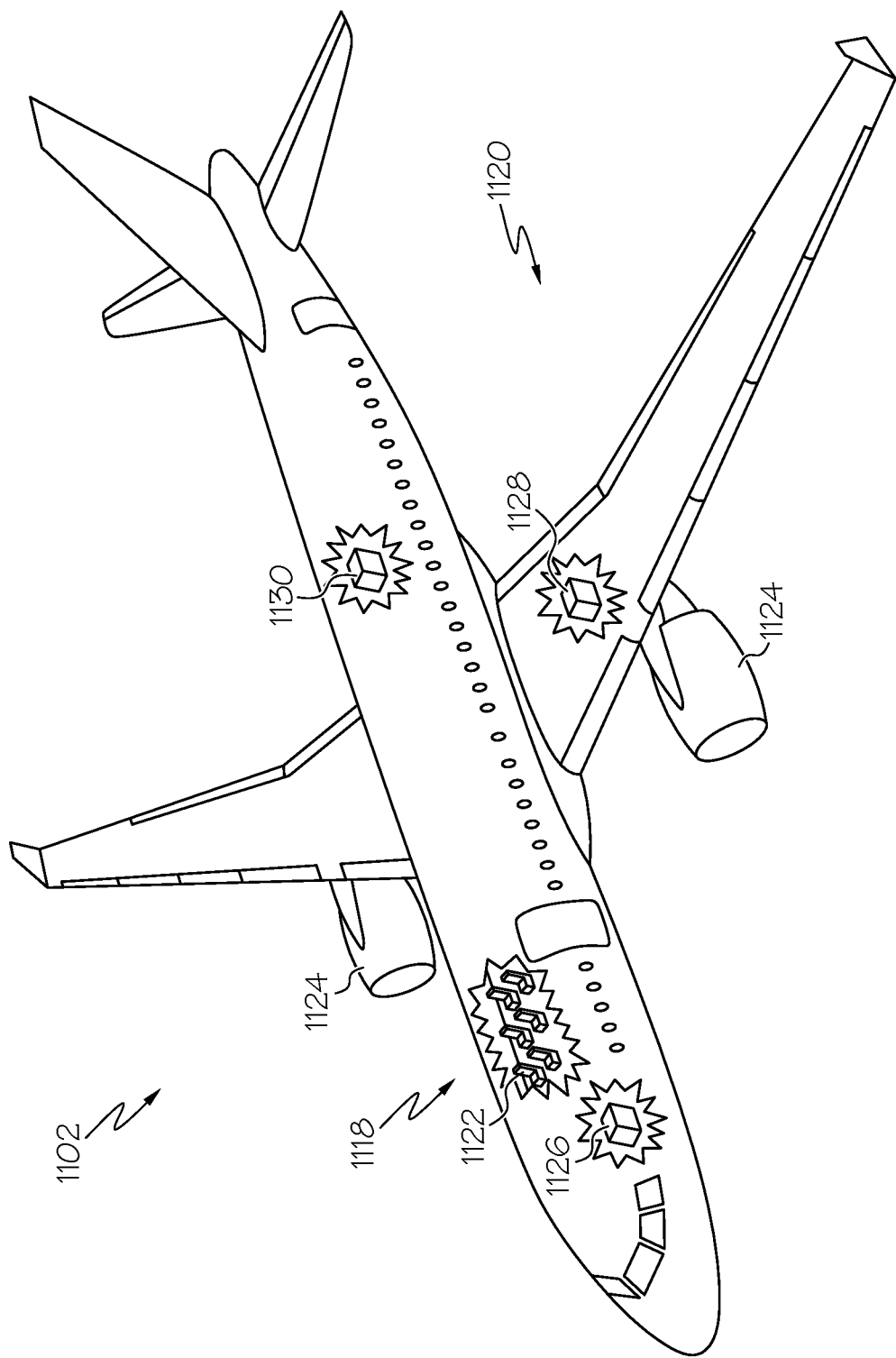

FIG. 44 is a schematic illustration of an aircraft.

DETAILED DESCRIPTION

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A and 1B may be combined in various ways without the need to include other features described in FIGS. 1A and 1B, other drawing figures, and/or the accompanying disclosure, even though such combination or combinations are not explicitly illustrated herein. Similarly, additional features not limited to the examples presented, may be combined with some or all of the features shown and described herein.

In FIGS. 41A-41C, 42A-42C, and 43, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 41A-41C, 42A-42C, and 43 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below Referring generally to FIGS. 1A and 1B and particularly to, e.g., FIGS. 2-10, 21-28, and 32-40, indexing pin 100 is disclosed. Indexing pin 100 comprises central axis 154 and threaded portion 126, extending along central axis 154. Indexing pin 100 also comprises stem 148, extending along central axis 154 opposite threaded portion 126. Indexing pin 100 further comprises cylindrical surface 104, extending along central axis 154 between threaded portion 126 and stem 148. Indexing pin 100 additionally comprises tapered surface 112, extending between threaded portion 126 and cylindrical surface 104. Indexing pin 100 further comprises flange 136, located between stem 148 and cylindrical surface 104. The preceding subject matter of this paragraph characterizes example 1 of the present disclosure.

Indexing pin 100 aligns first body 302 of structure 300 and second body 304 of structure 300 by urging alignment of first openings 306 of first body 302 with second openings 308 of second body 304 when indexing pin 100 is inserted through one of first openings 306 and corresponding one of second openings 308.

For the purpose of this disclosure, the term "along," in reference to extending along an axis, means coincident with or parallel to that axis.

For the purpose of the present disclosure, the phrase "one of first openings 306 and corresponding one of second openings 308" refers to one of first openings 306 and one of second openings 308 that correspond to each other and indexing pin 100 and that are to be aligned with each other for insertion of indexing pin 100 when positioning and aligning first body 302 and second body 304 relative to each other.

Referring generally to FIGS. 1A and 1B and particularly to FIGS. 12,17-28 and 32-40, according to the examples disclosed herein, structure 300 includes first body 302 and second body 304. First body 302 includes first-body first surface 330 and first-body second surface 334 that is opposite first-body first surface 330. First openings 306 extend, inclusively, between first-body first surface 330 and first-body second surface 334. In other words, first openings 306 extend through first body 302. Second body 304 includes second-body first surface 332 and second-body second surface 336 that is opposite second-body first surface 332. Second openings 308 extend, inclusively, between second-body first surface 332 and second-body second surface 336. In other words, second openings 308 extend through second body 304.

As illustrated in FIGS. 21-28 and 32-40, alignment of structure 300 is achieved by properly aligning first openings 306 and second openings 308 relative to each other when first body 302 and second body 304 are located relative to each other, such as in a stacked configuration with first-body second surface 334 of first body 302 in contact with second-body first surface 332 of second body 304.

In one or more examples, first body 302 and second body 304 include, or are formed from, a composite material, such as a fiber-reinforced polymer composite. In one or more examples, first body 302 and second body 304 include, or are formed from, a metallic material. In one or more examples, first body 302 and second body 304 include, or are formed from, a plastic material, such as a thermoplastic.

In one or more examples, structure 300 is, or forms a portion of, a sub-structure or component of a larger manufactured structure or assembly. In one or more examples, structure 300 is, or forms a portion of, a vehicle structure, such as an aerospace vehicle, a space vehicle, a marine vehicle, a land vehicle, or the like. In one or more examples, structure 300 is, or forms a portion of, a stand-alone structure, such as a building, an antenna, a satellite, a rocket, or the like.

In one or more examples, during assembly of structure 300, first body 302 and second body 304 are initially arranged in a stacked configuration, also referred to herein as a stack. First openings 306 and second openings 308 are machined (e.g., drilled) through the arranged stack of first body 302 and second body 304. Following formation of first openings 306 and second openings 308, first body 302 and second body 304 are separated so that one or more finishing operations can be performed on first body 302 and/or second body 304. An example of such finishing operations includes a deburring process that removes unwanted material from first body 302 and second body 304, such as removal of material surrounding first openings 306 and second openings 308, respectively. Removal of such unwanted material may mitigate undesirable electromagnetic environmental effects (EME) on structure 300 during use of structure 300, such as effects from static electric discharge and lighting strike. Mitigation of undesirable EME may be particularly beneficial when structure 300 is an aerospace application.

As illustrated in FIGS. 21-40, according to the examples disclosed herein, indexing pin 100 enables realignment of first openings 306 and second openings 308 when rearranging first body 302 and second body 304 back into a stacked configuration for final assembly of structure 300. In one or more examples, final assembly of structure 300 includes installation of fasteners through aligned ones of first openings 306 and second openings 308, structural bonding of first body 302 and second body 304, and the like.

As illustrated in FIGS. 21-28, in one or more examples, with indexing pin 100 located within one of first openings 306, indexing pin 100 urges alignment of one of first openings 306 and corresponding one of second openings 308 when first body 302 and second body 304 are moved toward each other, while inserting indexing pin 100 through corresponding one of second openings 308 until first-body second surface 334 contacts second-body first surface 332.

As illustrated in FIGS. 32-40, in one or more examples, with first-body second surface 334 in contact with second-body first surface 332, indexing pin 100 urges alignment of first openings 306 and second openings 308 when indexing pin 100 is inserted through one of first openings 306 and corresponding one of second openings 308.

Accordingly, a plurality of indexing pins 100 can be used to urge alignment of selected ones of first openings 306 and selected corresponding ones of second openings 308. Upon alignment of selected ones of first openings 306 with selected corresponding ones of second openings 308 using indexing pins 100, non-selected ones of first openings 306 will be aligned with non-selected corresponding ones of second openings 308 so that first body 302 and second body 304 are properly aligned for final assembly, such as installation of fasteners.

Advantageously, with all of first openings 306 of first body 302 aligned with all of corresponding ones of second openings 308 of second body 304, fasteners can be installed, for example, by inserting each one of fasteners through one of first openings 306 and corresponding one of second openings 308, without damaging first body 302 and/or second body 304. Beneficially, the ability to install fasteners in properly pre-aligned ones of first openings 306 and corresponding ones of second openings 308 eliminates the need for fastener sleeves, which reduces the processing time and cost of manufacturing structure 300 and reduces the overall weight of structure 300.

As illustrated in FIGS. 2-6B, cylindrical surface 104 forms or otherwise defines a main shaft or shank portion of indexing pin 100 that extends along central axis 154 of indexing pin 100 between stem 148 and threaded portion 126. In one or more examples, the cylindrical surface 104 extends between flange 136 and tapered surface 112. Cylindrical surface 104 has a circular cross-sectional shape in a plane, perpendicular to central axis 154 of indexing pin 100. Cylindrical surface 104 has a diameter that is constant along its length.

For the purpose of the present disclosure, a "plane" used to reference locations, orientations, and/or shapes of features and elements refers to a virtual reference plane, having the attributes of an entity without possessing its physical form. For example, a virtual reference plane is an intangible or imaginary plane, rather than a physical one, with respect to which, e.g., location, orientation, and/or shape of other physical and/or intangible entities may be defined.

As illustrated in FIGS. 21-28 and 34-40, cylindrical surface 104 provides, or serves as, an indexing surface that contacts portion of first wall 310 of one of first openings 306 when indexing pin 100 is inserted in, or through, one of first openings 306. Similarly, cylindrical surface 104 provides, or serves as, an indexing surface that contacts portion of second wall 312 of corresponding one of second openings 308 when indexing pin 100 is inserted in, or through, corresponding one of second openings 308 to urge a position change in at least one of first body 302 and second body 304 relative to each other during alignment of one of first openings 306 and corresponding one of second openings 308 through which indexing pin 100 is inserted.

As illustrated in FIGS. 2-6B, tapered surface 112 forms or otherwise defines a lead-in portion of indexing pin 100 that extends along central axis 154 of indexing pin 100 between cylindrical surface 104 and threaded portion 126. Tapered surface 112 has a circular cross-sectional shape in a plane, perpendicular to central axis 154 of indexing pin 100. Tapered surface 112 has a diameter that varies along its length.

As illustrated in FIGS. 32 and 33, when indexing pin 100 is inserted in one of first openings 306, tapered surface 112 enables indexing pin 100 to enter one of first openings 306 without imparting an impact load on first body 302, such as on an edge of first-body first surface 330, defining portion of corresponding one of first openings 306. As illustrated in FIGS. 22, 27, 35, 38, and 39, when indexing pin 100 is inserted in one of second openings 308, tapered surface 112 enables indexing pin 100 to enter one of second openings 308 without imparting an impact load on second body 304, such as an edge of second-body first surface 332, defining portion of corresponding one of second openings 308.

As illustrated in FIGS. 2-6B, stem 148 forms or otherwise defines an operator-engagement portion of indexing pin 100 that extends along central axis 154 opposite to threaded portion 126. In one or more examples, stem 148 extends from flange 136 opposite cylindrical surface 104. In one or more examples, engagement of stem 148, for example, via an operator, prevents rotation of indexing pin 100 about central axis 154. In one or more examples, engagement of stem 148, for example, via the operator, enables extraction of indexing pin 100 from one of first openings 306 and corresponding one of second openings 308, for example, following alignment of structure 300.

As illustrated in FIGS. 2-6B, threaded portion 126 forms or otherwise defines a nut-engagement portion of indexing pin 100 that extends along central axis 154 opposite to cylindrical surface 104. In one or more examples, threaded portion 126 extends from tapered surface 112 opposite cylindrical surface 104. Threaded portion 126 has a circular cross-sectional shape in a plane, perpendicular to central axis 154 of indexing pin 100. Threaded surface 126 has a diameter that is constant along its length. Threaded portion 126 includes external thread.

As illustrated in FIGS. 11, 12, and 29-31, threaded portion 126 enables nut 204 to be removably coupled to indexing pin 100 so that first body 302 and second body 304 are clamped together between indexing pin 100 and nut 204, for example, following alignment of structure 300 with indexing pin 100.

Referring generally to FIGS. 1A and 1B and particularly to, e.g., FIGS. 2_6B, stem 148 comprises first means 156 for providing complementary engagement with a first tool. The preceding subject matter of this paragraph characterizes example 2 of the present disclosure, wherein example 2 also includes the subject matter according to example 1, above.

First means 156 enables use of the first tool (not shown) to engage indexing pin 100 and to remove indexing pin 100 and/or to prevent rotation of indexing pin 100 about central axis 154.

In one or more examples, complementary engagement of the first tool with first means 156 enables indexing pin 100 to be removed from one of first openings 306 and corresponding one of second openings 308, for example, following alignment of structure 300. In one or more examples, complementary engagement of the first tool with first means 156 prevents rotation of indexing pin 100 about central axis 154 at second end 152 (FIG. 2) of indexing pin 100, for example, when threadably coupling nut 204 (FIG. 11) with threaded portion 126.

Generally, first means 156 includes, or takes the form of, any structural feature that provides complementary engagement with the first tool and the first tool includes, or takes the form of, any implement or instrument that engages the particular structural feature corresponding to first means 156 and that enables manipulation of indexing pin 100. In one or more examples, first means 156 is an aperture, formed in and extending partially through stem 148, and the first tool is a pin or other shafted element, configured to be inserted in the aperture. In one or more examples, first means 156 is at least one recess or slot formed in and extending partially through stem 148, and the first tool is an edged element, configured to matingly engage at least the one recess or slot. In one or more examples, first means 156 is a through hole, formed in and extending completely through stem 148, and the first tool is a pin or elongated shaft, configured to be inserted through the through hole.

Referring generally to FIGS. 1A and 1B and particularly to, e.g., FIGS. 3-6B, stem 148 comprises second means 192 for providing complementary engagement with a second tool. The preceding subject matter of this paragraph characterizes example 3 of the present disclosure, wherein example 3 also includes the subject matter according to example 1 or 2, above.

Second means 192 enables use of the second tool (not shown) to engage indexing pin 100 and prevent rotation of indexing pin 100 about central axis 154.

In one or more examples, complementary engagement of the second tool with second means 192 prevents rotation of indexing pin 100 about central axis 154 at second end 152 (FIG. 2) of indexing pin 100, for example, when threadably coupling nut 204 (FIG. 11) with threaded portion 126.

Generally, second means 192 includes, or takes the form of, any structural feature that provides complementary engagement with the second tool and the second tool includes, or takes the form of, any implement or instrument that engages the particular structural feature corresponding to second means 192 and that enables manipulation of indexing pin 100. In one or more examples, second means 192 is different than first means 156 and the second tool is different than the first tool. In one or more examples, second means 192 includes a polygon structure, or head with a plurality of planar sides, that forms at least portion of stem 148 and has a polygonal cross-sectional shape in a plane, perpendicular to central axis 154, and the second tool is a wrench, having a polygonal socket or pliers. In one or more examples, as illustrated in FIGS. 5A-6B, second means 192 is a hexagonal head (e.g., a six-sided head) that forms at least portion of stem 148, and the second tool is a wrench, having a hexagonal socket or pliers, configured to engage the hexagonal head in a complementary manner. In one or more examples, second means 192 is a square head (e.g., a four-sided head) that forms at least portion of stem 148 and the second tool is a wrench, having a square socket or pliers configured to engage the square head in a complementary manner.

Referring generally to FIGS. 1A and 1B and particularly to, e.g., FIG. 7, stem 148 comprises third means 194 for providing complementary engagement with a third tool. The preceding subject matter of this paragraph characterizes example 4 of the present disclosure, wherein example 4 also includes the subject matter according to any one of examples 1 to 3, above.

Third means 194 enables use of the third tool (not shown) to engage indexing pin 100 and prevent rotation of indexing pin 100 about central axis 154.

In one or more examples, complementary engagement of the third tool with third means 194 prevents rotation of indexing pin 100 about central axis 154 at second end 152 (FIG. 2) of indexing pin 100, for example, when threadably coupling nut 204 (FIG. 11) with threaded portion 126.

Generally, third means 194 includes, or takes the form of, any structural feature that provides complementary engagement with the third tool, and the third tool includes, or takes the form of, any implement or instrument that engages the particular structural feature, corresponding to third means 194 and that enables manipulation of indexing pin 100. In one or more examples, third means 194 is different than first means 156 and second means 192 and the third tool is different than the first tool and the second tool. In one or more examples, third means 194 is a shaped drive cavity, or socket, formed in and extending partially through an end of stem 148, and the third tool is a driver, having a working end configured to engage the shaped drive cavity in a complementary manner. Examples of the shaped drive cavity include slotted cavities (e.g., slot or cross), cruciform cavities (e.g., Phillips, Mortorq, Frearson, Pozidriv, French, Supadriv, Torq), internal polygon cavities (e.g., square, security hex, Robertson, double-square, hex, triple-square, 12-point, 12-spline flange, Allen, double hex), hexalobular (e.g., Torx, security Torx, line head male, line head female, polydrive), three-pointed cavities (e.g., TA or triangle-shaped, tri-groove or T-groove, tri-point, tri-wing), or special cavities (e.g., clutch A, Quadrex, clutch G, Pentalobe, one-way, spanner head, Bristol).

Referring generally to FIGS. 1A and 1B and particularly to, e.g., FIGS. 9 and 10, tapered surface 112 has taper angle 158 that is between two degrees and ten degrees, inclusively, relative to central axis 154. The preceding subject matter of this paragraph characterizes example 5 of the present disclosure, wherein example 5 also includes the subject matter according to any one of examples 1 to 4, above.

Taper angle 158 of tapered surface 112 provides a mechanical advantage to indexing pin 100 when inserting indexing pin 100 in one of second openings 308.

As illustrated in FIGS. 22, 27, 35, 38, and 39, when a downward force is applied to indexing pin 100 sufficient to insert indexing pin 100 into one of second openings 308, taper angle 158 of tapered surface 112 facilitates sliding insertion of indexing pin 100 into corresponding one of second openings 308 while moving one of first body 302 and second body 304 relative to each other in a direction, perpendicular to central axis 154 of indexing pin 100. With portion of cylindrical surface 104 of indexing pin 100 located in one of first openings 306 and at least portion of tapered surface 112 located within corresponding one of second openings 308, movement of one of first body 302 and second body 304 relative to each other in the direction, perpendicular to central axis 154 of indexing pin 100, properly locates corresponding one of second openings 308 for insertion of portion of cylindrical surface 104.

Taper angle 158 can be optimized based on various factors, such as a desired mechanical advantage, a desired longitudinal dimension (i.e., length) of tapered surface 112, a magnitude of the downward force, applied to indexing pin 100, and a material composition of first body 302 and/or second body 304. In one or more examples, taper angle 158 of between two degrees and ten degrees, such as two degrees, optimizes the mechanical advantage of tapered surface 112 while minimizing the longitudinal dimension of tapered surface 112.

Referring generally to FIGS. 1A and 1B and particularly to, e.g., FIGS. 9 and 10, tapered surface 112 has maximum tapered-surface diameter 122 and minimum tapered-surface diameter 124. Threaded portion 126 has maximum threaded-portion diameter 132. Cylindrical surface 104 has cylindrical-surface diameter 128. Maximum tapered-surface diameter 122 is equal to cylindrical-surface diameter 128. Minimum tapered-surface diameter 124 is equal to or less than maximum threaded-portion diameter 132. The preceding subject matter of this paragraph characterizes example 6 of the present disclosure, wherein example 6 also includes the subject matter according to any one of examples 1 to 5, above.

The relative diameters of tapered surface 112 and threaded portion 126 enable threaded portion 126 to be located within one of second openings 308 when at least portion of tapered surface 112 is inserted into, or is located in, one of second openings 308.

For the purpose of this disclosure, maximum threaded-portion diameter 132 is a major diameter of threads of threaded portion 126.

As illustrated in FIGS. 9, 10, and 32-35, with portion of cylindrical surface 104 of indexing pin 100 located in one of first openings 306 and at least portion of tapered surface 112 in contact with an edge, formed by second wall 312 and second-body first surface 332 that defines portion of corresponding one of second openings 308, maximum threaded-portion diameter 132 being less than minimum tapered-surface diameter 124 enables threaded portion 126, in plan view, to be completely surrounded by second wall 312 (FIG. 33) of corresponding one of second openings 308 without touching second wall 312.

Referring generally to FIGS. 1A and 1B and particularly to, e.g., FIG. 9, tapered surface 112 extends from cylindrical surface 104 to threaded portion 126. The preceding subject matter of this paragraph characterizes example 7 of the present disclosure, wherein example 7 also includes the subject matter according to example 6, above.

Terminating tapered surface 112 at threaded portion 126 provides a continuous transition between threaded portion 126 and tapered surface 112 of indexing pin 100.

A continuous transition between tapered surface 112 and threaded portion 126 prevents interference from any portion of indexing pin 100, located between threaded portion 126 and tapered surface 112, due to contact with the edge, formed by second wall 312 and second-body first surface 332, defining portion of corresponding one of second openings 308, when indexing pin 100 is inserted into one of second openings 308.

Referring generally to FIGS. 1A and 1B and particularly to, e.g., FIG. 10, indexing pin 100 further comprises corner surface 180, extending from tapered surface 112 to threaded portion 126. Corner surface 180 is annular and has curvilinear cross-section in plane, containing central axis 154. Tapered surface 112 has maximum tapered-surface diameter 122 and minimum tapered-surface diameter 124. Threaded portion 126 has maximum threaded-portion diameter 132. Cylindrical surface 104 has cylindrical-surface diameter 128. Maximum tapered-surface diameter 122 is equal to cylindrical-surface diameter 128. Minimum tapered-surface diameter 124 is greater than maximum threaded-portion diameter 132. The preceding subject matter of this paragraph characterizes example 8 of the present disclosure, wherein example 8 also includes the subject matter according to any one of examples 1 to 7, above.

Corner surface 180 provides a transition between threaded portion 126 and tapered surface 112 of indexing pin 100 that limits linear movement of nut 204 along central axis 154 relative to indexing pin 100 when nut 204 is threadably coupled to threaded portion 126.

Corner surface 180 defines the transition between threaded portion 126 and tapered surface 112 of indexing pin 100. Corner surface 180 being annular and having curvilinear cross-section in plane, containing central axis 154, enables the edge, formed by second wall 312 and second-body first surface 332, defining portion of corresponding one of second openings 308, to move to tapered surface 112 when indexing pin 100 is inserted into one of second openings 308.

Minimum tapered-surface diameter 124, defined by corner surface 180, being greater than maximum threaded-portion diameter 132 limits linear movement of nut 204 along central axis 154 relative to indexing pin 100. When preloading nut 204 by threadably coupling nut 204 with threaded portion 126 to clamp first body 302 and second body 304 between indexing pin 100 and nut 204, limiting the linear movement of nut 204 along central axis 154 relative to indexing pin 100 prevents nut 204 from binding to an end of tapered surface 112 at the transition between threaded portion 126 and tapered surface 112, for example, upon over tightening of nut 204.

Referring generally to FIGS. 1A and 1B and particularly to, e.g., FIGS. 2-6B, 17-28, 36, and 40, flange 136 comprises frustoconical flange surface 162, located between stem 148 and cylindrical surface 104. Flange 136 further comprises planar flange surface 160, extending from frustoconical flange surface 162 to cylindrical surface 104, perpendicular to central axis 154. The preceding subject matter of this paragraph characterizes example 9 of the present disclosure, wherein example 9 also includes the subject matter according to any one of examples 1 to 8, above.

Frustoconical flange surface 162 and planar flange surface 160 enable flange 136 to contact portion of first-body first surface 330 that surrounds corresponding one of first openings 306 when indexing pin 100 is fully inserted in corresponding one of first openings 306.

As illustrated in FIGS. 21-24, 32, and 33-36, in one or more examples, portion of first-body first surface 330 surrounding corresponding one of first openings 306 is planar. As illustrated in FIGS. 21 and 36, in one or more examples, with portion of cylindrical surface 104 of indexing pin 100 located within one of first openings 306, planar flange surface 160 enables flange 136 of indexing pin 100 to rest on portion of first-body first surface 330, surrounding corresponding one of first openings 306, that is planar. In other words, planar flange surface 160 of flange 136 provides a protrusion head design for indexing pin 100. In one or more examples, planar flange surface 160 extends perpendicular to central axis 154 between frustoconical flange surface 162 and cylindrical surface 104.

As illustrated in FIGS. 25-28 and 37-40, in one or more examples, portion of first-body first surface 330 surrounding corresponding one of first openings 306 includes countersink 320. As illustrated in FIGS. 25 and 40, in one or more examples, with portion of cylindrical surface 104 of indexing pin 100 located within one of first openings 306, frustoconical flange surface 162 enables flange 136 to be received within countersink 320 of corresponding one of first openings 306 and to rest on portion of first-body first surface 330 surrounding corresponding one of first openings 306. In other words, frustoconical flange surface 162 of flange 136 provides a countersunk head design for indexing pin 100.

Frustoconical flange surface 162 of flange 136 also centers indexing pin 100 within corresponding one of first openings 306. As illustrated in FIGS. 25-28 and 37-40, with portion of cylindrical surface 104 of indexing pin 100 located within one of first openings 306, frustoconical flange surface 162 of flange 136 also provides a secondary indexing surface that engages portion of first-body first surface 330 that defines countersink 320 to center indexing pin 100 relative to corresponding one of first openings 306. In other words, with frustoconical flange surface 162 properly seated in countersink 320, indexing pin 100 is centered within corresponding one of first openings 306. Engagement of frustoconical flange surface 162 with countersink 320 coaxially aligns center axis 154 of indexing pin 100 with fourth central axis 338 of corresponding one of first openings 306.

Frustoconical flange surface 162 of flange 136 also prevents indexing pin 100 from moving, transverse to fourth central axis 338 of corresponding one of first openings 306, when indexing pin 100 is being inserted into corresponding one of second openings 308.

Referring generally to FIGS. 1A and 1B and particularly to, e.g., FIG. 4, frustoconical flange surface 162 has maximum frustoconical-flange-surface diameter 144 and minimum frustoconical-flange-surface diameter 142. Planar flange surface 160 has maximum planar-flange-surface diameter 138, equal to minimum frustoconical-flange-surface diameter 142. Cylindrical surface 104 has cylindrical-surface diameter 128. Maximum frustoconical-flange-surface diameter 144 is greater than cylindrical-surface diameter 128. Minimum frustoconical-flange-surface diameter 142 is greater than cylindrical-surface diameter 128. The preceding subject matter of this paragraph characterizes example 10 of the present disclosure, wherein example 10 also includes the subject matter according to example 9, above.

The relative diameters of frustoconical flange surface 162 and planar flange surface 160 enable use of indexing pin 100 with different configurations of first body 302 having different types of first openings 306.

As illustrated in FIGS. 17, 20-24, 32, 34-36, in one or more examples, planar flange surface 160 enable use of indexing pin 100 with first body 302 that includes portion of first-body first surface 330 surrounding corresponding one of first openings 306 that is planar. As illustrated in FIGS. 18, 19, 25-28 and 37-40, in one or more examples, planar flange surface 160 enable use of indexing pin 100 with first body 302 that includes portion of first-body first surface 330 surrounding corresponding one of first openings 306 that includes countersink 320.

Referring generally to FIGS. 1A and 1B and particularly to, e.g., FIG. 4, frustoconical flange surface 162 extends from stem 148 to planar flange surface 160. Stem 148 has stem dimension 178, measured perpendicularly to central axis 154. Stem dimension 178 is equal to maximum frustoconical-flange-surface diameter 144. The preceding subject matter of this paragraph characterizes example 11 of the present disclosure, wherein example 11 also includes the subject matter according to example 10, above.

Increasing stem dimension 178 of stem 148 to be equal to maximum frustoconical-flange-surface diameter 144 of flange 136 increases the structural rigidity of stem 148.

In one or more examples, increasing the structural rigidity and strength of stem 148 by increasing stem dimension 178 corresponds to an increase in the load-bearing capacity of first means 156 of stem 148 when engaged by the first tool. In one or more examples, increasing the structural rigidity and strength of stem 148 by increasing stem dimension 178 corresponds to an increase in the load-bearing capacity of second means 192 of stem 148 when engaged by the second tool.

Referring generally to FIGS. 1A and 1B and particularly to, e.g., FIGS. 5A-6B and 8, threaded portion 126 comprises fourth means 166 for providing complementary engagement with fourth tool. The preceding subject matter of this paragraph characterizes example 12 of the present disclosure, wherein example 12 also includes the subject matter according to any one of examples 1 to 11, above.

Fourth means 166 enables use of fourth tool (not shown) to engage indexing pin 100 and prevent rotation of indexing pin 100 about central axis 154.

In one or more examples, complementary engagement of fourth tool with fourth means 166 prevents rotation of indexing pin 100 about central axis 154 at first end 150 (FIG. 2) of indexing pin 100, for example, when threadably coupling nut 204 (FIG. 11) with threaded portion 126.

Generally, fourth means 166 includes, or takes the form of, any structural feature that provides complementary engagement with fourth tool and the third tool includes, or takes the form of, any implement or instrument that engages the particular structural feature corresponding to fourth means 166 and that enables manipulation of indexing pin 100. In one or more examples, fourth means 166 is different than first means 156, second means 192, and third means 194 and fourth tool is different than the first tool, the second tool, and the third tool. In one or more examples, fourth means 166 is the same as third means 194 and fourth tool is the same as the third tool. In one or more examples, fourth means 166 is a shaped drive cavity, or socket, formed in and extending partially through an end of threaded portion 126, and fourth tool is a driver, having a working end configured to engage the shaped drive cavity in a complementary manner. Examples of the shaped drive cavity include slotted cavities (e.g., slot or cross), cruciform cavities (e.g., Phillips, Mortorq, Frearson, Pozidriv, French, Supadriv, Torq), internal polygon cavities (e.g., square, security hex, Robertson, double-square, hex, triple-square, 12-point, 12-spline flange, Allen, double hex), hexalobular (e.g., Torx, security Torx, line head male, line head female, polydrive), three-pointed cavities (e.g., TA or triangle-shaped, tri-groove or T-groove, tri-point, tri-wing), or special cavities (e.g., clutch A, Quadrex, clutch G, Pentalobe, one-way, spanner head, Bristol).

Referring generally to FIGS. 1A and 1B and particularly to, e.g., FIGS. 5A, 6A, and 20, indexing pin 100 further comprises channel 172, formed in at least portion of cylindrical surface 104 and extending helically about central axis 154. The preceding subject matter of this paragraph characterizes example 13 of the present disclosure, wherein example 13 also includes the subject matter according to any one of examples 1 to 12, above.

Channel 172 collects portion of quantities of sealant 328 located within one of first openings 306 and corresponding one of second openings 308 when indexing pin 100 is inserted in one of first openings 306 and corresponding one of second openings 308.

In one or more examples, portion of quantities of sealant 328, located within one of first openings 306 and corresponding one of second openings 308, is routed along channel 172 when indexing pin is inserted in one of first openings 306 and corresponding one of second openings 308 and/or when first body 302 and second body 304 are clamped together. Collecting excess portions of quantities of sealant 328 in channel 172 and/or routing portions of quantities of sealant 328 along cylindrical surface 104 within channel 172 prevents hydraulic locking between cylindrical surface 104 and one of first openings 306 and/or corresponding one of second openings 308 when indexing pin 100 is inserted in one of first openings 306 and corresponding one of second openings 308 and/or when first body 302 and second body 304 are clamped together.

As illustrated in FIG. 20, in one or more examples, sealant 328 is applied to one or both of first-body second surface 334 and second-body first surface 332 and is located between first body 302 and second body 304. In one or more examples, sealant 328 is an adhesive, used to bond first body 302 and second body 304 together following alignment of structure 300. In one or more examples, sealant 328 is an EME mitigation material. According to the examples disclosed herein, quantities of sealant 328 may be forced inside first openings 306 and/or second openings 308 upon contact between first-body second surface 334 and second-body first surface 332 and/or when first body 302 and second body 304 are clamped together.

Channel 172 enables portions of first quantities of sealant 328, located within one of first openings 306, to fill channel 172 and to be routed along channel 172 between cylindrical surface 104 and first wall 310 of corresponding one of first openings 306 when indexing pin 100 passes through one of first openings 306 and/or when first body 302 and second body 304 are clamped together. Channel 172 also enables portions of second quantities of sealant 328, located within corresponding one of second openings 308, to fill channel 172 and to be routed along channel 172 between cylindrical surface 104 and second wall 312 of corresponding one of second openings 308 when indexing pin 100 passes through corresponding one of second openings 308 and/or when first body 302 and second body 304 are clamped together.

According to the examples disclosed herein, channel 172 may have any one of a variety of different helix angles. Similarly, channel 172 may have any one of a variety of different widths and/or depths. The helix angle, the width, and/or the depth of channel 172 may depend on various factors including, but not limited to, the material characteristics of sealant 328, the volume of sealant 328 applied between first body 302 and second body 304, the volume of quantities of sealant 328, forced into one of first openings 306 and/or corresponding one of second openings 308, and the like.

Generally, portion of quantities of sealant 328, located within one of first openings 306 and/or corresponding one of second openings 308, is routed along channel 172 in a direction, opposite to a direction of insertion of indexing pin 100.

As illustrated in FIGS. 5A and 6A, in one or more examples, channel 172 terminates prior to tapered surface 112. Channel 172 being formed only in portion of cylindrical surface 104, rather than also being formed in portion of tapered surface 112, ensures that there are no sharp edges formed on tapered surface 112 that could potentially damage first wall 310 of corresponding one of first openings 306 and/or second wall 312 of corresponding one of second openings 308 (FIG. 20) when indexing pin 100 is inserted in one of first openings 306 and corresponding one of second openings 308.

Referring generally to FIGS. 1A and 1B and particularly to, e.g., FIGS. 5A-6B, channel 172 comprises channel first end 182 and channel second end 184, opposite channel first end 182. Channel second end 184 is proximate to flange 136. The preceding subject matter of this paragraph characterizes example 14 of the present disclosure, wherein example 14 also includes the subject matter according to example 13, above.

Extending channel 172 to flange 136 of indexing pin 100 lengthens channel 172 and provides an increased volume to receive portions of quantities of sealant 328 when indexing pin 100 is inserted in one of first openings 306 and corresponding one of second openings 308.

Terminating channel second end 184 of channel 172 at flange 136 enables portions of quantities of sealant 328 to be routed along cylindrical surface 104 up to flange 136 of indexing pin 100, for example, in the direction, opposite the direction of insertion of indexing pin 100, when indexing pin 100 is inserted into one of first openings 306 and corresponding one of second openings 308 and/or when nut 204 is threadably coupled with threaded portion 126 to clamp first body 302 and second body 304 together (FIG. 20).

Referring generally to FIGS. 1A and 1B and particularly to, e.g., FIGS. 5B and 6B, channel 172 is formed in at least portion of tapered surface 112. The preceding subject matter of this paragraph characterizes example 15 of the present disclosure, wherein example 15 also includes the subject matter according to example 14.

Channel 172 collects portions of quantities of sealant 328 that is located within one of first openings 306 and corresponding one of second openings 308 when indexing pin 100 is inserted in one of first openings 306 and corresponding one of second openings 308.

In one or more examples, portions of quantities of sealant 328, located within one of first openings 306 and corresponding one of second openings 308, are routed along channel 172 when indexing pin 100 is inserted in one of first openings 306 and corresponding one of second openings 308. Collecting excess portions of quantities of sealant 328 in channel 172 and/or routing portions of quantities of sealant 328 along tapered surface 112 within channel 172 prevents hydraulic locking between tapered surface 112 and one of first openings 306 and/or corresponding one of second openings 308 when indexing pin 100 is inserted in one of first openings 306 and corresponding one of second openings 308.

Channel 172 enables portions of first quantities of sealant 328, located within one of first openings 306 and/or corresponding one of second openings 308, to fill channel 172 and to be routed along channel 172 between tapered surface 112 and first wall 310 of corresponding one of first openings 306 when indexing pin 100 passes through one of first openings 306. Channel 172 also enables portions of second quantities of sealant 328, located within corresponding one of second openings 308, to fill channel 172 and to be routed along channel 172 between tapered surface 112 and second wall 312 of corresponding one of second openings 308 when indexing pin 100 passes through corresponding one of second openings 308.

Channel 172 also enables portions of quantities of sealant 328, located within one of first openings 306 and/or corresponding one of second openings 308, to be routed from tapered surface 112 to cylindrical surface 104 when indexing pin 100 is inserted in one of first openings 306 and corresponding one of second openings 308.

In one or more examples, channel 172 being formed in both portion of cylindrical surface 104 and portion of tapered surface 112 provides a flow path for portions of quantities of sealant 328 to exit corresponding one of second openings 308, at second-body second surface 336, when indexing pin 100 is fully inserted in corresponding one of second openings 308 and/or when first body 302 and second body 304 are clamped together.

Referring generally to FIGS. 1A and 1B and particularly to, e.g., FIGS. 5B and 6B, channel first end 182 is proximate to threaded portion 126. The preceding subject matter of this paragraph characterizes example 16 of the present disclosure, wherein example 16 also includes the subject matter according to example 14 or 15, above.

Terminating channel first end 182 of channel 172 proximate (e.g., at or near) threaded portion 126 provides a flow path for portions of sealant 328 located within one of first openings 306 and/or corresponding one of second openings 308 to flow out of channel 172 from channel first end 182 and exit corresponding one of second openings 308, at second-body second surface 336, when indexing pin 100 is fully inserted in corresponding one of second openings 308.

As illustrated in FIGS. 3-6B, 9, and 10, in one or more examples, portion of indexing pin 100 located between tapered surface 112 and threaded portion 126 has diameter less than minimum tapered-surface diameter 124 of tapered surface 112 and less than maximum threaded-portion diameter 132 of threaded portion 126. The reduced diameter of portion of indexing pin 100 located between tapered surface 112 and threaded portion 126 forms annular recessed portion of indexing pin 100. In one or more examples, as illustrated in FIGS. 5B and 6B, channel first end 182 terminates at and intersects annular recessed portion of indexing pin 100 located between tapered surface 112 and threaded portion 126. Portions of quantities of sealant 328 can exit corresponding one of second openings 308, at second-body second surface 336, when indexing pin 100 is fully inserted in corresponding one of second openings 308 by being routed from channel 172 to the annular recessed portion of indexing pin 100.

Annular recessed portion of indexing pin 100 located between tapered surface 112 and threaded portion 126 also provides gap between tapered surface 112 and threaded portion 126 to prevent nut 204 from binding to non-threaded portion of indexing pin 100 when nut 204 is threadably coupled with threaded portion 126.

Referring generally to FIGS. 1A and 1B and particularly to, e.g., FIGS. 6A and 6B, indexing pin 100 further comprises annular recess 174, located between cylindrical surface 104 and flange 136. Channel second end 184 intersects annular recess 174. The preceding subject matter of this paragraph characterizes example 17 of the present disclosure, wherein example 17 also includes the subject matter according to any one of examples 14 to 16, above.

Annular recess 174 provides an increased volume to receive portions of quantities of sealant 328 when indexing pin 100 is fully inserted in one of first openings 306 and corresponding one of second openings 308.

For the purpose of the present disclosure, the term "intersects," in reference to the channel second end 184 intersecting annular recess 174, refers to a junction, common to both channel 172 and annular recess 174.

In one or more examples, terminating channel first end 182 of channel 172 at annular recess 174 enables excess portions of quantities of sealant 328, located within one of first openings 306 and/or corresponding one of second openings 308, to be routed out from channel second end 184 and to collect within annular recess 174 when indexing pin 100 is fully inserted in corresponding one of second openings 308 and/or when nut 204 is threadably coupled with threaded portion 126 to clamp first body 302 and second body 304 together (FIG. 20).

Referring generally to FIGS. 1A and 1B and particularly to, e.g., FIGS. 2-20 and 29-31, indexing clamp 200 is disclosed. Indexing clamp 200 comprises indexing pin 100. Indexing pin 100 comprises central axis 154 and threaded portion 126, extending along central axis 154. Indexing pin 100 also comprises stem 148, extending along central axis 154. Indexing pin 100 further comprises cylindrical surface 104, extending along central axis 154 between threaded portion 126 and stem 148. Indexing pin 100 additionally comprises tapered surface 112, extending between threaded portion 126 and cylindrical surface 104. Indexing pin 100 further comprises flange 136, located between stem 148 and cylindrical surface 104. Indexing clamp 200 also comprises nut 204, configured to be threadably coupled with threaded portion 126 of indexing pin 100. Indexing clamp 200 additionally comprises protective clamping member 206, having external protective-clamping-member diameter 216 and configured to be coupled to nut 204 and configured be located between nut 204 and flange 136. The preceding subject matter of this paragraph characterizes example 18 of the present disclosure.

Indexing pin 100 aligns first body 302 of structure 300 and second body 304 of structure 300 by urging alignment of first openings 306 of first body 302 with second openings 308 of second body 304 when indexing pin 100 is inserted through one of first openings 306 and corresponding one of second openings 308. Following alignment of structure 300, nut 204 clamps first body 302 and second body 304 together between indexing pin 100 and protective clamping member 206. Protective clamping member 206 protects second-body second surface 336 from damage when nut 204 is preloaded against protective clamping member 206.

For the purpose of this disclosure, the term "along," in reference to extending along an axis, means coincident with or parallel to that axis.

For the purpose of the present disclosure, the phrase "one of first openings 306 and corresponding one of second openings 308" refers to one of first openings 306 and one of second openings 308 that correspond to each other to receive indexing pin 100 and that are to be aligned with each other for insertion of indexing pin 100 when positioning and aligning first body 302 and second body 304 relative to each other.

Referring generally to FIGS. 1A and 1B and particularly to FIGS. 12,17-28 and 32-40, according to the examples disclosed herein, structure 300 includes first body 302 and second body 304. First body 302 includes first-body first surface 330 and first-body second surface 334 that is opposite first-body first surface 330. First openings 306 extend, inclusively, between first-body first surface 330 and first-body second surface 334. In other words, first openings 306 extend through first body 302. Second body 304 includes second-body first surface 332 and second-body second surface 336 that is opposite second-body first surface 332. Second openings 308 extend, inclusively, between second-body first surface 332 and second-body second surface 336. In other words, second openings 308 extend through second body 304.

As illustrated in FIGS. 21-28 and 32-40, alignment of structure 300 is achieved by properly aligning first openings 306 and second openings 308 relative to each other when first body 302 and second body 304 are located relative to each other, such as in a stacked configuration with first-body second surface 334 of first body 302 in contact with second-body first surface 332 of second body 304.

In one or more examples, first body 302 and second body 304 include, or are formed from, a composite material, such as a fiber-reinforced polymer composite. In one or more examples, first body 302 and second body 304 include, or are formed from, a metallic material. In one or more examples, first body 302 and second body 304 include, or are formed from, a plastic material, such as a thermoplastic.

In one or more examples, structure 300 is, or forms a portion of, a sub-structure or component of a larger manufactured structure or assembly. In one or more examples, structure 300 is, or forms a portion of, a vehicle structure, such as an aerospace vehicle, a space vehicle, a marine vehicle, a land vehicle, or the like. In one or more examples, structure 300 is, or forms a portion of, a stand-alone structure, such as a building, an antenna, a satellite, a rocket, or the like.

In one or more examples, during assembly of structure 300, first body 302 and second body 304 are initially arranged in a stacked configuration, also referred to herein as stack. First openings 306 and second openings 308 are machined (e.g., drilled) through the arranged stack of first body 302 and second body 304. Following formation of first openings 306 and second openings 308, first body 302 and second body 304 are separated so that one or more finishing operations can be performed on first body 302 and/or second body 304. An example of such finishing operations includes a deburring process that removes unwanted material from first body 302 and second body 304, such as removal of material surrounding first openings 306 and second openings 308, respectively. Removal of such unwanted material may mitigate undesirable electromagnetic environmental effects (EME) on structure 300 during use of structure 300, such as effects from static electric discharge and lighting strike. Mitigation of undesirable EME may be particularly beneficial when structure 300 is an aerospace structure.

As illustrated in FIGS. 21-40, according to the examples disclosed herein, indexing pin 100 enables realignment of first openings 306 and second openings 308 when rearranging first body 302 and second body 304 back into the stacked configuration for final assembly of structure 300. In one or more examples, final assembly of structure 300 includes installation of fasteners through aligned ones of first openings 306 and second openings 308, structural bonding of first body 302 and second body 304, and the like.

As illustrated in FIGS. 21-28, in one or more examples, with indexing pin 100 located within one of first openings 306, indexing pin 100 urges alignment of one of first openings 306 and corresponding one of second openings 308 as first body 302 and second body 304 are moved toward each other, while inserting indexing pin 100 through corresponding one of second openings 308 until first-body second surface 334 contacts second-body first surface 332.

As illustrated in FIGS. 32-40, in one or more examples, with first-body second surface 334 in contact with second-body first surface 332, indexing pin 100 urges alignment of first openings 306 and second openings 308 as indexing pin 100 is inserted through one of first openings 306 and corresponding one of second openings 308.

Accordingly, a plurality of indexing pins 100 can be used to urge alignment of selected ones of first openings 306 and selected corresponding ones of second openings 308. Upon alignment of selected ones of first openings 306 with selected corresponding ones of second openings 308 using indexing pins 100, non-selected ones of first openings 306 will be aligned with non-selected corresponding ones of second openings 308 so that first body 302 and second body 304 are properly aligned for final assembly, such as installation of fasteners.

Advantageously, with all of first openings 306 of first body 302 aligned with all of corresponding ones of second openings 308 of second body 304, fasteners can be installed, for example, by inserting each one of fasteners through one of first openings 306 and corresponding one of second openings 308, without damaging first body 302 and/or second body 304. Beneficially, the ability to install fasteners in properly pre-aligned ones of first openings 306 and corresponding ones of second openings 308 eliminates the need for fastener sleeves, which reduces the processing time and cost of manufacturing structure 300 and reduces the overall weight of structure 300.

As illustrated in FIGS. 29-31, according to the examples disclosed herein, indexing clamp 200 clamps first body 302 and second body 304 together in stacked configuration with first openings 306 and second openings 308 aligned with each other for final assembly of structure 300, such as during installation of fasteners through aligned ones of first openings 306 and second openings 308. In one or more examples, following installation of indexing pin 100 to align one of first openings 306 and corresponding one of second openings 308, first body 302 and second body 304 are clamped together in a stacked configuration between flange 136 of indexing pin 100 and protective clamping member 206 by locating protective clamping member 206 between second body 304 and nut 204 and threadably coupling nut 204 with threaded portion 126 of indexing pin 100. Clamping first body 302 and second body 304 together prevents linear movement of first body 302 and second body 304 relative to each other in a direction, perpendicular to central axis 154 of indexing pin 100 and maintains proper alignment of first openings 306 with corresponding ones of second openings 308 for installation of fasteners.

As illustrated in FIGS. 2-6B, cylindrical surface 104 forms or otherwise defines a main shaft or shank portion of indexing pin 100 that extends along central axis 154 of indexing pin 100 between stem 148 and threaded portion 126. In one or more examples, the cylindrical surface 104 extends between flange 136 and tapered surface 112. Cylindrical surface 104 has a circular cross-sectional shape in a plane perpendicular to central axis 154 of indexing pin 100. Cylindrical surface 104 has a diameter that is constant along its length.

As illustrated in FIGS. 21-28 and 34-40, cylindrical surface 104 provides, or serves as, an indexing surface that contacts portion of first wall 310 of one of first openings 306 when indexing pin 100 is inserted in, or through, one of first openings 306. Similarly, cylindrical surface 104 provides, or serves as, an indexing surface that contacts portion of second wall 312 of corresponding one of second openings 308 when indexing pin 100 is inserted in, or through, corresponding one of second openings 308 to urge a position change in at least one of first body 302 and second body 304 relative to each other during alignment of one of first openings 306 and corresponding one of second openings 308 through which indexing pin 100 is inserted.

As illustrated in FIGS. 2-6B, tapered surface 112 forms or otherwise defines a lead-in portion of indexing pin 100 that extends along central axis 154 of indexing pin 100 between cylindrical surface 104 and threaded portion 126. Tapered surface 112 has a circular cross-sectional shape in a plane, perpendicular to central axis 154 of indexing pin 100. Tapered surface 112 has a diameter that varies along its length.

As illustrated in FIGS. 32 and 33, when indexing pin 100 is inserted in one of first openings 306, tapered surface 112 enables indexing pin 100 to enter one of first openings 306 without imparting an impact load on first body 302, such as on an edge of first-body first surface 330 defining portion of corresponding one of first openings 306. As illustrated in FIGS. 22, 27, 35, 38, and 39, when indexing pin 100 is inserted in one of second openings 308, tapered surface 112 enables indexing pin 100 to enter one of second openings 308 without imparting an impact load on second body 304, such as an edge of second-body first surface 332, defining a portion of corresponding one of second openings 308.

As illustrated in FIGS. 2-6B, stem 148 forms or otherwise defines an operator-engagement portion of indexing pin 100 that extends along central axis 154 opposite to threaded portion 126. In one or more examples, stem 148 extends from flange 136 opposite cylindrical surface 104. In one or more examples, engagement of stem 148, for example, via application of torque to stem 148 by an operator, prevents rotation of indexing pin 100 about central axis 154, such as when threadably coupling nut 204 with threaded portion 126 of indexing pin 100. In one or more examples, engagement of stem 148, for example, via application of a pulling force by an operator, enables extraction of indexing pin 100 from one of first openings 306 and corresponding one of second openings 308, for example, following alignment of structure 300 or following final assembly of structure 300.

As illustrated in FIGS. 2-6B, threaded portion 126 forms or otherwise defines a nut-engagement portion of indexing pin 100 that extends along central axis 154 opposite to cylindrical surface 104. In one or more examples, threaded portion 126 extends from tapered surface 112 opposite cylindrical surface 104. Threaded portion 126 has a circular cross-sectional shape in a plane, perpendicular to central axis 154 of indexing pin 100. Threaded surface 126 has a diameter that is constant along its length. Threaded portion 126 includes external thread.

As illustrated in FIGS. 11, 12, 17-20, and 29-31, threaded portion 126 enables nut 204 to be removably coupled to indexing pin 100 in order to clamp first body 302 and second body 304 together between indexing pin 100 and nut 204, for example, following alignment of structure 300. First body 302 and second body 304 are clamped between flange 136 of indexing pin 100 and protective clamping member 206 when nut 204 is threadably coupled with threaded portion 126 and preloaded against protective clamping member 206 along central axis 154 by force within predetermined range.

Referring generally to FIGS. 1A and 1B and particularly to, e.g., FIGS. 11-13 and 15-20, nut 204 has second central axis 208, coincident with central axis 154 of indexing pin 100 when nut 204 is threadably coupled with threaded portion 126 of indexing pin 100. Nut 204 and protective clamping member 206 are rotatable relative to each other when protective clamping member 206 is coupled to nut 204. The preceding subject matter of this paragraph characterizes example 19 of the present disclosure, wherein example 19 also includes the subject matter according to example 18, above.

Nut 204 and protective clamping member 206 being freely rotatable relative to each other enables protective clamping member 206 to remain rotationally stationary about second central axis 208 relative to nut 204 and relative to second body 304 when clamping first body 302 and second body 304 together between flange 136 of indexing pin 100 and protective clamping member 206.

According to the examples disclosed herein, when clamping first body 302 and second body 304 together between flange 136 of indexing pin 100 and protective clamping member 206, protective clamping member 206 is located between nut 204 and second-body second surface 336 of second body 304. When nut 204 is threadably coupled with threaded portion 126 of indexing pin 100, second central axis 208 is coincident with central axis 154 of indexing pin 100. When nut 204 is threadably coupled with threaded portion 126 of indexing pin 100, protective clamping member 206 spaces nut 204 away from second-body second surface 336 so that nut 204 is never in direct contact with second-body second surface 336 during clamping. With protective clamping member 206 in contact with second-body second surface 336, nut 204 is rotated about second central axis 208 to threadably couple nut 204 with threaded portion 126 of indexing pin 100 and to preload nut 204 against protective clamping member 206 along central axis 154. Protective clamping member 206 remains rotationally stationary about second central axis 208 relative to second-body second surface 336 while nut 204 rotates about second central axis 208 relative to protective clamping member 206 to prevent portion of second-body second surface 336 surrounding corresponding one of second openings 308 from being damaged due to friction generated by contact between rotating bodies.

Referring generally to FIGS. 1A and 1B and particularly to, e.g., FIGS. 11-13 and 15-20, when protective clamping member 206 is coupled to nut 204, nut 204 is bi-directionally rotatable relative to protective clamping member 206 about second central axis 208 without moving relative to protective clamping member 206 along second central axis 208. The preceding subject matter of this paragraph characterizes example 20 of the present disclosure, wherein example 20 also includes the subject matter according to example 19, above.

Nut 204 and protective clamping member 206 being bi-directionally rotatable relative to each other without moving relative to each other along second central axis 208 enables nut 204 to be removably coupled with threaded portion 126 of indexing pin 100 without nut 204 changing position along second central axis 208 relative to protective clamping member 206.

For the purpose of this disclosure, the term "bi-directionally" refers to clockwise and anti-clockwise rotational motion of nut 204 about second central axis 208 relative to protective clamping member 206.

Referring generally to FIGS. 1A and 1B and particularly to, e.g., FIGS. 13-16, when protective clamping member 206 is coupled to nut 204, nut 204 and protective clamping member 206 are frictionally coupled with each other. The preceding subject matter of this paragraph characterizes example 21 of the present disclosure, wherein example 21 also includes the subject matter according to example 19 or 20, above.

Frictionally coupling nut 204 and protective clamping member 206 together prevents inadvertent separation of nut 204 from protective clamping member 206 while allowing free rotation of nut 204 and protective clamping member 206 relative to each other.

Preventing inadvertent separation of nut 204 and protective clamping member 206 reduces or prevents occurrences of undesired foreign object debris (FOD) during assembly of structure 300. Nut 204 and protective clamping member 206 are frictionally coupled together by any one of various different types of frictional coupling techniques that allow free rotation of nut 204 and protective clamping member 206 about second central axis 208 relative to each other.

Referring generally to FIGS. 1A and 1B and particularly to, e.g., FIGS. 13-16, when protective clamping member 206 is coupled to nut 204 and nut 204 is preloaded against protective clamping member 206 along second central axis 208 by a force within a predetermined range, nut 204 is bi-directionally rotatable relative to protective clamping member 206 about second central axis 208 without moving relative to protective clamping member 206 along second central axis 208. The preceding subject matter of this paragraph characterizes example 22 of the present disclosure, wherein example 22 also includes the subject matter according to any one of examples 19 to 21, above.

Nut 204 and protective clamping member 206 being bi-directionally rotatable relative to each other without moving relative to each other along second central axis 208 enables nut 204 to be preloaded against protective clamping member 206 by a force within a predetermined range sufficient to adequately clamp first body 302 and second body 304 together.

In one or more examples, with nut 204 and protective clamping member 206 frictionally coupled together, the relative locations of nut 204 and protective clamping member 206 along second central axis 208 are fixed relative to each other. Bi-directional rotation of nut 204 about second central axis 208 relative to protective clamping member 206 enables nut 204 to be threadably coupled with threaded portion 126 of indexing pin 100 and to be pre-loaded against protective clamping member 206 to clamp first body 302 and second body 304 between flange 136 of indexing pin 100 and protective clamping member 206. Bi-directional rotation of nut 204 about second central axis 208 relative to protective clamping member 206 also enables nut 204 to be removed from threaded portion 126 of indexing pin 100 following alignment of one of first openings 306 and corresponding one of second openings 308 for removal of indexing pin 100.

Referring generally to FIGS. 1A and 1B and particularly to, e.g., FIGS. 11-20, nut 204 is made of metal. The preceding subject matter of this paragraph characterizes example 23 of the present disclosure, wherein example 23 also includes the subject matter according to any one of examples 19 to 22, above.

Nut 204 being made of metal provides nut 204 with sufficient strength to be preloaded against protective clamping member 206 by a force within a predetermined range sufficient to adequately clamp first body 302 and second body 304 together and sufficient durability for repeated use.

Referring generally to FIGS. 1A and 1B and particularly to, e.g., FIGS. 11-20, protective clamping member 206 is made of plastic. The preceding subject matter of this paragraph characterizes example 24 of the present disclosure, wherein example 24 also includes the subject matter according to any one of examples 19 to 23, above.

Protective clamping member 206 being made of plastic provides protective clamping member 206 with sufficient resiliency to be preloaded by nut 204 by a force within a predetermined range sufficient to adequately clamp first body 302 and second body 304 together and sufficient compliancy not to damage second-body second surface 336 when preloaded.

Referring generally to FIGS. 1A and 1B and particularly to, e.g., FIGS. 11-13 and 15-20, nut 204 comprises head 212 and barrel 210, having external barrel diameter 218. Nut 204 also comprises collar 220, located between head 212 and barrel 210 and having maximum collar dimension 222, measured in a direction, transverse to second central axis 208. Maximum collar dimension 222 is greater than external barrel diameter 218 and external protective-clamping-member diameter 216. Nut 204 further comprises through passage 262, extending through barrel 210 and comprising internal thread 260. The preceding subject matter of this paragraph characterizes example 25 of the present disclosure, wherein example 25 also includes the subject matter according to any one of examples 19 to 24, above.

Head 212, collar 220, barrel 210, and through passage 262 of nut 204 provide a structural interface for coupling nut 204 and protective clamping member 206 together and removably coupling nut 204 with threaded portion 126 of indexing pin 100.

Head 212 forms or otherwise defines an operator-engagement portion of nut 204. In one or more examples, head 212 extends along second central axis 208. In one or more examples, engagement of head 212, for example, via application of torque to head 212 by an operator, rotates nut 204 about second central axis 208, such as when threadably coupling nut 204 with threaded portion 126 of indexing pin 100.

Barrel 210 forms or otherwise defines a protective clamping member-interface portion of nut 204. In one or more examples, barrel 210 extends along second central axis 208 opposite head 212. In one or more examples, barrel 210 is configured to interface and be frictionally coupled with protective clamping member 206. In one or more examples, barrel 210 has a circular cross-sectional shape in a plane, perpendicular to second central axis 208 of nut 204 and has a diameter that is constant along its length.

Collar 220 forms or otherwise defines a protective clamping member-engagement portion of nut 204. In one or more examples, collar 220 extends along second central axis 208 between head 212 and barrel 210. Maximum collar dimension 222 of collar 220 being greater than external barrel diameter 218 of barrel 210 extends collar 220 outward from barrel 210 perpendicular to second central axis 208. With nut 204 and protective clamping member 206 coupled together, collar 220 is configured to contact protective clamping member 206 when nut 204 is threadably coupled with threaded portion 126 of indexing pin 100 and pre-loaded against protective clamping member 206 to clamp first body 302 and second body 304 between flange 136 of indexing pin 100 and protective clamping member 206.

In one or more examples, collar 220 also forms or otherwise defines another operator-engagement portion of nut 204. In one or more examples, engagement of collar 220, for example, via application of torque to collar 220 manually by an operator, rotates nut 204 about second central axis 208, such as when threadably coupling nut 204 with threaded portion 126 of indexing pin 100.

Through passage 262 forms or otherwise defines an indexing pin-engagement portion of nut 204. Through passage 262 extends along second central axis 208 through barrel 210. Through passage 262 is configured to receive threaded portion 126 of indexing pin 100 when nut 204 is threadably coupled with indexing pin 100. Internal thread 260 is configured to matingly engage threaded portion 126 when nut 204 is threadably coupled with threaded portion 126 of indexing pin 100.

As illustrated in FIG. 16, in one or more examples, through passage 262 extends only through barrel 210, and not through head 212 (i.e., head 212 is a solid element). Such a configuration of nut 204 prevents over tightening of nut 204, when nut 204 is threadably coupled with threaded portion 126 of indexing pin 100, by providing a physical stop that limits movement of nut 204 along central axis 154 of indexing pin 100 when an end of threaded portion 126 contacts head 212.

Referring generally to FIGS. 1A and 1B and particularly to, e.g., FIGS. 11-13 and 15-20, external protective-clamping-member diameter 216 of protective clamping member 206 is less than one-half of maximum collar dimension 222 of collar 220 of nut 204. The preceding subject matter of this paragraph characterizes example 26 of the present disclosure, wherein example 26 also includes the subject matter according to example 25, above.

External protective-clamping-member diameter 216 being less than one-half of maximum collar dimension 222 facilitates manual engagement of collar 220 when threadably coupling nut 204 with threaded portion 126 of indexing pin 100.

With nut 204 and protective clamping member 206 coupled together, external protective-clamping-member diameter 216 of protective clamping member 206 being less than one-half of maximum collar dimension 222 of collar 220 locates portion of collar 220 outward of protective clamping member 206 perpendicular to second central axis 208. Portion of collar 220 located outward of protective clamping member 206 provides an interface for manual engagement by an operator, for example, when threadably coupling nut 204 with threaded portion 126 of indexing pin 100.

Referring generally to FIGS. 1A and 1B and particularly to, e.g., FIGS. 11 and 12, collar 220 of nut 204 comprises knurled surface 232. The preceding subject matter of this paragraph characterizes example 27 of the present disclosure, wherein example 27 also includes the subject matter according to example 25 or 26, above.

Knurled surface 232 provides a frictional interface for hand tightening nut 204 to indexing pin 100 when clamping first body 302 and second body 304 together.

In one or more examples, at least portion of an annular sidewall of collar 220, circumscribing second central axis 208, includes knurled surface 232. Knurled surface 232 includes any one of various kinds of knurling patterns formed on an external surface of the annular sidewall of collar 220.

Referring generally to FIGS. 1A and 1B and particularly to, e.g., FIGS. 11 and 12, head 212 of nut 204 comprises fifth means 264 for providing complementary engagement with a fifth tool. The preceding subject matter of this paragraph characterizes example 28 of the present disclosure, wherein example 28 also includes the subject matter according to any one of examples 25 to 27, above.

Fifth means 264 enables use of the fifth tool (not shown) to engage head 212 and to rotate nut 204 about second central axis 208 when threadably coupling nut 204 to threaded portion 126 of indexing pin 100.

In one or more examples, complementary engagement of the fifth tool with fifth means 264 rotates nut 204 about second central axis 208 at first end 150 (FIG. 2) of indexing pin 100, for example, when threadably coupling nut 204 with threaded portion 126.

Generally, fifth means 264 includes, or takes the form of, any structural feature that provides complementary engagement with the fifth tool, and the fifth tool includes, or takes the form of, any implement or instrument that engages the particular structural feature corresponding to fifth means 264 and that enables manipulation of nut 204. In one or more examples, fifth means 264 is a polygon structure or head with a plurality of planar sides, that forms at least portion of head 212 and has a polygonal cross-sectional shape in a plane perpendicular to second central axis 208, and the fifth tool is a wrench, having a polygonal socket or pliers. In one or more examples, as illustrated in FIGS. 11 and 12, fifth means 164 includes a hexagonal head (e.g., a six-sided head) that forms at least portion of head 212 and the fifth tool is a wrench having a hexagonal socket or pliers configured to engage the hexagonal head in a complementary manner.

In one or more examples, the fifth tool for complementary engagement with fifth means 264 of head 212 of nut 204 and fourth tool for complementary engagement with fourth means 166 of threaded portion 126 of indexing pin 100 are integrated into the same combination tool. Such a combination tool is any implement or instrument configured to engage both the particular structural feature, corresponding to fifth means 264 and fourth means 166 to simultaneously manipulate nut 204 and indexing pin 100.

Referring generally to FIGS. 1A and 1B and particularly to, e.g., FIGS. 13, 15, and 17-20, through passage 262 extends through collar 220 of nut 204. The preceding subject matter of this paragraph characterizes example 29 of the present disclosure, wherein example 29 also includes the subject matter according to any one of examples 25 to 28, above.

Through passage 262 extending through collar 220 of nut 204 provides increased adjustability of nut 24 relative to indexing pin 100 and enables threaded portion 126 of indexing pin 100 to extend further through nut 204 when nut 204 is threadably coupled with threaded portion 126 of indexing pin 100.

Referring generally to FIGS. 1A and 1B and particularly to, e.g., FIGS. 13,15, and 17-20, through passage 262 extends through head 212 of nut 204. The preceding subject matter of this paragraph characterizes example 30 of the present disclosure, wherein example 30 also includes the subject matter according to any one of examples 25 to 29, above.

Through passage 262 extending through head 212 of nut 204 provides increased adjustability of nut 24 relative to indexing pin 100 and enables threaded portion 126 of indexing pin 100 to extend through nut 204 when nut 204 is threadably coupled with threaded portion 126 of indexing pin 100.

In one or more examples, through passage 262 extending through head 212 of nut 204 also enables fourth tool (not shown) to access fourth means 166 of indexing pin 100 through head 212 of nut 204 when threadably coupling nut 204 with threaded portion 126 of indexing pin 100.

Referring generally to FIGS. 1A and 1B and particularly to, e.g., FIGS. 13 and 15-20, internal thread 260 of through passage 262 extends along all of through passage 262. The preceding subject matter of this paragraph characterizes example 31 of the present disclosure, wherein example 31 also includes the subject matter according to example 30, above.

Internal thread 260 extends along all of through passage 262 and thereby increases a mating interface between nut 204 and threaded portion 126 of indexing pin 100 when nut 204 is threadably coupled with threaded portion 126 of indexing pin 100.

Referring generally to FIGS. 1A and 1B and particularly to, e.g., FIGS. 13-20, indexing clamp 200 further comprises O-ring 228, having circumferentially closed surface 278 that lies in plane, containing second central axis 208 of nut 204. Protective clamping member 206 is cup-shaped and comprises third central axis 272 and base 274, comprising opening 240. Protective clamping member 206 also comprises cylindrical wall 276, extending from base 274 along third central axis 272. Protective clamping member 206 additionally comprises interior recess 224, at least partially defined by cylindrical wall 276 and communicatively coupled with opening 240. Protective clamping member 206 also comprises internal annular groove 230, formed in cylindrical wall 276. Nut 204 further comprises external annular groove 226, formed in barrel 210 of nut 204. When protective clamping member 206 is coupled to nut 204, barrel 210 of nut 204 is located in interior recess 224 of protective clamping member 206 with clearance fit, one portion of circumferentially closed surface 278 of O-ring 228 is located in external annular groove 226, and another portion of circumferentially closed surface 278 of O-ring 228 is located in internal annular groove 230. The preceding subject matter of this paragraph characterizes example 32 of the present disclosure, wherein example 32 also includes the subject matter according to any one of examples 25 to 31, above.

Base 274, cylindrical wall 276, and interior recess 224 of protective clamping member 206 provide a structural interface for coupling protective clamping member 206 and nut 204 together. Internal annular groove 230, external annular groove 226, and O-ring 228 provide for frictional coupling of nut 204 with protective clamping member 206 while allowing nut 204 and protective clamping member 206 to freely rotate about second central axis 208 relative to each other.

For the purpose of the present disclosure, the term "clearance fit" has its ordinary meaning, known to those skilled in the art, and refers to an engineering fit, in which an opening is larger than an element located in the opening, enabling two parts to slide and/or rotate when assembled.

For the purpose of the present disclosure, a "plane", used to reference locations, orientations, and/or shapes of features and elements, refers to a virtual reference plane, having the attributes of an entity without possessing its physical form. For example, a virtual reference plane is an intangible or imaginary plane, rather than a physical one, with respect to which, e.g., location, orientation, and/or shape of other physical and/or intangible entities may be defined.

Base 274 forms or otherwise defines a second body-engagement portion of protective clamping member 206. With nut 204 and protective clamping member 206 coupled together, base 274 is configured to contact second-body second surface 336 of second body 304 when nut 204 is threadably coupled with threaded portion 126 of indexing pin 100 and pre-loaded against protective clamping member 206. In one or more examples, base 274 has a circular cross-sectional shape in a plane, perpendicular to third central axis 272.

Opening 240 enables threaded portion 126 of indexing pin 100 to enter interior recess 224 of protective clamping member 206 when threadably coupling nut 204 with threaded portion 126. Opening 240 is coaxially aligned with third central axis 272.

Cylindrical wall 276 defines or otherwise forms a nut-engagement portion of protective clamping member 206. Cylindrical wall 276 extends along third central axis 272 from base 274 and circumscribes third central axis 272. In one or more examples, with nut 204 and protective clamping member 206 coupled together, collar 220 of nut 204 contacts an end of cylindrical wall 276 when nut 204 is threadably coupled with threaded portion 126 of indexing pin 100 and pre-loaded against protective clamping member 206. Cylindrical wall 276 spaces nut 204 away from second body 304 and prevents nut 204 from contacting second-body second surface 336 of second body 304. Cylindrical wall 276 has a circular cross-sectional shape in a plane, perpendicular to third central axis 272 of protective clamping member 206. Cylindrical wall 276 has a diameter that is constant along its length.

Interior recess 224 forms or otherwise defines a nut-receiving portion of protective clamping member 206 that enables nut 204 to be removably coupled with protective clamping member 206. Interior recess 224 extends along third central axis 272 and is communicatively coupled with opening 240. With nut 204 and protective clamping member 206 coupled together, interior recess 224 receives barrel 210 of nut 204 with a clearance fit. With nut 204 and protective clamping member 206 coupled together, opening 240 enables threaded portion 126 of indexing pin 100 to be received within interior recess 224 when nut 204 is threadably coupled with threaded portion 126. Interior recess 224 is defined by base 274 and cylindrical wall 276.

O-ring 228 frictionally couples nut 204 and protective clamping member 206 together to prevent inadvertent separation of nut 204 from protective clamping member 206 and, thus, prevent foreign object debris (FOD), while enabling rotation of nut 204 and protective clamping member 206 about second central axis 208 relative to each other.

With nut 204 and protective clamping member 206 coupled together, each one of external annular groove 226 and internal annular groove 230 receives at least portion of circumferentially closed surface 278 of O-ring 228. External annular groove 226 and internal annular groove 230 are configured to enable nut 204 and protective clamping member 206 to freely rotate about second central axis 208 relative to each other. External annular groove 226 and internal annular groove 230 are configured to prevent linear movement of O-ring 228 along second central axis 208 relative to each one of nut 204 and protective clamping member 206 and thus, prevent linear movement of nut 204 along second central axis 208 relative to protective clamping member 206.

As best illustrated in FIG. 14, with nut 204 and protective clamping member 206 coupled together, a cross-sectional diameter of circumferentially closed surface 278 of O-ring 228 is greater than one-half of a cross-sectional dimension of a cross-section of an area, defined by a combination of external annular groove 226 and internal annular groove 230 that lies in the same plane as circumferentially closed surface 278 of O-ring 228. Such a configuration of external annular groove 226 and internal annular groove 230 holds O-ring 228 captive to prevent inadvertent separation of nut 204 from protective clamping member 206 while allowing free rotation of nut 204 and protective clamping member 206 about second central axis 208 relative to each other. Such a configuration of external annular groove 226 and internal annular groove 230 also enables forced (i.e., intentional) separation of nut 204 from protective clamping member 206.

In one or more examples, with nut 204 and protective clamping member 206 coupled together, O-ring 228 locates nut 204 relative to protective clamping member 206 so that second central axis 208 of nut 204 is coincident with third central axis 272 of protective clamping member 206. In one or more examples, with nut 204 and protective clamping member 206 coupled together, O-ring 228 locates nut 204 relative to protective clamping member 206 so that second central axis 208 of nut 204 is parallel with third central axis 272 of protective clamping member 206.

Further, use of both external annular groove 226 and internal annular groove 230 with O-ring 228 also enables a snap-fit connection that provides a tactile verification that nut 204 and protective clamping member 206 are interlocked.

Referring generally to FIGS. 1A and 1B and particularly to, e.g., FIGS. 13, 15, and 16, when protective clamping member 206 is coupled to nut 204, barrel 210 of nut 204 is spaced away from base 274 of protective clamping member 206 to form gap 234. The preceding subject matter of this paragraph characterizes example 33 of the present disclosure, wherein example 33 also includes the subject matter according to example 32, above.

Spacing barrel 210 away from base 274 forms gap 234 that enables portion of indexing pin 100 to be received by protective clamping member 206 when nut 204 is threadably coupled with indexing pin 100.

In one or more examples, as illustrated in FIGS. 17-20, with nut 204 and protective clamping member 206 coupled together, portion of tapered surface 112 can be received within portion of interior recess 224 of protective clamping member 206 formed by gap 234 between barrel 210 of nut 204 and base 274 of protective clamping member 206 when nut 204 is threadably coupled with threaded portion 126 of indexing pin 100 and pre-loaded against protective clamping member 206.

In one or more examples, gap 234 also provides additional spring-back to protective clamping member 206 when nut 204 is pre-loaded against protective clamping member 206 by a force within a predetermined range to securely clamp first body 302 and second body 304 between flange 136 of indexing pin 100 and protective clamping member 206. In other words, portion of protective clamping member 206 defining gap 234 serves as a spring that provides a clamp-up compression force. Increasing a dimension of gap 234 provides a greater length to compress, which increases resiliency to form a better clamp.

Referring generally to FIGS. 1A and 1B and particularly to, e.g., FIGS. 12, 13, 15, and 16, base 274 comprises exterior surface 244, surrounding opening 240. Protective clamping member 206 further comprises second O-ring 266, located on exterior surface 244 of base 274. The preceding subject matter of this paragraph characterizes example 34 of the present disclosure, wherein example 34 also includes the subject matter according to example 32 or 33, above.

Exterior surface 244 provides contact interface between protective clamping member 206 and second body 304. Second O-ring 266 prevents rotation of protective clamping member 206 relative to second body 304 when nut 204 is removably coupled with indexing pin 100.

In one or more examples, with nut 204 and protective clamping member 206 coupled together, at least portion of exterior surface 244 contacts portion of second-body second surface 336 and second O-ring 266 engages portion of second-body second surface 336 of second body 304, surrounding corresponding one of second openings 308, when nut 204 is threadably coupled with threaded portion 126 of indexing pin 100 and pre-loaded against protective clamping member 206. Engagement between second O-ring 266 and second-body second surface 336 provides sufficient frictional force to resist rotation of protective clamping member 206 about second central axis 208 relative to second-body second surface 336 when nut 204 is rotated relative to protective clamping member 206.

Referring generally to FIGS. 1A and 1B and particularly to, e.g., FIGS. 13, 16-18, and 20, exterior surface 244 of base 274 is planar. The preceding subject matter of this paragraph characterizes example 35 of the present disclosure, wherein example 35 also includes the subject matter according to example 34, above.

Exterior surface 244 of base 274 being planar enables protective clamping member 206 to make substantially flush contact with second-body second surface 336 of second body 304 when portion of second-body second surface 336 surrounding corresponding one of second openings 308 is planar.

In one or more examples, portion of second-body first surface 332 surrounding corresponding one of second openings 308 is planar. In one or more examples, exterior surface 244 of base 274 being planar enables portion of protective clamping member 206 to abut portion of second-body first surface 332, surrounding corresponding one of second openings 308, that is planar when nut 204 is threadably coupled with threaded portion 126 of indexing pin 100 and pre-loaded against protective clamping member 206.

Referring generally to FIGS. 1A and 1B and particularly to, e.g., FIGS. 15 and 19, barrel 210 of nut 204 comprises frustoconical barrel portion 254. Interior recess 224 comprises frustoconical recess portion 256, complementary with frustoconical barrel portion 254. Exterior surface 244 of base 274 is frustoconical. The preceding subject matter of this paragraph characterizes example 36 of the present disclosure, wherein example 36 also includes the subject matter according to example 34, above.

Exterior surface 244 of base 274 being frustoconical enables protective clamping member 206 to make substantially flush contact with second-body second surface 336 of second body 304 when portion of second-body second surface 336, surrounding corresponding one of second openings 308, includes second countersink 322. Frustoconical recess portion 256 receives frustoconical barrel portion 254 to substantially center nut 204 relative to protective clamping member 206.

For the purpose of the present disclosure, the term "complementary" describes geometric shapes that fit together with precision in a hand-and-glove arrangement, like a shank and a receiver or a tenon and a mortise.

As illustrated in FIGS. 29-31, in one or more examples, with nut 204 and protective clamping member 206 coupled together, frustoconical barrel portion 254 of barrel 210 of nut 204 is received by frustoconical recess portion 256 of interior recess 224 of protective clamping member 206. With nut 204 and protective clamping member 206 coupled together, complementary engagement between frustoconical barrel portion 254 of barrel 210 and frustoconical recess portion 256 of interior recess 224 centers nut 204 relative to protective clamping member 206. In other words, with nut 204 and protective clamping member 206 coupled together and nut 204 threadably coupled with threaded portion 126 of indexing pin 100 and pre-loaded against protective clamping member 206, second central axis 208 of nut 204 is located coincident with third central axis 272 of protective clamping member 206 when frustoconical barrel portion 254 of barrel 210 is properly seated within frustoconical recess portion 256 of interior recess 224. Engagement of frustoconical barrel portion 254 with frustoconical recess portion 256 coaxially aligns second center axis 208 of nut 204 with third central axis 272 of protective clamping member 206.

As illustrated in FIGS. 29-31, in one or more examples, portion of second-body first surface 332 surrounding corresponding one of second openings 308 includes second countersink 322. In one or more examples, exterior surface 244 of base 274 being frustoconical enables portion of protective clamping member 206 to abut and be received within second countersink 322 of corresponding one of second openings 308 when nut 204 is threadably coupled with threaded portion 126 of indexing pin 100 and pre-loaded against protective clamping member 206. With nut 204 and protective clamping member 206 coupled together, complementary engagement between exterior surface 244 of base 274 and countersink 320 centers protective clamping member 206 within corresponding one of second openings 308. In other words, with nut 204 and protective clamping member 206 coupled together and nut 204 threadably coupled with threaded portion 126 of indexing pin 100 and pre-loaded against protective clamping member 206, third central axis 272 of protective clamping member 206 is located coincident with fifth central axis 340 of corresponding one of second openings 308 when exterior surface 244 of base 274 is properly seated within second countersink 322. Engagement of exterior surface 244 of base 274 with second countersink 322 coaxially aligns third central axis 272 of protective clamping member 206 with fifth central axis 340 of corresponding one of second openings 308.

As illustrated in FIGS. 17-20 and 29-31, according to the examples disclosed herein, with nut 204 coupled to protective clamping member 206 and nut 204 threadably coupled with threaded portion 126 of indexing pin 100 and pre-loaded against protective clamping member 206, complementary engagement between exterior surface 244 of base 274 and countersink 320 locates third central axis 272 of protective clamping member 206 and fifth central axis 340 of corresponding one of second openings 308 (i.e., centers protective clamping member 206 relative to corresponding one of second openings 308). With nut 204 coupled to protective clamping member 206 and nut 204 threadably coupled with threaded portion 126 of indexing pin 100 and pre-loaded against protective clamping member 206, complementary engagement between frustoconical barrel portion 254 of barrel 210 and frustoconical recess portion 256 of interior recess 224 locates second central axis 208 of nut 204 and third central axis 272 of protect clamping member 206 coincident with each other (i.e., centers nut 204 relative to protective clamping member 206) and, thus, locates second central axis 208 of nut 204 and fifth central axis 340 of corresponding one of second openings 308 coincident with each other (i.e., centers nut 204 relative to corresponding one of protective clamping members 206).

As illustrated in FIGS. 17-20 and 29-31, in one or more examples, indexing pin 100 includes flange 136 having frustoconical flange surface 162, barrel 210 of nut 204 includes frustoconical barrel portion 254, interior recess 224 of protective clamping member 206 includes frustoconical recess portion 256, and exterior surface 244 of base 274 of protective clamping member 206 is frustoconical. In such a configuration, with nut 204 coupled to protective clamping member 206 and nut 204 threadably coupled with threaded portion 126 of indexing pin 100 and pre-loaded against protective clamping member 206, central axis 154 of indexing pin 100, fourth central axis 338 of corresponding one of first openings 306, second central axis 208 of nut 204, third central axis 272 of protective clamping member 206, and fifth central axis 340 of corresponding one of second openings 30 are located coincident with each other. In other words, in such a configuration, fourth central axis 338 of one of first openings 306 and fifth central axis 340 of corresponding one of second openings 308 are urged into coaxial alignment with each other, when indexing pin 100 is inserted through one of first openings 306 and corresponding one of second openings 308, nut 204 is coupled to protective clamping member 206, and nut 204 threadably coupled with threaded portion 126 of indexing pin 100 and pre-loaded against protective clamping member 206 to clamp first body 302 and second body 304 together between flange 136 of indexing pin 100 and protective clamping member 206.

Referring generally to FIGS. 1A and 1B and particularly to, e.g., FIGS. 13,15, and 16, protective clamping member 206 further comprises annular surface 236, opposite base 274 of protective clamping member 206. When protective clamping member 206 is coupled to nut 204 and nut 204 is preloaded against protective clamping member 206 along second central axis 208, annular surface 236 contacts collar 220 of nut 204. The preceding subject matter of this paragraph characterizes example 37 of the present disclosure, wherein example 37 also includes the subject matter according to any one of examples 32 to 36, above.

Annular surface 236 provides contact surface between protective clamping member 206 and nut 204. Contact engagement between annular surface 236 and collar 220 limits linear movement of nut 204 along second central axis 208 relative to protective clamping member 206 while allowing nut 204 and protective clamping member 206 to rotate about second central axis 208 relative to each other.

In one or more examples, annular surface 258 forms or otherwise defines at least portion of one end of cylindrical wall 276 of protective clamping member 206. In one or more examples, annular surface 258 is configured to reduce friction between annular surface 258 and portion of a surface of collar 220, in contact with annular surface 258, due to rotation of nut 204 relative to protective clamping member 206. In one or more examples, annular surface 258 is highly polished to reduce friction from contact between annular surface 258 and collar 220 rotating relative to each other. In one or more examples, annular surface 258 includes a friction-reducing coating to reduce friction from contact between annular surface 258 and collar 220 rotating relative to each other.

Referring generally to FIGS. 41A, 41B, and 41C and particularly to, e.g., FIGS. 2-10, and 21-31, method 1000 of aligning first body 302 and second body 304 of structure 300 is disclosed. First body 302 comprises first-body first surface 330, first-body second surface 334, opposite first-body first surface 330, and first openings 306, extending, inclusively, between first-body first surface 330 and first-body second surface 334. Second body 304 comprises second-body first surface 332, second-body second surface 336, opposite second-body first surface 332, and second openings 308 extending, inclusively, between second-body first surface 332 and second-body second surface 336. Method 1000 comprises (block 1002) preparing for use indexing pins 100. According to method 1000, each one of indexing pins 100 comprises central axis 154 and threaded portion 126, extending along central axis 154. Each one of indexing pins 100 also comprises stem 148, extending along central axis 154. Each one of indexing pins 100 further comprises cylindrical surface 104, extending along central axis 154 between threaded portion 126 and stem 148. Each one of indexing pins 100 additionally comprises tapered surface 112, extending between threaded portion 126 and cylindrical surface 104. Each one of indexing pins 100 further comprises flange 136, located between stem 148 and cylindrical surface 104. At least portion of flange 136 is larger than diameter of any one of first openings 306. Method 1000 further comprises (block 1004) orienting first body 302 so that each one of first openings 306 extends vertically and first-body first surface 330 is upwardly facing. Method 1000 also comprises (block 1006) inserting each one of indexing pins 100 into corresponding one of first openings 306 of first body 302 with clearance fit so that portion of cylindrical surface 104 of each one of indexing pins 100 is located in corresponding one of first openings 306 and portion of cylindrical surface 104 of each one of indexing pins 100 extends past first-body second surface 334. Method 1000 additionally comprises (block 1008) orienting second body 304 so that each one of second openings 308 extends vertically and second-body first surface 332 faces first-body second surface 334. Method 1000 also comprises (block 1010) aligning each one of second openings 308 of second body 304 with corresponding one of indexing pins 100, extending past first-body second surface 334, so that, in plan view, threaded portion 126 of each one of indexing pins 100 is surrounded by and is spaced away from second wall 312 of corresponding one of second openings 308 of second body 304. Method 1000 further comprises (block 1012) moving first body 302 and second body 304 toward each other a first distance, until threaded portion 126 of each one of indexing pins 100, extending past first-body second surface 334, is inserted into corresponding one of second openings 308 of second body 304. Method 1000 additionally comprises (block 1014) moving first body 302 and second body 304 toward each other a second distance, until at least portion of tapered surface 112 of each one of indexing pins 100 is inserted into corresponding one of second openings 308 of second body 304, while: (block 1016) allowing first body 302 and second body 304 to move relative to each other in direction, perpendicular to central axis 154 of each one of indexing pins 100; and (block 1018) applying downward force to each one of indexing pins 100 that has magnitude sufficient to cause at least portion of tapered surface 112 of each one of indexing pins 100 to be inserted into corresponding one of second openings 308 of second body 304 once first body 302 and second body 304 are moved toward each other the second distance. Method 1000 further comprises (block 1020) moving first body 302 and second body 304 toward each other a third distance, until portion of cylindrical surface 104 of each one of indexing pins 100 is inserted into corresponding one of second openings 308 of second body 304, while: (block 1022) allowing first body 302 and second body 304 to move relative to each other in direction, perpendicular to central axis 154 of each one of indexing pins 100; and (block 1024) applying downward force to each one of indexing pins 100 that has magnitude sufficient to cause portion of cylindrical surface 104 of each one of indexing pins 100 to be inserted into corresponding one of second openings 308 of second body 304 once first body 302 and second body 304 are moved toward each other the third distance. Method 1000 also comprises (block 1026) moving first body 302 and second body 304 toward each other fourth distance, until first-body second surface 334 contacts second-body first surface 332 and threaded portion 126 of each one of indexing pins 100 extends past second-body second surface 336, while (block 1028) applying downward force to each one of indexing pins 100 that has magnitude sufficient to cause threaded portion 126 of each one of indexing pins 100 to extend past second-body second surface 336 once first body 302 and second body 304 are moved toward each other fourth distance. The preceding subject matter of this paragraph characterizes example 38 of the present disclosure.

Method 1000 facilitates aligning first body 302 of structure 300 and second body 304 of structure 300 by urging alignment of first openings 306 of first body 302 with second openings 308 of second body 304 when first body 302 and second body 304 are moved into contact with each other and each one of indexing pins is inserted through corresponding one of first openings 306 and corresponding one of second openings 308.

For the purpose of this disclosure, the term "along," in reference to extending along an axis, means coincident with or parallel to that axis.

For the purpose of the present disclosure, the phrases "corresponding one of first openings 306" and "corresponding one of second openings 308" refer to one of first openings 306 and one of second openings 308 that correspond to each other and to each one of indexing pins 100, which are to be aligned with each other for insertion of indexing pin 100 when positioning and aligning first body 302 and second body 304 relative to each other.

For the purpose of the present disclosure, the term "clearance fit" has its ordinary meaning, known to those skilled in the art, and refers to an engineering fit, where an opening is larger than an element, located in the opening, enabling two parts to slide and/or rotate when assembled.

As illustrated in FIGS. 21-28, proper, or desired, alignment of structure 300 is achieved by aligning first openings 306 and second openings 308 relative to each other with indexing pins 100 when first body 302 and second body 304 are moved relative to each other, such as into a stacked configuration with first-body second surface 334 of first body 302 in contact with second-body first surface 332 of second body 304 and each one of indexing pins 100 is inserted in one of first openings 306 and corresponding one of second openings 308.

In one or more examples, first body 302 and second body 304 include, or are formed from, a composite material, such as a fiber-reinforced polymer composite. In one or more examples, first body 302 and second body 304 include, or are formed from, a metallic material. In one or more examples, first body 302 and second body 304 include, or are formed from, a plastic material, such as a thermoplastic.

In one or more examples, structure 300 is, or forms a portion of, a sub-structure or component of a larger manufactured structure or assembly. In one or more examples, structure 300 is, or forms a portion of, a vehicle structure, such as an aerospace vehicle, a space vehicle, a marine vehicle, a land vehicle, or the like. In one or more examples, structure 300 is, or forms a portion of, a stand-alone structure, such as a building, an antenna, a satellite, a rocket, or the like.

In one or more examples, during assembly of structure 300, first body 302 and second body 304 are initially arranged in a stacked configuration, also referred to herein as stack. First openings 306 and second openings 308 are machined (e.g., drilled) through the arranged stack of first body 302 and second body 304. Following formation of first openings 306 and second openings 308, first body 302 and second body 304 are separated so that one or more finishing operations can be performed on first body 302 and/or second body 304. An example of such finishing operations includes a deburring process that removes unwanted material from first body 302 and second body 304, such as removal of material surrounding first openings 306 and second openings 308, respectively. Removal of such unwanted material may mitigate undesirable electromagnetic environmental effects (EME) on structure 300 during use of structure 300, such as effects from static electric discharge and lighting strike. Mitigation of undesirable EME may be particularly beneficial when structure 300 is an aerospace structure.

As illustrated in FIGS. 21-28, according to the examples disclosed herein, indexing pins 100 enable realignment of first openings 306 and second openings 308 when rearranging first body 302 and second body 304 back into a stacked configuration for final assembly of structure 300. In one or more examples, final assembly of structure 300 includes installation of fasteners through aligned ones of first openings 306 and second openings 308, structural bonding of first body 302 and second body 304, and the like.

As illustrated in FIGS. 21-28, in one or more examples, with each one of indexing pins 100 located within one of first openings 306, each one of indexing pins 100 urges alignment of one of first openings 306 and corresponding one of second openings 308 when first body 302 and second body 304 are moved toward each other, while inserting each one of indexing pins 100 through corresponding one of second openings 308 until first-body second surface 334 contacts second-body first surface 332.

Accordingly, plurality of indexing pins 100 can be used to urge alignment of selected ones of first openings 306 and selected corresponding ones of second openings 308. Upon alignment of selected ones of first openings 306 with selected corresponding ones of second openings 308 using indexing pins 100, non-selected ones of first openings 306 will be aligned with non-selected corresponding ones of second openings 308 so that first body 302 and second body 304 are properly aligned for final assembly, such as installation of fasteners.

Advantageously, with all of first openings 306 of first body 302 aligned with all of corresponding ones of second openings 308 of second body 304, fasteners can be installed, for example, by inserting each one of fasteners through one of first openings 306 and corresponding one of second openings 308, without damaging first body 302 and/or second body 304. Beneficially, the ability to install fasteners in properly pre-aligned ones of first openings 306 and corresponding ones of second openings 308 eliminates the need for fastener sleeves, which reduces the processing time and cost of manufacturing structure 300 and reduces the overall weight of structure 300.

As illustrated in FIGS. 2-6B, cylindrical surface 104 forms or otherwise defines a main shaft or shank portion of each one of indexing pins 100 that extends along central axis 154 between stem 148 and threaded portion 126. In one or more examples, cylindrical surface 104 extends between flange 136 and tapered surface 112. Cylindrical surface 104 has a circular cross-sectional shape in a plane, perpendicular to central axis 154 of indexing pin 100. Cylindrical surface 104 has a diameter that is constant along its length.

For the purpose of the present disclosure, a "plane", used to reference locations, orientations, and/or shapes of features and elements, refers to a virtual reference plane, having the attributes of an entity without possessing its physical form. For example, a virtual reference plane is an intangible or imaginary plane, rather than a physical one, with respect to which, e.g., location, orientation, and/or shape of other physical and/or intangible entities may be defined.

As illustrated in FIGS. 21-28 and 34-40, cylindrical surface 104 provides, or serves as, an indexing surface of each one of indexing pins 100 that contacts portion of first wall 310 of one of first openings 306 when each one of indexing pins 100 is inserted in, or through, one of first openings 306. Similarly, cylindrical surface 104 provides, or serves as, an indexing surface of each one of indexing pins 100 that contacts portion of second wall 312 of corresponding one of second openings 308 when each one of indexing pins 100 is inserted in, or through, corresponding one of second openings 308 to urge a position change in at least one of first body 302 and second body 304 relative to each other during alignment of one of first openings 306 and corresponding one of second openings 308 through which each one of indexing pins 100 is inserted.

As illustrated in FIGS. 2-6B, tapered surface 112 forms or otherwise defines a lead-in portion of each one of indexing pins 100 that extends along central axis 154 between cylindrical surface 104 and threaded portion 126. Tapered surface 112 has a circular cross-sectional shape in a plane, perpendicular to central axis 154 of indexing pin 100. Tapered surface 112 has a diameter that varies along its length.

When each one of indexing pins 100 is inserted in one of first openings 306, tapered surface 112 enables each one of indexing pins 100 to enter one of first openings 306 without imparting an impact load on first body 302, such as on an edge of first-body first surface 330 defining portion of corresponding one of first openings 306. As illustrated in FIGS. 22 and 26, when each one of indexing pins 100 is inserted in one of second openings 308, tapered surface 112 enables each one of indexing pins 100 to enter one of second openings 308 without imparting an impact load on second body 304, such as an edge of second-body first surface 332 defining portion of corresponding one of second openings 308.

As illustrated in FIGS. 2-6B, stem 148 forms or otherwise defines an operator-engagement portion of each one of indexing pins 100 that extends along central axis 154 opposite to threaded portion 126. In one or more examples, stem 148 extends from flange 136 opposite cylindrical surface 104. In one or more examples, engagement of stem 148, for example, via an operator, prevents rotation of corresponding one of indexing pins 100 about central axis 154. In one or more examples, engagement of stem 148, for example, via the operator, enables extraction of corresponding one of indexing pins 100 from one of first openings 306 and corresponding one of second openings 308, for example, following alignment of structure 300.

As illustrated in FIGS. 2-6B, threaded portion 126 forms or otherwise defines a nut-engagement portion of each one of indexing pins 100 that extends along central axis 154 opposite to cylindrical surface 104. In one or more examples, threaded portion 126 extends from tapered surface 112 opposite cylindrical surface 104. Threaded portion 126 has a circular cross-sectional shape in a plane, perpendicular to central axis 154 of indexing pin 100. Threaded surface 126 has a diameter that is constant along its length. Threaded portion 126 includes external thread.

As illustrated in FIGS. 11, 12, and 29-31, threaded portion 126 enables each one of nuts 204 to be removably coupled to corresponding one of indexing pins 100 so that first body 302 and second body 304 are clamped together between each one of indexing pins 100 and corresponding one of nuts 204, for example, following alignment of structure 300 with indexing pin 100.

As illustrated in FIGS. 21-28, according to the examples disclosed herein, insertion of each one of indexing pins 100 through one of first openings 306 of first body 302 and corresponding one of second openings 308 of second body 304 aligns first openings 306 and second openings 308 by moving first body 302 and/or second body 304 relative to each other in a direction, perpendicular to central axis 154 of each one of indexing pins 100. Movement of first body 302 and/or second body 304 relative to each other in a direction, perpendicular to central axis 154 of each one of indexing pins 100, as each one of indexing pins 100 is inserted through one of first openings 306 and corresponding one of second openings 308 brings fourth central axis 338 of corresponding one of first openings 306 and fifth central axis 340 of corresponding one of second openings 308 closer to being coincident with each other.

In one or more examples, (block 1004) orienting first body 302, (block 1008) orienting second body 304, (block 1010) aligning each one of second openings 308 of second body 304 with corresponding one of indexing pins 100, (block 1012) moving first body 302 and second body 304 toward each other the first distance, (block 1014) moving first body 302 and second body 304 toward each other the second distance, (block 1020) moving first body 302 and second body 304 toward each other the third distance, and (block 1026) moving first body 302 and second body 304 toward each other fourth distance are performed using a material handling system, such as a robotic manipulator, having a specialized end effector configured to handle first body 302 and second body 304. In one or more examples, such a material handling system may be manually controlled. In one or more examples, such a material handling system may be automatically controlled, for example, via computer numeric controls, machine vision, or any other suitable automated or preprogramed machine controls.

For the purpose of the present disclosure, the term "second distance" refers to an additional distance relative to "first distance." The term "third distance" refers to an additional distance relative to "second distance." The term "fourth distance" refers to an additional distance relative to "third distance."

In one or more examples, (block 1012) moving first body 302 and second body 304 toward each other the first distance is performed while maintaining alignment of each one of second openings 308 of second body 304 with corresponding one of indexing pins 100, extending past first-body second surface 334, so that, in plan view, threaded portion 126 of each one of indexing pins 100 is surrounded by and is spaced away from second wall 312 of corresponding one of second openings 308 of second body 304.

In one or more examples, (block 1006) inserting each one of indexing pins 100 into corresponding one of first openings 306, (block 1018) applying downward force to each one of indexing pins 100, (block 1024) applying downward force to each one of indexing pins 100, and (block 1028) applying downward force to each one of indexing pins 100 are performed using a material handling system, such as a robotic manipulator, having a specialized end effector configured to handle indexing pins 100. In one or more examples, such a material handling system may be manually controlled. In one or more examples, such a material handling system may be automatically controlled, for example, via computer numeric controls, machine vision, or any other suitable automated or preprogramed machine controls.

According to the examples disclosed herein, (block 1006) inserting each one of indexing pins 100 into corresponding one of first openings 306 locates each one of indexing pins 100 within corresponding one of first openings 306 so that central axis 154 of each one of indexing pins 100 is axially aligned with fourth central axis 338 of corresponding one of first openings 306.

For the purpose of the present disclosure, the term "axially aligned" refers to two axes being parallel to or coincident with each other. For the purpose of the present disclosure, the term "coaxially aligned" refers to two axes being coincident with each other.

With each one of indexing pins 100 inserted into a corresponding one of first openings 306 of first body 302 with clearance fit so that portion of cylindrical surface 104 of each one of indexing pins 100 is located in corresponding one of first openings 306 and central axis 154 of each one of indexing pins 100 and fourth central axis 338 of corresponding one of first openings 306 being parallel to each other, an axial offset between central axis 154 of each one of indexing pins 100 and fourth central axis 338 of corresponding one of first openings 306 is less than or equal to one-half of the difference between cylindrical-surface diameter 128 of cylindrical surface 104 of each one of indexing pins 100 and first diameter of corresponding one of first openings 306.

According the examples disclosed herein, steps of (block 1026) moving first body 302 and second body 304 toward each other fourth distance, while (block 1028) applying downward force to each one of indexing pins 100 locates each one of indexing pins 100 within corresponding one of second openings 308 so that central axis 154 of each one of indexing pins 100 is axially aligned with fifth central axis 340 of corresponding one of second openings 308.

With each one of indexing pins 100 inserted into a corresponding one of second openings 308 of second body 304 with clearance fit so that portion of cylindrical surface 104 of each one of indexing pins 100 is located in corresponding one of second openings 308 and central axis 154 of each one of indexing pins 100 and fifth central axis 340 of corresponding one of second openings 308 being parallel to each other, an axial offset between central axis 154 of each one of indexing pins 100 and fifth central axis 340 of corresponding one of second openings 308 is less than or equal to one-half of the difference between cylindrical-surface diameter 128 of cylindrical surface 104 of each one of indexing pins 100 and second diameter of corresponding one of second openings 308.

According the examples disclosed herein, with cylindrical surface 104 of each one of indexing pins 100 located in one of first openings 306 and corresponding one of second openings 308, an axial offset between fourth central axis 338 of one of first openings 306 and fifth central axis 340 of corresponding one of second openings 308 is less than or equal to the difference between cylindrical-surface diameter 128 of cylindrical surface 104 of each one of indexing pins 100 and one of first diameter of corresponding one of first openings 306 or second diameter of corresponding one of second openings 308.

Referring generally to FIGS. 41A, 41B, and 41C and particularly to, e.g., FIGS. 2-6B, 18, 19, 25-28, and 37-40, according to method 1000, portions of first-body first surface 330, surrounding first openings 306, are countersinks 320. Flange 136 of each one of indexing pins 100 comprises frustoconical flange surface 162, located between cylindrical surface 104 and stem 148 of each one of indexing pins 100. According to method 1000, (block 1006) inserting each one of indexing pins 100 into corresponding one of first openings 306 comprises (block 1030) abutting frustoconical flange surface 162 of each one of indexing pins 100 against corresponding one of countersinks 320. The preceding subject matter of this paragraph characterizes example 39 of the present disclosure, wherein example 39 also includes the subject matter according to example 38, above.

Method 1000 facilitates use of each one of indexing pins 100 with first body 302 having portions of first-body first surface 330, surrounding first openings 306, that include countersinks 320

Frustoconical flange surface 162 of flange 136 provides a countersunk head design for indexing pins 100. Mating engagement of frustoconical flange surface 162 with countersink 320 locates central axis 154 of each one of indexing pins 100 coincident with fourth central axis 338 of corresponding ones of first openings 306. Frustoconical flange surface 162 of flange 136 prevents each one of indexing pins 100 from moving within corresponding one of first openings 306, in a direction transverse to fourth central axis 338 of corresponding one of first openings 306, when each one of indexing pins 100 is being inserted into corresponding ones of second openings 308.

As illustrated in FIGS. 25-28, in one or more examples, portion of first-body first surface 330 surrounding corresponding one of first openings 306 includes countersink 320. As illustrated in FIGS. 25 and 40, in one or more examples, with portion of cylindrical surface 104 of each one of indexing pins 100 located within one of first openings 306, frustoconical flange surface 162 enables flange 136 to be received within countersink 320 of corresponding one of first openings 306 and to rest on portion of first-body first surface 330 surrounding corresponding one of first openings 306. In other words, frustoconical flange surface 162 of flange 136 provides a countersunk head design for each one of indexing pins 100.

As illustrated in FIGS. 25-28, with portion of cylindrical surface 104 of each one of indexing pins 100 located within one of first openings 306, frustoconical flange surface 162 of flange 136 also provides a secondary indexing surface that engages portion of first-body first surface 330 that defines countersink 320 to center each one of indexing pins 100 relative to corresponding one of first openings 306. In other words, with frustoconical flange surface 162 properly seated in countersink 320, each one of indexing pins 100 is centered within corresponding one of first openings 306 and engagement of frustoconical flange surface 162 with countersink 320 coaxially aligns center axis 154 of each one of indexing pins 100 with fourth central axis 338 of corresponding one of first openings 306.

Referring generally to FIGS. 41A, 41B, and 41C and particularly to, e.g., FIGS. 2-6B, 17, and 20-24, according to method 1000, portions of first-body first surface 330, surrounding first openings 306, are planar. Flange 136 of each one of indexing pins 100 comprises planar flange surface 160, located between cylindrical surface 104 and stem 148 of each one of indexing pins 100 and oriented transversely to central axis 154 of each one of indexing pins 100. According to method 1000, (block 1006) inserting each one of indexing pins 100 into corresponding one of first openings 306 comprises (block 1032) abutting planar flange surface 160 of each one of indexing pins 100 against corresponding one of portions of first-body first surface 330, surrounding first openings 306. The preceding subject matter of this paragraph characterizes example 40 of the present disclosure, wherein example 40 also includes the subject matter according to example 38 above.

Method 1000 facilitates use of each one of indexing pins 100 with first body 302 having portions of first-body first surface 330, surrounding first openings 306, that are planar.

Planar flange surface 160 enables flange 136 to contact portion of first-body first surface 330 that surrounds corresponding one of first openings 306 that is planar when each one of indexing pins 100 is fully inserted in corresponding one of first openings 306. Planar flange surface 160 of flange 136 allows each one of indexing pins 100 to move within corresponding one of first openings 306, in a direction transverse to fourth central axis 338 of corresponding one of first openings 306, when each one of indexing pins 100 is being inserted into corresponding ones of second openings 308.

As illustrated in FIGS. 21-24, in one or more examples, portion of first-body first surface 330 surrounding corresponding one of first openings 306 is planar. As illustrated in FIG. 21, in one or more examples, with portion of cylindrical surface 104 of each one of indexing pins 100 located within corresponding one of first openings 306, planar flange surface 160 enables flange 136 of each one of indexing pins 100 to rest on portion of first-body first surface 330, surrounding corresponding one of first openings 306, that is planar. In other words, planar flange surface 160 of flange 136 provides a protrusion head design for each one of indexing pins 100. In one or more examples, planar flange surface 160 extends perpendicular to central axis 154 between frustoconical flange surface 162 and cylindrical surface 104.

Referring generally to FIGS. 41A, 41B, and 41C and particularly to, e.g., FIGS. 11-20, and 29-31, method 1000 further comprises (block 1034) threadably coupling nuts 204, coupled to corresponding ones of protective clamping members 206, to threaded portions 126 of corresponding ones of indexing pins 100 so that protective clamping members 206 are located between nuts 204 and second-body second surface 336. Method 1000 also comprises (block 1036) clamping first body 302 and second body 304 between flanges 136 of indexing pins 100 and protective clamping members 206 so that nuts 204 are preloaded against protective clamping members 206 along central axes 154 of indexing pins 100 by force within predetermined range. The preceding subject matter of this paragraph characterizes example 41 of the present disclosure, wherein example 41 also includes the subject matter according to any one of examples 38 to 40 above.

Method 2000 facilitates clamping first body 302 and second body 304 together between flanges 136 of indexing pins 100 and protective clamping members 206 for assembly of structure 300.

Threadably coupling each one of nuts 204 to threaded portion 126 of a corresponding one of indexing pins 100 clamps first body 302 and second body 304 between flange 136 of each one of indexing pins 100 and corresponding one of protective clamping members 206 for assembly of structure 300, such as for installation of fasteners in first openings 306 and corresponding ones of second openings 308.

As illustrated in FIGS. 11, 12, 17-20, and 29-31, threaded portion 126 enables each one of nuts 204 to be removably coupled to corresponding one of indexing pins 100 in order to clamp first body 302 and second body 304 together between each one of indexing pins 100 and corresponding one of protective clamping members 206, for example, following alignment of structure 300. First body 302 and second body 304 are clamped between flange 136 of each one of indexing pins 100 and corresponding one of protective clamping members 206 when each one of nuts 204 is threadably coupled with threaded portion 126 and preloaded against corresponding one of protective clamping members 206 along central axis 154 by force within predetermined range.

In one or more examples, (block 1034) threadably coupling nuts 204, coupled to corresponding ones of protective clamping members 206, to threaded portions 126 of corresponding ones of indexing pins 100 so that protective clamping members 206 are located between nuts 204 and second-body second surface 336 is performed manually.

Referring generally to FIGS. 41A, 41B, and 41C and particularly to, e.g., FIGS. 29-31, according to method 1000, (block 1036) threadably coupling nuts 204 to threaded portions 126 of corresponding ones of indexing pins 100 comprises steps of (block 1038) preventing rotation of indexing pins 100 relative to first body 302 and second body 304 and (block 1040) preventing rotation of protective clamping members 206 relative to second-body second surface 336 while tightening nuts 204 onto threaded portions 126 of corresponding ones of indexing pins 100. The preceding subject matter of this paragraph characterizes example 42 of the present disclosure, wherein example 42 also includes the subject matter according to example 41 above.

Rotating each one of nuts 204 while preventing rotation of corresponding one of indexing pins 100 enables each one of nuts 204 to be threadably coupled with threaded portion 126 of corresponding one of indexing pins 100 and pre-loaded against corresponding one of protective clamping members 206 to clamp first body 302 and second body 304 together between flange 136 of each one of indexing pins 100 and corresponding one of protective clamping members 206. Preventing rotation of each one of protective clamping members 206 relative to second-body second surface 336 prevents damage to second-body second surface 336 during rotation of corresponding one of nuts 204.

Referring generally to FIGS. 41A, 41B, and 41C and particularly to, e.g., FIGS. 2-8, 11, and 12, according to method 1000, stem 148 of each one of indexing pins 100 comprises at least one of first means 156 for providing complementary engagement with a first tool, second means 192 for providing complementary engagement with a second tool, and third means 194 for providing complementary engagement with a third tool. Threaded portion 126 of each one of indexing pins 100 comprises fourth means 166 for providing complementary engagement with fourth tool. Each one of nuts 204 comprises second central axis 208. Each one of nuts 204 further comprises head 212, comprising fifth means 264 for providing complementary engagement with a fifth tool. Each one of nuts 204 also comprises barrel 210, having external barrel diameter 218. Each one of nuts 204 further comprises collar 220, located between head 212 and barrel 210 and having maximum collar dimension 222, measured in direction, transverse to second central axis 208 and comprising knurled surface 232. Maximum collar dimension 222 is greater than either of external barrel diameter 218 or external protective-clamping-member diameter 216 of protective clamping member 206. Each one of nuts 204 also comprises through passage 262, extending through barrel 210 and comprising internal thread 260. According to method 1000, (block 1034) threadably coupling nuts 204 to threaded portions 126 of corresponding ones of indexing pins 100 comprises (block 1042) preparing to apply torque to indexing pins 100 by one of (block 1044) manually engaging stem 148 of each one of indexing pins 100, (block 1046) engaging first means 156 of stem 148 of each one of indexing pins 100 with the first tool, (block 1048) engaging second means 192 of stem 148 of each one of indexing pins 100 with the second tool, (block 1050) engaging third means 194 of stem 148 of each one of indexing pins 100 with the third tool, or (block 1052) engaging fourth means 166 of threaded portion 126 of each one of indexing pins 100 with fourth tool. According to method 1000, (block 1034) threadably coupling nuts 204 to threaded portions 126 of corresponding ones of indexing pins 100 further comprises (block 1054) preparing to apply torque to nuts 204 by one of (block 1056) manually engaging knurled surface 232 of collar 220 of each one of nuts 204 or (block 1058) engaging fifth means 264 of head 212 of each one of nuts 204 with the fifth tool. In accordance with method 1000, (block 1034) threadably coupling nuts 204 to threaded portions 126 of corresponding ones of indexing pins 100 also comprises (block 1080) applying torque to indexing pins 100 and nuts 204 by rotating indexing pins 100 and nuts 204 relative to each other in predetermined direction. The preceding subject matter of this paragraph characterizes example 43 of the present disclosure, wherein example 43 also includes the subject matter according to example 42 above.

First means 156 enables use of the first tool (not shown) to engage each one of indexing pins 100 and to remove each one of indexing pins 100 and/or prevent rotation of each one of indexing pins 100 about central axis 154. Second means 192 enables use of the second tool (not shown) to engage each one of indexing pin 100 and prevent rotation of each one of indexing pins 100 about central axis 154. Third means 194 enables use of the third tool (not shown) to engage each one of indexing pins 100 and prevent rotation of each one of indexing pins 100 about central axis 154. Fourth means 166 enables use of fourth tool (not shown) to engage each one of indexing pins 100 and prevent rotation of each one of indexing pins 100 about central axis 154. Head 212, collar 220, barrel 210, and through passage 262 of each one of nuts 204 provide a structural interface for coupling each one of nuts 204 and a corresponding one of protective clamping members 206 together and removably coupling each one of nuts 204 with threaded portion 126 of a corresponding one of indexing pins 100. Fifth means 264 enables use of the fifth tool (not shown) to engage head 212 and to rotate each one of nuts 204 about second central axis 208 when threadably coupling each one of nuts 204 to threaded portion 126 of a corresponding one of indexing pins 100. Knurled surface 232 provides a frictional interface for hand tightening each one of nuts 204 to a corresponding one of indexing pins 100 when clamping first body 302 and second body 304 together.

In one or more examples, complementary engagement of the first tool with first means 156 enables each one of indexing pins 100 to be removed from one of first openings 306 and corresponding one of second openings 308, for example, following alignment of structure 300. In one or more examples, complementary engagement of the first tool with first means 156 prevents rotation of each one of indexing pins 100 about central axis 154 at second end 152 (FIG. 2) of corresponding one of indexing pins 100, for example, when threadably coupling each one of nuts 204 (FIG. 11) with threaded portion 126 of a corresponding one of indexing pins 100.

Generally, first means 156 includes, or takes the form of, any structural feature that provides complementary engagement with the first tool, and the first tool includes, or takes the form of, any implement or instrument that engages the particular structural feature corresponding to first means 156 and that enables manipulation of each one of indexing pins 100. In one or more examples, first means 156 is an aperture, formed in and extending partially through stem 148, and the first tool is a pin or other shafted element, configured to be inserted in the aperture. In one or more examples, first means 156 is at least one recess or slot, formed in and extending partially through stem 148, and the first tool is an edged element, configured to matingly engage the at least one recess or slot. In one or more examples, first means 156 is a through hole, formed in and extending completely through stem 148, and the first tool is a pin or elongated shaft, configured to be inserted through the through hole.

In one or more examples, complementary engagement of the second tool with second means 192 prevents rotation of each one of indexing pins 100 about central axis 154 at second end 152 (FIG. 2) of corresponding one of indexing pins 100, for example, when threadably coupling each one of nuts 204 (FIG. 11) with threaded portion 126 of a corresponding one of indexing pins 100.

Generally, second means 192 includes, or takes the form of, any structural feature that provides complementary engagement with the second tool, and the second tool includes, or takes the form of, any implement or instrument that engages the particular structural feature, corresponding to second means 192 and that enables manipulation of each one of indexing pins 100. In one or more examples, second means 192 is different than first means 156 and the second tool is different than the first tool. In one or more examples, second means 192 includes a polygon structure or head with a plurality of planar sides that forms at least portion of stem 148 and has a polygonal cross-sectional shape in a plane, perpendicular to central axis 154, and the second tool is wrench, having a polygonal socket or pliers. In one or more examples, as illustrated in FIGS. 5A-6B, second means 192 is a hexagonal head (e.g., a six-sided head) that forms at least portion of stem 148, and the second tool is a wrench, having a hexagonal socket or pliers, configured to engage the hexagonal head in a complementary manner. In one or more examples, second means 192 is a square head (e.g., a four-sided head) that forms at least portion of stem 148, and the second tool is a wrench, having a square socket or pliers, configured to engage the square head in a complementary manner.

In one or more examples, complementary engagement of the third tool with third means 194 prevents rotation of each one of indexing pins 100 about central axis 154 at second end 152 (FIG. 2) of corresponding one of indexing pins 100, for example, when threadably coupling each one of nuts 204 (FIG. 11) with threaded portion 126 of corresponding one of indexing pins 100.

Generally, third means 194 includes, or takes the form of, any structural feature that provides complementary engagement with the third tool, and the third tool includes, or takes the form of, any implement or instrument that engages the particular structural feature, corresponding to third means 194 and that enables manipulation of each one of indexing pins 100. In one or more examples, third means 194 is different than first means 156 and second means 192 and the third tool is different than the first tool and the second tool. In one or more examples, third means 194 is a shaped drive cavity, or socket, formed in and extending partially through an end of stem 148, and the third tool is a driver, having a working end, configured to engage the shaped drive cavity in a complementary manner. Examples of the shaped drive cavity include slotted cavities (e.g., slot or cross), cruciform cavities (e.g., Phillips, Mortorq, Frearson, Pozidriv, French, Supadriv, Torq), internal polygon cavities (e.g., square, security hex, Robertson, double-square, hex, triple-square, 12-point, 12-spline flange, Allen, double hex), hexalobular (e.g., Torx, security Torx, line head male, line head female, polydrive), three-pointed cavities (e.g., TA or triangle-shaped, tri-groove or T-groove, tri-point, tri-wing), or special cavities (e.g., clutch A, Quadrex, clutch G, Pentalobe, one-way, spanner head, Bristol).

In one or more examples, complementary engagement of fourth tool with fourth means 166 prevents rotation of each one of indexing pins 100 about central axis 154 at first end 150 (FIG. 2) of corresponding one of indexing pins 100, for example, when threadably coupling each one of nuts 204 (FIG. 11) with threaded portion 126 of corresponding one of indexing pins 100.

Generally, fourth means 166 includes, or takes the form of, any structural feature that provides complementary engagement with fourth tool and the third tool includes, or takes the form of, any implement or instrument that engages the particular structural feature, corresponding to fourth means 166 and that enables manipulation of each one of indexing pins 100. In one or more examples, fourth means 166 is different than first means 156, second means 192, and third means 194 and fourth tool is different than the first tool, the second tool, and the third tool. In one or more examples, fourth means 166 is the same as third means 194, and fourth tool is the same as the third tool. In one or more examples, fourth means 166 is a shaped drive cavity, or socket, formed in and extending partially through an end of threaded portion 126, and fourth tool is a driver, having a working end, configured to engage the shaped drive cavity in a complementary manner. Examples of the shaped drive cavity include slotted cavities (e.g., slot or cross), cruciform cavities (e.g., Phillips, Mortorq, Frearson, Pozidriv, French, Supadriv, Torq), internal polygon cavities (e.g., square, security hex, Robertson, double-square, hex, triple-square, 12-point, 12-spline flange, Allen, double hex), hexalobular (e.g., Torx, security Torx, line head male, line head female, polydrive), three-pointed cavities (e.g., TA or triangle-shaped, tri-groove or T-groove, tri-point, tri-wing), or special cavities (e.g., clutch A, Quadrex, clutch G, Pentalobe, one-way, spanner head, Bristol).

Head 212 forms or otherwise defines an operator-engagement portion of each one of nuts 204. In one or more examples, head 212 extends along second central axis 208. In one or more examples, engagement of head 212, for example, via application of torque to head 212 by an operator, rotates each corresponding one of nuts 204 about second central axis 208, such as when threadably coupling each one of nuts 204 with threaded portion 126 of corresponding one of indexing pins 100.

Barrel 210 forms or otherwise defines a protective-clamping-member-interface portion of each one of nuts 204. In one or more examples, barrel 210 extends along second central axis 208 opposite head 212. In one or more examples, barrel 210 is configured to interface and be frictionally coupled with corresponding one of protective clamping members 206. In one or more examples, barrel 210 has a circular cross-sectional shape in a plane, perpendicular to second central axis 208 of nut 204 and has a diameter that is constant along its length.

Collar 220 forms or otherwise defines a protective clamping member-engagement portion of each one of nuts 204. In one or more examples, collar 220 extends along second central axis 208 between head 212 and barrel 210. Maximum collar dimension 222 of collar 220, being greater than the external barrel diameter 218 of barrel 210, extends collar 220 outward from barrel 210 perpendicularly to second central axis 208. With each one of nuts 204 and corresponding one of protective clamping members 206 coupled together, collar 220 is configured to contact a corresponding one of protective clamping members 206 when each one of nuts 204 is threadably coupled with threaded portion 126 of corresponding one of indexing pins 100 and pre-loaded against corresponding one of protective clamping members 206 to clamp first body 302 and second body 304 between flange 136 of each one of indexing pins 100 and corresponding one of protective clamping members 206.

In one or more examples, collar 220 also forms or otherwise defines another operator-engagement portion of each one of nuts 204. In one or more examples, engagement of collar 220, for example, via application of torque to collar 220 manually by an operator, rotates each one of nuts 204 about second central axis 208, such as when threadably coupling each one of nuts 204 with threaded portion 126 of corresponding one of indexing pins 100.

Through passage 262 forms or otherwise defines an indexing pin-engagement portion of each one of nuts 204. Through passage 262 extends along second central axis 208 through barrel 210. Through passage 262 is configured to receive threaded portion 126 of corresponding one of indexing pins 100 when each one of nuts 204 is threadably coupled with corresponding one of indexing pins 100. Internal thread 260 is configured to matingly engage threaded portion 126 when each one of nuts 204 is threadably coupled with threaded portion 126 of corresponding one of indexing pins 100.

As illustrated in FIG. 16, in one or more examples, through passage 262 extends only through barrel 210, and not through head 212 (i.e., head 212 is a solid element). Such a configuration of nuts 204 prevents over tightening of each one of nuts 204, when each one of nuts 204 is threadably coupled with threaded portion 126 of corresponding one of indexing pins 100, by providing a physical stop that limits movement of each one of nuts 204 along central axis 154 of corresponding one of indexing pins 100 when an end of threaded portion 126 contacts head 212.

As illustrated in FIGS. 15 and 17-20, in one or more examples, through passage 262 extends through collar 220 and head 212 of each one of nuts 204. Through passage 262 extending through collar 220 and head 212 of each one of nuts 204 provides increased adjustability of each one of nuts 24 relative to corresponding one of indexing pins 100 and enables threaded portion 126 of corresponding one of indexing pins 100 to extend through each one of nuts 204 when each one of nuts 204 is threadably coupled with threaded portion 126 of corresponding one of indexing pins 100. In one or more examples, through passage 262 extending through head 212 also enables fourth tool (not shown) to access fourth means 166 of each one of indexing pins 100 through head 212 of corresponding one of nuts 204 when threadably coupling each one of nuts 204 with threaded portion 126 of corresponding one of indexing pins 100.

As illustrated in FIGS. 13 and 15-20, in one or more examples, internal thread 260 of through passage 262 extends along all of through passage 262. Internal thread 260 extends along all of through passage 262, thereby increasing the size of a mating interface between each one of nuts 204 and threaded portion 126 of corresponding one of indexing pins 100 when each one of nuts 204 is threadably coupled with threaded portion 126 of corresponding one of indexing pins 100.

In one or more examples, complementary engagement of the fifth tool with fifth means 264 rotates each one of nuts 204 about second central axis 208 at first end 150 (FIG. 2) of corresponding one of indexing pins 100, for example, when threadably coupling each one of nuts 204 with threaded portion 126 of corresponding one of indexing pins 100.

Generally, fifth means 264 includes, or takes the form of, any structural feature that provides complementary engagement with the fifth tool, and the fifth tool includes, or takes the form of, any implement or instrument that engages the particular structural feature, corresponding to fifth means 264 and that enables manipulation of each one of nuts 204. In one or more examples, fifth means 264 is a polygon structure or head, with a plurality of planar sides, that forms at least portion of head 212 and has a polygonal cross-sectional shape in a plane, perpendicular to second central axis 208, and the fifth tool is wrench, having a polygonal socket or pliers. In one or more examples, as illustrated in FIGS. 11 and 12, fifth means 164 is a hexagonal head (e.g., a six-sided head) that forms at least a portion of head 212, and the fifth tool is a wrench, having a hexagonal socket or pliers, configured to engage the hexagonal head in complementary manner.

In one or more examples, the fifth tool for complementary engagement with fifth means 264 of head 212 of each one of nuts 204 and fourth tool for complementary engagement with fourth means 166 of threaded portion 126 of each one of indexing pins 100 are integrated into the same combination tool. Such a combination tool is any implement or instrument, configured to engage both the particular structural feature, corresponding to fifth means 264 and fourth means 166 to simultaneously manipulate each one of nuts 204 and a corresponding one of indexing pins 100.

In one or more examples, at least portion of an annular sidewall of collar 220, circumscribing second central axis 208, includes knurled surface 232. Knurled surface 232 includes any one of various kinds of knurling patterns formed on an external surface of the annular sidewall of collar 220.

Referring generally to FIGS. 41A, 41B, and 41C and particularly to, e.g., FIGS. 13-20, method 1000 further comprises (block 1060) coupling protective clamping members 206 to corresponding ones of nuts 204. According to method 1000, each one of protective clamping members 206 is cup-shaped and comprises third central axis 272. Each one of protective clamping members 206 further comprises base 274, comprising opening 240. Each one of protective clamping members 206 also comprises cylindrical wall 276, extending from base 274 along third central axis 272. Each one of protective clamping members 206 additionally comprises interior recess 224, at least partially defined by cylindrical wall 276 and communicatively coupled with opening 240. Each one of protective clamping members 206 also comprises internal annular groove 230, formed in cylindrical wall 276. Barrel 210 of each one of nuts 204 comprises external annular groove 226. Each pair of nuts 204 and corresponding ones of protective clamping members 206 holds captive O-ring 228, having circumferentially closed surface 278 that lies in plane, containing second central axis 208 of corresponding one of nuts 204. According to method 1000, (block 1060) coupling protective clamping members 206 to corresponding ones of nuts 204 comprises (block 1062) locating barrel 210 of each one of nuts 204 in interior recess 224 of corresponding one of protective clamping members 206 with a clearance fit, so that one portion of circumferentially closed surface 278 of O-ring 228 is located in external annular groove 226 of corresponding one of nuts 204, and another portion of circumferentially closed surface 278 of O-ring 228 is located in internal annular groove 230 of corresponding one of protective clamping members 206. The preceding subject matter of this paragraph characterizes example 44 of the present disclosure, wherein example 44 also includes the subject matter according to example 43 above.

Base 274, cylindrical wall 276, and interior recess 224 of each one of protective clamping members 206 provide a structural interface for coupling each one of protective clamping members 206 and corresponding one of nuts 204 together. Internal annular groove 230, external annular groove 226, and O-ring 228 provide for frictional coupling of each one of nuts 204 with corresponding one of protective clamping members 206 while allowing each one of nuts 204 and corresponding one of protective clamping members 206 to freely rotate about second central axis 208 relative to each other.

Base 274 forms or otherwise defines a second body-engagement portion of each one of protective clamping members 206. With each one of nuts 204 and corresponding one of protective clamping members 206 coupled together, base 274 is configured to contact second-body second surface 336 of second body 304 when each one of nuts 204 is threadably coupled with threaded portion 126 of corresponding one of indexing pins 100 and pre-loaded against corresponding one of protective clamping members 206. In one or more examples, base 274 has a circular cross-sectional shape in a plane, perpendicular to third central axis 272.

Opening 240 enables threaded portion 126 of each one of indexing pins 100 to enter interior recess 224 of corresponding one of protective clamping members 206 when threadably coupling each one of nuts 204 with threaded portion 126 of corresponding one of indexing pins 100. Opening 240 is coaxially aligned with third central axis 272.

Cylindrical wall 276 defines or otherwise forms a nut-engagement portion of each one of protective clamping members 206. Cylindrical wall 276 extends along third central axis 272 from base 274 and circumscribes third central axis 272. In one or more examples, with each one of nuts 204 and corresponding one of protective clamping members 206 coupled together, collar 220 of each one of nuts 204 contacts an end of cylindrical wall 276 of corresponding one of protective clamping members 206 when each one of nuts 204 is threadably coupled with threaded portion 126 of corresponding one of indexing pins 100 and pre-loaded against corresponding one of protective clamping members 206. Cylindrical wall 276 of each one of protective clamping members 206 spaces corresponding one of nuts 204 away from second body 304 and prevents corresponding one of nuts 204 from contacting second-body second surface 336 of second body 304. Cylindrical wall 276 has a circular cross-sectional shape in a plane, perpendicular to third central axis 272 of protective clamping member 206. Cylindrical wall 276 has a diameter that is constant along its length.

Interior recess 224 forms or otherwise defines a nut-receiving portion of each one of protective clamping members 206 that enables each one of nuts 204 to be removably coupled with corresponding one of protective clamping members 206. Interior recess 224 extends along third central axis 272 and is communicatively coupled with opening 240. With each one of nuts 204 and corresponding one of protective clamping members 206 coupled together, interior recess 224 of each one of protective clamping members 206 receives barrel 210 of corresponding one of nuts 204 with a clearance fit. With each one of nuts 204 and corresponding one of protective clamping members 206 coupled together, opening 240 enables threaded portion 126 of each one of indexing pins 100 to be received within interior recess 224 of corresponding one of protective clamping members 206 when each one of nuts 204 is threadably coupled with threaded portion 126 of corresponding one of indexing pins 100. Interior recess 224 is defined by base 274 and cylindrical wall 276.

O-ring 228 frictionally couples each one of nuts 204 and corresponding one of protective clamping members 206 together to prevent inadvertent separation of each one of nuts 204 from corresponding one of protective clamping members 206 and, thus, prevent foreign object debris (FOD), while enabling rotation of each one of nuts 204 and corresponding one of protective clamping members 206 about second central axis 208 relative to each other.

With each one of nuts 204 and corresponding one of protective clamping members 206 coupled together, each one of external annular groove 226 and internal annular groove 230 receives at least portion of circumferentially closed surface 278 of O-ring 228. External annular groove 226 and internal annular groove 230 are configured to enable each one of nuts 204 and corresponding one of protective clamping members 206 to freely rotate about second central axis 208 relative to each other. External annular groove 226 and internal annular groove 230 are configured to prevent linear movement of O-ring 228 along second central axis 208 relative to each one of nuts 204 and a corresponding one of protective clamping members 206 and thus, prevent linear movement of each one of nuts 204 along second central axis 208 relative to corresponding one of protective clamping members 206.

As best illustrated in FIG. 14, with each one of nuts 204 and corresponding one of protective clamping members 206 coupled together, a cross-sectional diameter of circumferentially closed surface 278 of O-ring 228 is greater than one-half of a cross-sectional dimension of a cross-section of an area, defined by a combination of external annular groove 226 and internal annular groove 230 that lies in the same plane as circumferentially closed surface 278 of O-ring 228. Such a configuration of external annular groove 226 and internal annular groove 230 holds O-ring 228 captive to prevent inadvertent separation of each one of nuts 204 from corresponding one of protective clamping members 206 while allowing free rotation of each one of nuts 204 and corresponding one of protective clamping members 206 about second central axis 208 relative to each other. Such a configuration of external annular groove 226 and internal annular groove 230 also enables forced (i.e., intentional) separation of each one of nuts 204 from corresponding one of protective clamping members 206.

In one or more examples, with each one of nuts 204 and corresponding one of protective clamping members 206 coupled together, O-ring 228 locates each one of nuts 204 relative to corresponding one of protective clamping members 206 so that second central axis 208 of each one of nuts 204 is coincident with third central axis 272 of corresponding one of protective clamping members 206. In one or more examples, with each one of nuts 204 and each corresponding one of protective clamping member 206 coupled together, O-ring 228 locates each one of nuts 204 relative to corresponding one of protective clamping members 206 so that second central axis 208 of each one of nuts 204 is parallel with third central axis 272 of corresponding one of protective clamping members 206.

Further, use of both external annular groove 226 and internal annular groove 230 with O-ring 228 also facilitates a snap-fit connection that provides a tactile verification that each one of nuts 204 and corresponding one of protective clamping members 206 are interlocked.

Referring generally to FIGS. 41A, 41B, and 41C and particularly to, e.g., FIGS. 12, 13, 15, and 16, according to method 1000, each one of protective clamping members 206 further comprises exterior surface 244, surrounding opening 240 of base 274. Each one of protective clamping members 206 also comprises annular surface 236, opposite base 274. According to method 1000, (block 1036) clamping first body 302 and second body 304 between flanges 136 of indexing pins 100 and protective clamping members 206 comprises (block 1064) abutting exterior surface 244 of base 274 of each one of protective clamping members 206 with portion of second-body second surface 336, surrounding corresponding one of second openings 308, and (block 1066) abutting annular surface 236 of each one of protective clamping members 206 with collar 220 of corresponding one of nuts 204. The preceding subject matter of this paragraph characterizes example 45 of the present disclosure, wherein example 45 also includes the subject matter according to example 44 above.

Exterior surface 244 provides contact interface between each one of protective clamping members 206 and second body 304. Annular surface 236 provides contact surface between each one of protective clamping members 206 and corresponding one of nuts 204. Contact engagement between annular surface 236 of each one of protective clamping members 206 and collar 220 of corresponding one of nuts 204 limits linear movement of each one of nuts 204 along second central axis 208 relative to corresponding one of protective clamping members 206 while allowing each one of nuts 204 and corresponding one of protective clamping members 206 to rotate about second central axis 208 relative to each other.

In one or more examples, with each one of nuts 204 and corresponding one of protective clamping members 206 coupled together, at least portion of exterior surface 244 contacts portion of second-body second surface 336 when each one of nuts 204 is threadably coupled with threaded portion 126 of corresponding one of indexing pins 100 and pre-loaded against corresponding one of protective clamping members 206.

In one or more examples, annular surface 258 forms or otherwise defines at least portion of an end of cylindrical wall 276 of protective clamping member 206. In one or more examples, annular surface 258 is configured to reduce friction between annular surface 258 and portion of a surface of collar 220, in contact with annular surface 258, due to rotation of nut 204 relative to protective clamping member 206. In one or more examples, annular surface 258 is highly polished to reduce friction from contact between annular surface 258 and collar 220 rotating relative to each other. In one or more examples, annular surface 258 includes a friction-reducing coating to reduce friction from contact between annular surface 258 and collar 220 rotating relative to each other.

Referring generally to FIGS. 41A, 41B, and 41C and particularly to, e.g., FIGS. 12, 13, 15, and 16, according to method 1000, each one of protective clamping members 206 further comprises second O-ring 266, located on exterior surface 244 of base 274. According to method 1000, (block 1040) preventing rotation of protective clamping members 206 relative to second-body second surface 336 comprises (block 1068) frictionally engaging second O-ring 266 of each one of protective clamping members 206 with portion of second-body second surface 336, surrounding corresponding one of second openings 308, and with exterior surface 244 of base 274 of each of protective clamping members 206. The preceding subject matter of this paragraph characterizes example 46 of the present disclosure, wherein example 46 also includes the subject matter according to example 45 above.

Second O-ring 266 prevents rotation of each one of protective clamping member 206 relative to second body 304 when corresponding one of nuts 204 is removably coupled with corresponding one of indexing pins 100.

In one or more examples, with each one of nuts 204 and corresponding one of protective clamping members 206 coupled together, second O-ring 266 engages portion of second-body second surface 336 of second body 304, surrounding corresponding one of second openings 308, when each one of nuts 204 is threadably coupled with threaded portion 126 of corresponding one of indexing pins 100 and pre-loaded against corresponding one of protective clamping members 206. Engagement between second O-ring 266 and second-body second surface 336 provides sufficient frictional force to resist rotation of each one of protective clamping members 206 about second central axis 208 relative to the second-body second surface 336 when each one of nuts 204 is rotated relative to corresponding one of protective clamping members 206.

Referring generally to FIGS. 41A, 41B, and 41C and particularly to, e.g., FIGS. 13, 16-18, and 20, according to method 1000, portions of second-body second surface 336, surrounding second openings 308, are planar. Exterior surface 244 of base 274 of each one of protective clamping members 206 is planar. According to method 1000, (block 1036) clamping first body 302 and second body 304 between flanges 136 of indexing pins 100 and protective clamping members 206 further comprises (block 1070) abutting exterior surface 244 of each one of protective clamping members 206 against portion of second-body second surface 336, surrounding corresponding one of second openings 308. The preceding subject matter of this paragraph characterizes example 47 of the present disclosure, wherein example 47 also includes the subject matter according to example 45 or 46 above.

Method 1000 facilitates use of each one of protective clamping members 206 with second body 304 having portions of second-body second surface 336, surrounding second openings 308, that are planar.

Exterior surface 244 of base 274 being planar enables each one of protective clamping members 206 to make substantially flush contact with second-body second surface 336 of second body 304 when portion of second-body second surface 336 surrounding corresponding one of second openings 308 is planar.

In one or more examples, exterior surface 244 of base 274 being planar enables portion of each one of protective clamping members 206 to abut portion of second-body first surface 332, surrounding corresponding one of second openings 308, that is planar when each one of nuts 204 is threadably coupled with threaded portion 126 of corresponding one of indexing pins 100 and pre-loaded against corresponding one of protective clamping members 206.

Referring generally to FIGS. 41A, 41B, and 41C and particularly to, e.g., FIGS. 15, 19, and 29-31, according to method 1000, portions of second-body second surface 336, surrounding second openings 308, are second countersinks 322. Barrel 210 of each one of nuts 204 comprises frustoconical barrel portion 254. Interior recess 224 of each one of protective clamping members 206 comprises frustoconical recess portion 256. Exterior surface 244 of base 274 of each one of protective clamping members 206 is frustoconical. Frustoconical barrel portion 254 of each one of nuts 204 is located in frustoconical recess portion 256 of corresponding one of protective clamping members 206 when nuts 204 are coupled to corresponding ones of protective clamping members 206. According to method 1000, (block 1036) clamping first body 302 and second body 304 between flanges 136 of indexing pins 100 and protective clamping members 206 further comprises (block 1072) abutting exterior surface 244 of each one of protective clamping members 206 against corresponding one of second countersinks 322. The preceding subject matter of this paragraph characterizes example 48 of the present disclosure, wherein example 48 also includes the subject matter according to example 45 or 46 above.

Method 1000 facilitates use of each one of protective clamping members 206 with second body 304 having portions of second-body second surface 336, surrounding second openings 308, that include second countersinks 322.

For the purpose of the present disclosure, the term "complementary" describes geometric shapes that fit together with precision in a hand-and-glove arrangement, like a shank and a receiver or a tenon and a mortise.

Exterior surface 244 of base 274 being frustoconical enables each one of protective clamping members 206 to make substantially flush contact with second-body second surface 336 of second body 304 when portion of second-body second surface 336, surrounding corresponding one of second openings 308, includes second countersink 322. Exterior surface 244 of base 274 being frustoconical prevents each one of protective clamping members 206 from moving, in a direction transverse to fifth central axis 340 of corresponding one of second openings 308, when each one of nuts 204 is threadably coupled with threaded portion 126 of corresponding one of indexing pins 100 and pre-loaded against corresponding one of protective clamping members 206.

Frustoconical recess portion 256 receives frustoconical barrel portion 254 to substantially center each one of nuts 204 relative to corresponding one of protective clamping members 206. As illustrated in FIGS. 29-31, in one or more examples, with each one of nuts 204 and corresponding one of protective clamping members 206 coupled together, frustoconical barrel portion 254 of barrel 210 of each one of nuts 204 is received by frustoconical recess portion 256 of interior recess 224 of corresponding one of protective clamping members 206. With each one of nuts 204 and corresponding one of protective clamping members 206 coupled together, complementary engagement between frustoconical barrel portion 254 of barrel 210 and frustoconical recess portion 256 of interior recess 224 locates second central axis 208 of each one of nuts 204 coincident with third central axis 272 of corresponding one of protective clamping members 206 when each one of nuts 204 is threadably coupled with threaded portion 126 of corresponding one of indexing pin 100 and pre-loaded against corresponding one of protective clamping members 206.

As illustrated in FIGS. 29-31, in one or more examples, portion of second-body first surface 332 surrounding corresponding one of second openings 308 includes second countersink 322. In one or more examples, exterior surface 244 of base 274 being frustoconical enables portion of protective clamping member 206 to abut and be received within second countersink 322 of corresponding one of second openings 308 when each one of nuts 204 is threadably coupled with threaded portion 126 of corresponding one of indexing pins 100 and pre-loaded against corresponding one of protective clamping members 206. With each one of nuts 204 and corresponding one of protective clamping members 206 coupled together, complementary engagement between exterior surface 244 of base 274 and countersink 320 locates third central axis 272 of protective clamping member 206 coincident with fourth central axis 338 of corresponding one of second openings 308 when each one of nuts 204 is threadably coupled with threaded portion 126 of corresponding one of indexing pins 100 and pre-loaded against corresponding one of protective clamping members 206.

As illustrated in FIGS. 17-20 and 29-31, according to the examples disclosed herein, with each one of nuts 204 coupled to corresponding one of protective clamping members 206 and each one of nuts 204 threadably coupled with threaded portion 126 of corresponding one of indexing pins 100 and pre-loaded against corresponding one of protective clamping members 206, complementary engagement between exterior surface 244 of base 274 and countersink 320 locates third central axis 272 of each one of protective clamping members 206 and fifth central axis 340 of corresponding one of second openings 308 (i.e., centers each one of protective clamping members 206 relative to corresponding one of second openings 308). With each one of nuts 204 coupled to corresponding one of protective clamping members 206 and each one of nuts 204 threadably coupled with threaded portion 126 of corresponding one of indexing pins 100 and pre-loaded against corresponding one of protective clamping members 206, complementary engagement between frustoconical barrel portion 254 of barrel 210 and frustoconical recess portion 256 of interior recess 224 locates second central axis 208 of each one of nuts 204 and third central axis 272 of corresponding one of protect clamping members 206 coincident with each other (i.e., centers each one of nuts 204 relative to corresponding one of protective clamping members 206) and, thus, locates second central axis 208 of each one of nuts 204 and fifth central axis 340 of corresponding one of second openings 308 coincident with each other (i.e., centers nut 204 relative to corresponding one of protective clamping members 206).

As illustrated in FIGS. 17-20 and 29-31, in one or more examples, each one of indexing pins 100 includes flange 136 having frustoconical flange surface 162, barrel 210 of each one of nuts 204 includes frustoconical barrel portion 254, interior recess 224 of each one of protective clamping members 206 includes frustoconical recess portion 256, and exterior surface 244 of base 274 of each one of protective clamping members 206 is frustoconical. In such a configuration, with each one of nuts 204 coupled to corresponding one of protective clamping members 206 and each one of nuts 204 threadably coupled with threaded portion 126 of corresponding one of indexing pins 100 and pre-loaded against corresponding one of protective clamping members 206, central axis 154 of each one of indexing pins 100, fourth central axis 338 of corresponding one of first openings 306, second central axis 208 of corresponding one of nuts 204, third central axis 272 of corresponding one of protective clamping member 206, and fifth central axis 340 of corresponding one of second openings 30 are located coincident with each other. In other words, in such a configuration, fourth central axis 338 of one of first openings 306 and fifth central axis 340 of corresponding one of second openings 308 are urged into coaxial alignment with each other, when each one of indexing pins 100 is inserted through one of first openings 306 and corresponding one of second openings 308, each one of nuts 204 is coupled to corresponding one of protective clamping members 206, and each one of nuts 204 threadably coupled with threaded portion 126 of corresponding one of indexing pins 100 and pre-loaded against corresponding one of protective clamping members 206 to clamp first body 302 and second body 304 together between flange 136 of corresponding one of indexing pins 100 and corresponding one of protective clamping members 206.

Referring generally to FIGS. 41A, 41B, and 41C and particularly to, e.g., FIG. 20, according to method 1000, sealant 328 is located between first-body second surface 334 and second-body first surface 332. Each one of indexing pins 100 further comprises channel 172, formed in at least portion of cylindrical surface 104 and extending helically about central axis 154. According to method 1000, (block 1036) clamping first body 302 and second body 304 between flanges 136 of indexing pins 100 and protective clamping members 206 further comprises (block 1074) routing at least portions of quantities of sealant 328, forced inside first openings 306 and second openings 308, along channel 172 of each one of indexing pins 100. The preceding subject matter of this paragraph characterizes example 49 of the present disclosure, wherein example 49 also includes the subject matter according to any one of examples 44 to 48, above.

Method 1000 facilitates collecting portion of quantities of sealant 328, located within one of first openings 306 and corresponding one of second openings 308, when each one of indexing pins 100 is inserted in one of first openings 306 and corresponding one of second openings 308 and when first body 302 and second body 304 are clamped together.

As illustrated in FIG. 20, in one or more examples, sealant 328 is applied to at least one of first-body second surface 334 and second-body first surface 332 and is located between first body 302 and second body 304. In one or more examples, sealant 328 is an adhesive, used to bond first body 302 and second body 304 together following alignment of structure 300. According the examples disclosed herein, quantities of sealant 328 may be forced inside first openings 306 and/or second openings 308 upon contact between first-body second surface 334 and second-body first surface 332.

In one or more examples, portions of quantities of sealant 328, located within one of first openings 306 and corresponding one of second openings 308, are routed along channel 172 of each one of indexing pins when first body 302 and second body 304 are clamped together between flange 136 of each one of indexing pins 100 and corresponding one of protective clamping members 206. Collecting excess portions of quantities of sealant 328 in channel 172 and/or routing portions of quantities of sealant 328 along cylindrical surface 104 within channel 172 prevents hydraulic locking between cylindrical surface 104 and one of first openings 306 and/or corresponding one of second openings 308.

Channel 172 enables portions of quantities of sealant 328, located within one of first openings 306 between cylindrical surface 104 of each one of indexing pins 100 and first wall 310 of corresponding one of first openings 306, and portions of quantities of sealant 328, located within corresponding one of second openings 308 between cylindrical surface 104 of each one of indexing pins 100 and second wall 312 of corresponding one of second openings 308, to fill channel 172 and to be routed along channel 172 when first body 302 and second body 304 are clamped together between flange 136 of each one of indexing pins 100 and corresponding one of protective clamping members 206.

In one or more examples, channel 172 has any one of a variety of different helix angles. Similarly, channel 172 may have any one of a variety of different widths and/or depths. The helix angle, the width, and/or the depth of channel 172 may depend on various factors including, but not limited to, the material characteristics of sealant 328, the volume of sealant 328 applied between first body 302 and second body 304, the volume of quantities of sealant 328, forced into one of first openings 306 and/or corresponding one of second openings 308, and the like.

Generally, portion of quantities of sealant 328, located within one of first openings 306 and/or corresponding one of second openings 308, is routed along channel 172 in a direction, opposite to a direction of insertion of indexing pin 100.

As illustrated in FIGS. 5A and 6A, in one or more examples, channel 172 terminates prior to tapered surface 112. Channel 172 being formed only in cylindrical surface 104, rather than also being formed in tapered surface 112, ensures that there are no sharp edges formed on tapered surface 112 that could potentially damage first wall 310 of corresponding one of first openings 306 and/or second wall 312 of corresponding one of second openings 308 (FIG. 20) when indexing pin 100 is inserted in one of first openings 306 and corresponding one of second openings 308.

As illustrated in FIGS. 5A-6B, in one or more examples, channel 172 includes channel first end 182 and channel second end 184, opposite channel first end 182. Channel second end 184 is proximate to flange 136. Extending channel 172 to flange 136 of corresponding one of indexing pins 100 lengthens channel 172 and provides an increased volume to receive portions of quantities of sealant 328 when each one of indexing pins 100 is inserted in one of first openings 306 and corresponding one of second openings 308. Terminating channel second end 184 of channel 172 at flange 136 enables portions of quantities of sealant 328 to be routed along cylindrical surface 104 up to flange 136, for example, in the direction opposite the direction of insertion of corresponding one of indexing pins 100, when each one of indexing pins 100 is inserted into one of first openings 306 and corresponding one of second openings 308 and/or when each one of nuts 204 is threadably coupled with threaded portion 126 of corresponding one of indexing pins 100 to clamp first body 302 and second body 304 together (FIG. 20).

Referring generally to FIGS. 41A, 41B, 41C and particularly to, e.g., FIGS. 6A, 6B, and 20, according to method 1000, each one of indexing pins 100 further comprises annular recess 174, located between cylindrical surface 104 and flange 136. Channel 172 and annular recess 174 of each one of indexing pins 100 intersect each other. Method 1000 further comprises (block 1076) directing at least portions of quantities of sealant 328 from channel 172 of each one of indexing pins 100 into annular recess 174 of each one of indexing pins 100. The preceding subject matter of this paragraph characterizes example 50 of the present disclosure, wherein example 50 also includes the subject matter according to example 49 above.

Annular recess 174 provides an increased volume to receive portions of quantities of sealant 328 when each one of indexing pins 100 is inserted in one of first openings 306 and corresponding one of second openings 308 and first body 302 and second body 304 are clamped together between flange 136 of each one of indexing pins 100 and corresponding one of protective clamping members 206.

For the purpose of the present disclosure, the term "intersects," in reference to the intersection between channel second end 184 and annular recess 174, refers to a junction, common to both channel 172 and annular recess 174.

In one or more examples, terminating channel first end 182 of channel 172 at annular recess 174 enables excess portions of quantities of sealant 328, located within one of first openings 306 and/or corresponding one of second openings 308, to be routed out from channel second end 184 and to collect within annular recess 174 of corresponding one of indexing pins 100 when each one of nuts 204 is threadably coupled with threaded portion 126 of corresponding one of indexing pins 100 to clamp first body 302 and second body 304 together between flange 136 of each one of indexing pins 100 and corresponding one of protective clamping members 206.

Referring generally to FIGS. 41A, 41B, and 41C and particularly to, e.g., FIGS. 5B, 6B, and 20, according to method 1000, channel 172 is formed in at least a portion of tapered surface 112 of each one of indexing pins 100. Method 1000 further comprises (block 1078) directing at least portions of quantities of sealant 328 from channel 172 of each one of indexing pins 100 into captive volume 238, formed between each of nuts 204 and corresponding one of protective clamping members 206. The preceding subject matter of this paragraph characterizes example 51 of the present disclosure, wherein example 51 also includes the subject matter according to example 49 or 50 above.

Method 1000 facilitates routing portions of quantities of sealant 328, located within one of first openings 306 and corresponding one of second openings 308, along channel 172 and receiving excess portions of quantities of sealant 328, routed along channel 172, within captive volume 238.

Collecting excess portions of quantities of sealant 328 in channel 172 and/or routing portion of quantities of sealant 328 along tapered surface 112 within channel 172 prevents hydraulic locking between tapered surface 112 and one of first openings 306 and/or corresponding one of second openings 308. In one or more examples, portions of quantities of sealant 328, located within one of first openings 306 between tapered surface 112 of each one of indexing pins 100 and first wall 310 and located within corresponding one of second openings 308 between tapered surface 112 of each one of indexing pins 100 and second wall 312, fills channel 172 and is routed along channel 172 when first body 302 and second body 304 are clamped together between flange 136 of each one of indexing pins 100 and corresponding one of protective clamping members 206.

Channel 172 also enables portions of quantities of sealant 328, located within one of first openings 306 and/or corresponding one of second openings 308, to be routed from tapered surface 112 to cylindrical surface 104 or to be routed from cylindrical surface 104 to tapered surface 112. In one or more examples, channel 172 being formed in both cylindrical surface 104 and tapered surface 112 provides a flow path for portions of quantities of sealant 328 to exit corresponding one of second openings 308, at second-body second surface 336, when each one of indexing pins 100 is fully inserted in corresponding one of second openings 308 and first body 302 and second body 304 are clamped together.

As illustrated in FIGS. 5B and 6B, in one or more examples, channel first end 182 is proximate to threaded portion 126. Terminating channel first end 182 of channel 172 proximate (e.g., at or near) threaded portion 126 provides a flow path for portions of quantities of sealant 328, located within one of first openings 306 and/or corresponding one of second openings 308, to flow out of channel 172 from channel first end 182 of corresponding one of indexing pins 100 and exit corresponding one of second openings 308 at second-body second surface 336 when each one of indexing pins 100 is fully inserted in corresponding one of second openings 308 and first body 302 and second body 304 are clamped together.

As illustrated in FIG. 20, in one or more examples, captive volume 238 is defined by portion of interior recess 224 formed by base 274, portion of cylindrical wall 276, and an end of barrel 210. In one or more examples, portion of quantities of sealant 328 exits portion of channel 172 formed in tapered surface 112, for example, from channel first end 182, and fills captive volume 238, when each one of indexing pins 100 is fully inserted in corresponding one of second openings 308 and first body 302 and second body 304 are clamped together between flange 136 of each one of indexing pins 100 and corresponding one of protective clamping members 206.

As illustrated in FIGS. 3-6B, 9, and 10, in one or more examples, portion of each one of indexing pins 100 located between tapered surface 112 and threaded portion 126 has diameter less than minimum tapered-surface diameter 124 of tapered surface 112 and less that maximum threaded-portion diameter 132 of threaded portion 126. The reduced diameter of portion of each one of indexing pins 100 located between tapered surface 112 and threaded portion 126 forms annular recessed portion of each one of indexing pins 100. In one or more examples, as illustrated in FIGS. 5B and 6B, channel first end 182 terminates at and intersects annular recessed portion of each one of indexing pins 100 located between tapered surface 112 and threaded portion 126. Portions of quantities of sealant 328 can exit corresponding one of second openings 308, at second-body second surface 336, when each one of indexing pins 100 is fully inserted in corresponding one of second openings 308 and first body 302 and second body 304 are clamped together.

Annular recessed portion of each one of indexing pins 100 located between tapered surface 112 and threaded portion 126 also provides gap between tapered surface 112 and threaded portion 126 to prevent each one of nuts 204 from binding to a non-threaded portion of corresponding one of indexing pins 100 when each one of nuts 204 is threadably coupled with threaded portion 126 of corresponding one of indexing pins 100.

Referring generally to FIGS. 42A, 42B, and 42C and particularly to, e.g., FIGS. 2-10 and 29-40, method 2000 of aligning first body 302 and second body 304 of structure 300 is disclosed. First body 302 comprises first-body first surface 330, first-body second surface 334, opposite first-body first surface 330, and first openings 306, extending, inclusively, between first-body first surface 330 and first-body second surface 334. Second body 304 comprises second-body first surface 332, second-body second surface 336, opposite second-body first surface 332, and second openings 308 extending, inclusively, between second-body first surface 332 and second-body second surface 336. Method 2000 comprises (block 2002) preparing for use indexing pins 100. According to method 2000, each one of indexing pins 100 comprises central axis 154. Each one of indexing pins 100 further comprises threaded portion 126, extending along central axis 154. Each one of indexing pins 100 also comprises stem 148, extending along central axis 154. Each one of indexing pins 100 further comprises cylindrical surface 104, extending along central axis 154 between threaded portion 126 and stem 148. Each one of indexing pins 100 additionally comprises tapered surface 112, extending between threaded portion 126 and cylindrical surface 104. Each one of indexing pins 100 further comprises flange 136, located between stem 148 and cylindrical surface 104. At least portion of flange 136 is larger than diameter of any one of first openings 306. Method 2000 further comprises (block 2004) orienting second body 304 so that each one of second openings 308 extends vertically and second-body first surface 332 is upwardly facing. Method 2000 also comprises (block 2006) orienting first body 302 so that each one of first openings 306 extends vertically and first-body second surface 334 faces second-body first surface 323. Method 2000 further comprises (block 2008) aligning each one of first openings 306 of first body 302 with corresponding one of second openings 308 of second body 304 so that, in plan view, circumferentially closed contour 342, formed by first wall 310 of each one of first openings 306 of first body 302 and second wall 312 of corresponding one of second openings 308 of second body 304 is large enough to receive threaded portion 126 of any one of indexing pins 100 with a clearance fit. Method 2000 additionally comprises (block 2010) moving first body 302 and second body 304 toward each other until first-body second surface 334 contacts second-body first surface 332. Method 2000 further comprises (block 2012) inserting each one of indexing pins 100 into corresponding one of first openings 306 of first body 302 with a clearance fit until a portion of cylindrical surface 104 of each one of indexing pins 100 is located in a corresponding one of first openings 306 of first body 302 and at least a portion of tapered surface 112 of each one of indexing pins 100 is inserted into a corresponding one of second openings 308 of second body 304. Method 2000 also comprises (block 214) applying downward force on each one of indexing pins 100 that has magnitude sufficient to cause a portion of cylindrical surface 104 of each one of indexing pins 100 to be inserted into corresponding one of second openings 308 of second body 304 and threaded portion 126 of each one of indexing pins 100 to extend past second-body second surface 336, while (block 2016) allowing first body 302 and second body 304 to move relative to each other in a direction, perpendicular to central axis 154 of each one of indexing pins 100. The preceding subject matter of this paragraph characterizes example 52 of the present disclosure.

Method 2000 facilitates aligning first body 302 of structure 300 and second body 304 of structure 300 by urging alignment of first openings 306 of first body 302 with second openings 308 of second body 304 when first body 302 and second body 304 are in contact with each other and each one of indexing pins is inserted through corresponding one of first openings 306 and corresponding one of second openings 308.

For the purpose of this disclosure, the term "along," in reference to extending along an axis, means coincident with or parallel to that axis.

For the purpose of the present disclosure, the phrases "corresponding one of first openings 306" and "corresponding one of second openings 308" refer to one of first openings 306 and one of second openings 308 that correspond to each other and to each one of indexing pins 100, which are to be aligned with each other for insertion of indexing pin 100 when positioning and aligning first body 302 and second body 304 relative to each other.

For the purpose of the present disclosure, the term "clearance fit" has its ordinary meaning, known to those skilled in the art, and refers to an engineering fit, where an opening is larger than an element, located in the opening, enabling two parts to slide and/or rotate when assembled.

As illustrated in FIGS. 32-40, alignment of structure 300 is achieved by properly aligning first openings 306 and second openings 308 relative to each other when first body 302 and second body 304 are located relative to each other, such as in a stacked configuration with first-body second surface 334 of first body 302 in contact with second-body first surface 332 of second body 304.

In one or more examples, first body 302 and second body 304 include, or are formed from, a composite material, such as a fiber-reinforced polymer composite. In one or more examples, first body 302 and second body 304 include, or are formed from, a metallic material. In one or more examples, first body 302 and second body 304 include, or are formed from, a plastic material, such as a thermoplastic.

In one or more examples, structure 300 is, or forms a portion of, a sub-structure or component of a larger manufactured structure or assembly. In one or more examples, structure 300 is, or forms a portion of, a vehicle structure, such as an aerospace vehicle, a space vehicle, a marine vehicle, a land vehicle, or the like. In one or more examples, structure 300 is, or forms a portion of, a stand-alone structure, such as a building, an antenna, a satellite, a rocket, or the like.

In one or more examples, during assembly of structure 300, first body 302 and second body 304 are initially arranged in a stacked configuration. First openings 306 and second openings 308 are machined (e.g., drilled) through the arranged stack of first body 302 and second body 304. Following formation of first openings 306 and second openings 308, first body 302 and second body 304 are separated so that one or more finishing operations can be performed on first body 302 and/or second body 304. An example of such finishing operations includes a deburring process that removes unwanted material from first body 302 and second body 304, such as removal of material surrounding first openings 306 and second openings 308, respectively. Removal of such unwanted material may mitigate undesirable electromagnetic environmental effects (EME) on structure 300 during use of structure 300, such as effects from static electric discharge and lighting strike. Mitigation of undesirable EME may be particularly beneficial when structure 300 is an aerospace structure.

As illustrated in FIGS. 32-40, according to the examples disclosed herein, indexing pin 100 enables realignment of first openings 306 and second openings 308 after rearranging first body 302 and second body 304 back into a stacked configuration for final assembly of structure 300. In one or more examples, final assembly of structure 300 includes installation of fasteners through aligned ones of first openings 306 and second openings 308, structural bonding of first body 302 and second body 304, and the like.

As illustrated in FIGS. 32-40, in one or more examples, with first-body second surface 334 in contact with second-body first surface 332, each one of indexing pins 100 urges alignment of first openings 306 and second openings 308 as each one of indexing pins 100 is inserted through one of first openings 306 and corresponding one of second openings 308.

Accordingly, plurality of indexing pins 100 can be used to urge alignment of selected ones of first openings 306 and selected corresponding ones of second openings 308. Upon alignment of selected ones of first openings 306 with selected corresponding ones of second openings 308 using indexing pins 100, non-selected ones of first openings 306 will be aligned with non-selected corresponding ones of second openings 308 so that first body 302 and second body 304 are properly aligned for final assembly, such as installation of fasteners.

Advantageously, with all of first openings 306 of first body 302 aligned with all of corresponding ones of second openings 308 of second body 304, fasteners can be installed, for example, by inserting each one of fasteners through one of first openings 306 and corresponding one of second openings 308, without damaging first body 302 and/or second body 304. Beneficially, the ability to install fasteners in properly pre-aligned ones of first openings 306 and corresponding ones of second openings 308 eliminates the need for fastener sleeves, which reduces the processing time and cost of manufacturing structure 300 and reduces the overall weight of structure 300.

As illustrated in FIGS. 2-6B, cylindrical surface 104 forms or otherwise defines a main shaft or shank portion of each one of indexing pins 100 that extends along central axis 154 between stem 148 and threaded portion 126. In one or more examples, cylindrical surface 104 extends between flange 136 and tapered surface 112. Cylindrical surface 104 has a circular cross-sectional shape in a plane, perpendicular to central axis 154 of indexing pin 100. Cylindrical surface 104 has a diameter that is constant along its length.

For the purpose of the present disclosure, a "plane", used to reference locations, orientations, and/or shapes of features and elements, refers to a virtual reference plane, having the attributes of an entity without possessing its physical form. For example, a virtual reference plane is an intangible or imaginary plane, rather than a physical one, with respect to which, e.g., location, orientation, and/or shape of other physical and/or intangible entities may be defined.

As illustrated in FIGS. 21-28 and 34-40, cylindrical surface 104 provides, or serves as, an indexing surface of each one of indexing pins 100 that contacts portion of first wall 310 of one of first openings 306 when each one of indexing pins 100 is inserted in, or through, one of first openings 306. Similarly, cylindrical surface 104 provides, or serves as, an indexing surface of each one of indexing pins 100 that contacts portion of second wall 312 of corresponding one of second openings 308 when each one of indexing pins 100 is inserted in, or through, corresponding one of second openings 308 to urge a position change in at least one of first body 302 and second body 304 relative to each other during alignment of one of first openings 306 and corresponding one of second openings 308 through which each one of indexing pins 100 is inserted.

As illustrated in FIGS. 2-6B, tapered surface 112 forms or otherwise defines a lead-in portion of each one of indexing pins 100 that extends along central axis 154 between cylindrical surface 104 and threaded portion 126. Tapered surface 112 has a circular cross-sectional shape in a plane perpendicular to central axis 154 of indexing pin 100. Tapered surface 112 has a diameter that varies along its length.

When each one of indexing pins 100 is inserted in one of first openings 306, tapered surface 112 enables each one of indexing pins 100 to enter one of first openings 306 without imparting an impact load on first body 302, such as on an edge of first-body first surface 330 defining portion of corresponding one of first openings 306. As illustrated in FIGS. 34 and 38, when each one of indexing pins 100 is inserted in one of second openings 308, tapered surface 112 enables each one of indexing pins 100 to enter one of second openings 308 without imparting an impact load on second body 304, such as an edge of second-body first surface 332 defining portion of corresponding one of second openings 308.

As illustrated in FIGS. 2-6B, stem 148 forms or otherwise defines an operator-engagement portion of each one of indexing pins 100 that extends along central axis 154 opposite to threaded portion 126. In one or more examples, stem 148 extends from flange 136 opposite cylindrical surface 104. In one or more examples, engagement of stem 148, for example, via an operator, prevents rotation of corresponding one of indexing pins 100 about central axis 154. In one or more examples, engagement of stem 148, for example, via the operator, enables extraction of corresponding one of indexing pins 100 from one of first openings 306 and corresponding one of second openings 308, for example, following alignment of structure 300.

As illustrated in FIGS. 2-6B, threaded portion 126 forms or otherwise defines a nut-engagement portion of each one of indexing pins 100 that extends along central axis 154 opposite to cylindrical surface 104. In one or more examples, threaded portion 126 extends from tapered surface 112 opposite cylindrical surface 104. Threaded portion 126 has a circular cross-sectional shape in a plane, perpendicular to central axis 154 of indexing pin 100. Threaded surface 126 has a diameter that is constant along its length. Threaded portion 126 includes external thread.

As illustrated in FIGS. 11,12, and 29-31, threaded portion 126 enables each one of nuts 204 to be removably coupled to corresponding one of indexing pins 100 so that first body 302 and second body 304 are clamped together between each one of indexing pins 100 and corresponding one of nuts 204, for example, following alignment of structure 300 with indexing pin 100.

As illustrated in FIGS. 21-28, according to the examples disclosed herein, insertion of each one of indexing pins 100 through corresponding one of first openings 306 of first body 302 and corresponding one of second openings 308 of second body 304 aligns first openings 306 and second openings 308 by moving first body 302 and/or second body 304 relative to each other in a direction, perpendicular to central axis 154 of each one of indexing pins 100. Movement of first body 302 and/or second body 304 relative to each other in a direction, perpendicular to central axis 154 of each one of indexing pins 100, as each one of indexing pins 100 is inserted through corresponding one of first openings 306 and corresponding one of second openings 308 brings fourth central axis 338 of corresponding one of first openings 306 and fifth central axis 340 of corresponding one of second openings 308 closer to being coincident with each other.

As illustrated in FIGS. 32-40, according to the examples disclosed herein, insertion of each one of indexing pins 100 through one of first openings 306 of first body 302 and corresponding one of second openings 308 of second body 304 aligns first openings 306 and second openings 308 by moving first body 302 and/or second body 304 relative to each other in a direction, perpendicular to central axis 154 of each one of indexing pins 100. Movement of first body 302 and/or second body 304 relative to each other in a direction, perpendicular to central axis 154 of each one of indexing pins 100, as each one of indexing pins 100 is inserted through one of first openings 306 and corresponding one of second openings 308 brings fourth central axis 338 of corresponding one of first openings 306 and fifth central axis 340 of corresponding one of second openings 308 closer to being coincident with each other.

In one or more examples, (block 2004) orienting second body 304, (block 2006) orienting first body 302, (block 2008) aligning each one of first openings 306 of first body 302 with corresponding one of second openings 308 of second body 304, and (block 2010) moving first body 302 and second body 304 toward each other are performed using a material handling system, such as a robotic manipulator, having a specialized end effector, configured to handle first body 302 and second body 304. In one or more examples, such a material handling system may be manually controlled. In one or more examples, such a material handling system may be automatically controlled, for example, via computer numeric controls, machine vision, or any other suitable automated or preprogramed machine controls.

In one or more examples, (block 2012) inserting each one of indexing pins 100 into corresponding one of first openings 306 of first body 302 and (block 214) applying downward force on each one of indexing pins 100 are performed using a material handling system, such as a robotic manipulator, having a specialized end effector configured to handle indexing pins 100. In one or more examples, such a material handling system may be manually controlled. In one or more examples, such a material handling system may be automatically controlled, for example, via computer numeric controls, machine vision, or any other suitable automated or preprogramed machine controls.

According to the examples disclosed herein, (block 2012) inserting each one of indexing pins 100 into corresponding one of first openings 306 locates each one of indexing pins 100 within corresponding one of first openings 306 so that central axis 154 of each one of indexing pins 100 is axially aligned with fourth central axis 338 of corresponding one of first openings 306.

For the purpose of the present disclosure, the term "axially aligned" refers to two axes being parallel to or coincident with each other. For the purpose of the present disclosure, the term "coaxially aligned" refers to two axes being coincident with each other.

With each one of indexing pins 100 inserted into a corresponding one of first openings 306 of first body 302 with a clearance fit so that portion of cylindrical surface 104 of each one of indexing pins 100 is located in corresponding one of first openings 306 and central axis 154 of each one of indexing pins 100 and fourth central axis 338 of corresponding one of first openings 306 being parallel to each other, an axial offset between central axis 154 of each one of indexing pins 100 and fourth central axis 338 of corresponding one of first openings 306 is less than or equal to one-half of the difference between cylindrical-surface diameter 128 of cylindrical surface 104 of each one of indexing pins 100 and first diameter of corresponding one of first openings 306.

According the examples disclosed herein, steps of (block 2014) applying a downward force on each one of indexing pins 100 locates each one of indexing pins 100 within corresponding one of second openings 308 so that central axis 154 of each one of indexing pins 100 is axially aligned with fifth central axis 340 of corresponding one of second openings 308.

With each one of indexing pins 100 inserted into a corresponding one of second openings 308 of second body 304 with a clearance fit so that portion of cylindrical surface 104 of each one of indexing pins 100 is located in corresponding one of second openings 308 and central axis 154 of each one of indexing pins 100 and fifth central axis 340 of corresponding one of second openings 308 being parallel to each other, an axial offset between central axis 154 of each one of indexing pins 100 and fifth central axis 340 of corresponding one of second openings 308 is less than or equal to than one-half of the difference between cylindrical-surface diameter 128 of cylindrical surface 104 of each one of indexing pins 100 and second diameter of corresponding one of second openings 308.

According the examples disclosed herein, with cylindrical surface 104 of each one of indexing pins 100 located in one of first openings 306 and corresponding one of second openings 308, an axial offset between fourth central axis 338 of one of first openings 306 and fifth central axis 340 of corresponding one of second openings 308 is less than or equal to the difference between cylindrical-surface diameter 128 of cylindrical surface 104 of each one of indexing pins 100 and one of first diameter of corresponding one of first openings 306 or second diameter of corresponding one of second openings 308.

Referring generally to FIGS. 42A, 42B, and 42C and particularly to, e.g., FIGS. 2-6B, 18, 19, 25-28, and 37-40, according to method 2000, portions of first-body first surface 330, surrounding first openings 306, are countersinks 320. Flange 136 of each one of indexing pins 100 comprises frustoconical flange surface 162, located between cylindrical surface 104 and stem 148 of each one of indexing pins 100. According to method 2000, (block 2012) inserting each one of indexing pins 100 into a corresponding one of first openings 306 comprises (block 2018) abutting frustoconical flange surface 162 of each one of indexing pins 100 against a corresponding one of countersinks 320. The preceding subject matter of this paragraph characterizes example 53 of the present disclosure, wherein example 53 also includes the subject matter according to example 52 above.

Method 2000 facilitates use of each one of indexing pins 100 with first body 302 having portions of first-body first surface 330, surrounding first openings 306, that include countersinks 320.

Frustoconical flange surface 162 of flange 136 provides a countersunk head design for indexing pins 100. Mating engagement of frustoconical flange surface 162 with countersink 320 locates central axis 154 of each one of indexing pins 100 coincident with fourth central axis 338 of corresponding ones of first openings 306. Frustoconical flange surface 162 of flange 136 prevents each one of indexing pins 100 from moving within corresponding one of first openings 306 in a direction, transverse to fourth central axis 338 of corresponding ones of first openings 306 when each one of indexing pins 100 is being inserted into corresponding ones of second openings 308.

As illustrated in FIGS. 37-40, in one or more examples, portion of first-body first surface 330 surrounding corresponding one of first openings 306 includes countersink 320. As illustrated in FIGS. 25 and 40, in one or more examples, with portion of cylindrical surface 104 of each one of indexing pins 100 located within one of first openings 306, frustoconical flange surface 162 enables flange 136 to be received within countersink 320 of corresponding one of first openings 306 and to rest on portion of first-body first surface 330 surrounding corresponding one of first openings 306. In other words, frustoconical flange surface 162 of flange 136 provides a countersunk head design for each one of indexing pins 100.

As illustrated in FIGS. 37-40, with portion of cylindrical surface 104 of each one of indexing pins 100 located within one of first openings 306, frustoconical flange surface 162 of flange 136 also provides a secondary indexing surface that engages portion of first-body first surface 330 that defines countersink 320 to center each one of indexing pins 100 relative to corresponding one of first openings 306. In other words, with frustoconical flange surface 162 properly seated in countersink 320, each one of indexing pins 100 is centered within corresponding one of first openings 306 and engagement of frustoconical flange surface 162 with countersink 320 coaxially aligns center axis 154 of each one of indexing pins 100 with fourth central axis 338 of corresponding one of first openings 306

Referring generally to FIGS. 42A, 42B, and 42C and particularly to, e.g., FIGS. 2-6B, 17, 20, 32, and 34-36, according to method 2000, portions of first-body first surface 330, surrounding first openings 306, are planar. Flange 136 of each one of indexing pins 100 comprises planar flange surface 160, located between cylindrical surface 104 and stem 148 of each one of indexing pins 100 and oriented transversely to central axis 154 of each one of indexing pins 100. According to method 2000, (block 2012) inserting each one of indexing pins 100 into corresponding one of first openings 306 comprises (block 2020) abutting planar flange surface 160 of each one of indexing pins 100 against a corresponding one of the portions of first-body first surface 330, surrounding first openings 306. The preceding subject matter of this paragraph characterizes example 54 of the present disclosure, wherein example 54 also includes the subject matter according to example 52 above.

Method 2000 facilitates use of each one of indexing pins 100 with first body 302 having portions of first-body first surface 330, surrounding first openings 306, that are planar.

Planar flange surface 160 enables flange 136 to contact portion of first-body first surface 330 that surrounds corresponding one of first openings 306 that is planar when each one of indexing pins 100 is fully inserted in corresponding one of first openings 306.

As illustrated in FIGS. 32 and 33-36, in one or more examples, portion of first-body first surface 330 surrounding corresponding one of first openings 306 is planar. As illustrated in FIG. 36, in one or more examples, with portion of cylindrical surface 104 of each one of indexing pins 100 located within corresponding one of first openings 306, planar flange surface 160 enables flange 136 of each one of indexing pins 100 to rest on portion of first-body first surface 330, surrounding corresponding one of first openings 306, that is planar. In other words, planar flange surface 160 of flange 136 provides a protrusion head design for each one of indexing pins 100. In one or more examples, planar flange surface 160 extends perpendicular to central axis 154 between frustoconical flange surface 162 and cylindrical surface 104.

Referring generally to FIGS. 42A, 42B, and 42C and particularly to, e.g., FIGS. 11-20, and 29-31, method 2000 further comprises (block 2022) threadably coupling nuts 204, coupled to corresponding ones of protective clamping members 206, to threaded portions 126 of corresponding ones of indexing pins 100 so that protective clamping members 206 are located between nuts 204 and second-body second surface 336. Method 2000 also comprises (block 2024) clamping first body 302 and second body 304 between flanges 136 of indexing pins 100 and protective clamping members 206 so that nuts 204 are preloaded against protective clamping members 206 along central axes 154 of indexing pins 100 by a force within a predetermined range. The preceding subject matter of this paragraph characterizes example 55 of the present disclosure, wherein example 55 also includes the subject matter according to any one of examples 52 to 54, above.

Method 2000 facilitates clamping first body 302 and second body 304 together between flanges 136 of indexing pins 100 and protective clamping members 206 for assembly of structure 300.

Threadably coupling each one of nuts 204 to threaded portion 126 of a corresponding one of indexing pins 100 clamps first body 302 and second body 304 between flange 136 of each one of indexing pins 100 and corresponding one of protective clamping members 206 for assembly of structure 300, such as for installation of fasteners in first openings 306 and corresponding one of second openings 308.

As illustrated in FIGS. 11, 12, 17-20, and 29-31, threaded portion 126 enables each one of nuts 204 to be removably coupled to corresponding one of indexing pins 100 in order to clamp first body 302 and second body 304 together between each one of indexing pins 100 and corresponding one of protective clamping members 206, for example, following alignment of structure 300. First body 302 and second body 304 are clamped between flange 136 of each one of indexing pins 100 and corresponding one of protective clamping members 206 when each one of nuts 204 is threadably coupled with threaded portion 126 and preloaded against corresponding one of protective clamping members 206 along central axis 154 by force within predetermined range.

In one or more examples, (block 1034) threadably coupling nuts 204, coupled to corresponding ones of protective clamping members 206, to threaded portions 126 of corresponding ones of indexing pins 100 so that protective clamping members 206 are located between nuts 204 and second-body second surface 336 is performed manually.

Referring generally to FIGS. 42A, 42B, and 42C and particularly to, e.g., FIGS. 29-31, according to method 2000, (block 2022) threadably coupling nuts 204 to threaded portions 126 of corresponding ones of indexing pins 100 comprises (block 2026) preventing rotation of indexing pins 100 relative to first body 302 and second body 304 and (block 2028) preventing rotation of protective clamping members 206 relative to second-body second surface 336 while tightening nuts 204 onto threaded portions 126 of corresponding ones of indexing pins 100. The preceding subject matter of this paragraph characterizes example 56 of the present disclosure, wherein example 56 also includes the subject matter according to example 55 above.

Rotating each one of nuts 204 while preventing rotation of corresponding one of indexing pins 100 enables each one of nuts 204 to be threadably coupled with threaded portion 126 of corresponding one of indexing pins 100 and pre-loaded against corresponding one of protective clamping members 206 to clamp first body 302 and second body 304 together between flange 136 of each one of indexing pins 100 and corresponding one of protective clamping members 206. Preventing rotation of each one of protective clamping members 206 relative to second-body second surface 336 prevents damage to second-body second surface 336 during rotation of corresponding one of nuts 204.

Referring generally to FIGS. 42A, 42B, and 42C and particularly to, e.g., FIGS. 2-8, 11, and 12, according to method 2000, stem 148 of each one of indexing pins 100 comprises at least one of first means 156 for providing complementary engagement with a first tool, second means 192 for providing complementary engagement with a second tool, and third means 194 for providing complementary engagement with a third tool. Threaded portion 126 of each one of indexing pins 100 comprises fourth means 166 for providing complementary engagement with a fourth tool. Each one of nuts 204 comprises second central axis 208. Each one of nuts 204 further comprises head 212, comprising fifth means 264 for providing complementary engagement with a fifth tool. Each one of nuts 204 also comprises barrel 210, having external barrel diameter 218. Each one of nuts 204 further comprises collar 220, located between head 212 and barrel 210 and having maximum collar dimension 222, measured in a direction, transverse to second central axis 208. Collar 220 comprises knurled surface 232. Maximum collar dimension 222 is greater than either of external barrel diameter 218 or external protective-clamping-member diameter 216 of protective clamping member 206. Each one of nuts 204 also comprises through passage 262, extending through barrel 210 and comprising internal thread 260. According to method 2000, (block 2022) threadably coupling nuts 204 to threaded portions 126 of corresponding ones of indexing pins 100 comprises (block 2030) preparing to apply torque to indexing pins 100 by one of (block 2032) manually engaging stem 148 of each one of indexing pins 100, (block 2034) engaging first means 156 of stem 148 of each one of indexing pins 100 with the first tool, (block 2036) engaging second means 192 of stem 148 of each one of indexing pins 100 with the second tool, (block 2038) engaging third means 194 of stem 148 of each one of indexing pins 100 with the third tool, or (block 2040) engaging fourth means 166 of threaded portion 126 of each one of indexing pins 100 with the fourth tool. According to method 2000, (block 2022) threadably coupling nuts 204 to threaded portions 126 of corresponding ones of indexing pins 100 further comprises (block 2042) preparing to apply torque to nuts 204 by one of (block 2044) manually engaging knurled surface 232 of collar 220 of each one of nuts 204 or (block 2046) engaging fifth means 264 of head 212 of each one of nuts 204 with the fifth tool. According method 2000, (block 2022) threadably coupling nuts 204 to threaded portions 126 of corresponding ones of indexing pins 100 also comprises (block 2048) applying torque to indexing pins 100 and nuts 204 by rotating indexing pins 100 and nuts 204 relative to each other in a predetermined direction. The preceding subject matter of this paragraph characterizes example 57 of the present disclosure, wherein example 57 also includes the subject matter according to example 56 above.

First means 156 enables use of the first tool (not shown) to engage each one of indexing pins 100 and to remove each one of indexing pins 100 and/or to prevent rotation of each one of indexing pins 100 about central axis 154. Second means 192 enables use of the second tool (not shown) to engage each one of indexing pin 100 and prevent rotation of each one of indexing pins 100 about central axis 154. Third means 194 enables use of the third tool (not shown) to engage each one of indexing pins 100 and prevent rotation of each one of indexing pins 100 about central axis 154. Fourth means 166 enables use of the fourth tool (not shown) to engage each one of indexing pins 100 and prevent rotation of each one of indexing pins 100 about central axis 154. Head 212, collar 220, barrel 210, and through passage 262 of each one of nuts 204 provides a structural interface for coupling each one of nuts 204 and a corresponding one of protective clamping members 206 together and removably coupling each one of nuts 204 with threaded portion 126 of a corresponding one of indexing pins 100. Fifth means 264 enables use of the fifth tool (not shown) to engage head 212 and to rotate each one of nuts 204 about second central axis 208 when threadably coupling each one of nuts 204 to threaded portion 126 of a corresponding one of indexing pins 100. Knurled surface 232 provides a frictional interface for hand tightening each one of nuts 204 to a corresponding one of indexing pins 100 when clamping first body 302 and second body 304 together.

In one or more examples, complementary engagement of the first tool with first means 156 enables each one of indexing pins 100 to be removed from one of first openings 306 and corresponding one of second openings 308, for example, following alignment of structure 300. In one or more examples, complementary engagement of the first tool with first means 156 prevents rotation of each one of indexing pins 100 about central axis 154 at second end 152 (FIG. 2) of corresponding one of indexing pins 100, for example, when threadably coupling each one of nuts 204 (FIG. 11) with threaded portion 126 of a corresponding one of indexing pins 100.

Generally, first means 156 is any structural feature that provides complementary engagement with the first tool, and the first tool includes, or takes the form of, any implement or instrument that engages the particular structural feature corresponding to first means 156 and that enables manipulation of each one of indexing pins 100. In one or more examples, first means 156 is an aperture, formed in and extending partially through stem 148, and the first tool is a pin or other shafted element, configured to be inserted in the aperture. In one or more examples, first means 156 is at least one recess or slot, formed in and extending partially through stem 148, and the first tool is an edged element, configured to matingly engage at least the one recess or slot. In one or more examples, first means 156 is a through hole, formed in and extending completely through stem 148, and the first tool is a pin or elongated shaft, configured to be inserted through the through hole.

In one or more examples, complementary engagement of the second tool with second means 192 prevents rotation of each one of indexing pins 100 about central axis 154 at second end 152 (FIG. 2) of corresponding one of indexing pins 100, for example, when threadably coupling each one of nuts 204 (FIG. 11) with threaded portion 126 of a corresponding one of indexing pins 100.

Generally, second means 192 is any structural feature that provides complementary engagement with the second tool, and the second tool includes, or takes the form of, any implement or instrument that engages the particular structural feature, corresponding to second means 192 and that enables manipulation of each one of indexing pins 100. In one or more examples, second means 192 is different from first means 156 and the second tool is different from the first tool. In one or more examples, second means 192 is a polygon structure or head, with a plurality of planar sides, that forms at least portion of stem 148 and has a polygonal cross-sectional shape in a plane perpendicular to central axis 154, and the second tool is a wrench, having a polygonal socket or pliers. In one or more examples, as illustrated in FIGS. 5A-6B, second means 192 is a hexagonal head (e.g., a six-sided head) that forms at least a portion of stem 148, and the second tool is a wrench, having a hexagonal socket or pliers, configured to engage the hexagonal head in a complementary manner. In one or more examples, second means 192 is a square head (e.g., a four-sided head) that forms at least portion of stem 148, and the second tool is a wrench, having a square socket or pliers, configured to engage the square head in a complementary manner.

In one or more examples, complementary engagement of the third tool with third means 194 prevents rotation of each one of indexing pins 100 about central axis 154 at second end 152 (FIG. 2) of corresponding one of indexing pins 100, for example, when threadably coupling each one of nuts 204 (FIG. 11) with threaded portion 126 of corresponding one of indexing pins 100.

Generally, third means 194 is any structural feature that provides complementary engagement with the third tool, and the third tool includes, or takes the form of, any implement or instrument that engages the particular structural feature corresponding to third means 194 and that enables manipulation of each one of indexing pins 100. In one or more examples, third means 194 is different from first means 156 and second means 192, and the third tool is different from the first tool and the second tool. In one or more examples, third means 194 is a shaped drive cavity, or socket, formed in and extending partially through an end of stem 148, and the third tool is a driver, having a working end, configured to engage the shaped drive cavity in a complementary manner. Examples of the shaped drive cavity include slotted cavities (e.g., slot or cross), cruciform cavities (e.g., Phillips, Mortorq, Frearson, Pozidriv, French, Supadriv, Torq), internal polygon cavities (e.g., square, security hex, Robertson, double-square, hex, triple-square, 12-point, 12-spline flange, Allen, double hex), hexalobular (e.g., Torx, security Torx, line head male, line head female, polydrive), three-pointed cavities (e.g., TA or triangle-shaped, tri-groove or T-groove, tri-point, tri-wing), or special cavities (e.g., clutch A, Quadrex, clutch G, Pentalobe, one-way, spanner head, Bristol).

In one or more examples, complementary engagement of the fourth tool with fourth means 166 prevents rotation of each one of indexing pins 100 about central axis 154 at first end 150 (FIG. 2) of corresponding one of indexing pins 100, for example, when threadably coupling each one of nuts 204 (FIG. 11) with threaded portion 126 of corresponding one of indexing pins 100.

Generally, fourth means 166 is any structural feature that provides complementary engagement with the fourth tool, and the fourth tool includes, or takes the form of, any implement or instrument that engages the particular structural feature, corresponding to fourth means 166 and that enables manipulation of each one of indexing pins 100. In one or more examples, fourth means 166 is different from first means 156, second means 192, and third means 194, and the fourth tool is different from the first tool, the second tool, and the third tool. In one or more examples, fourth means 166 is the same as third means 194 and the fourth tool is the same as the third tool. In one or more examples, fourth means 166 is a shaped drive cavity, or socket, formed in and extending partially through an end of threaded portion 126, and the fourth tool is a driver, having a working end, configured to engage the shaped drive cavity in a complementary manner. Examples of the shaped drive cavity include slotted cavities (e.g., slot or cross), cruciform cavities (e.g., Phillips, Mortorq, Frearson, Pozidriv, French, Supadriv, Torq), internal polygon cavities (e.g., square, security hex, Robertson, double-square, hex, triple-square, 12-point, 12-spline flange, Allen, double hex), hexalobular (e.g., Torx, security Torx, line head male, line head female, polydrive), three-pointed cavities (e.g., TA or triangle-shaped, tri-groove or T-groove, tri-point, tri-wing), or special cavities (e.g., clutch A, Quadrex, clutch G, Pentalobe, one-way, spanner head, Bristol).

Head 212 forms or otherwise defines an operator-engagement portion of each one of nuts 204. In one or more examples, head 212 extends along second central axis 208. In one or more examples, engagement of head 212, for example, via application of torque to head 212 by an operator, rotates each corresponding one of nuts 204 about second central axis 208, such as when threadably coupling each one of nuts 204 with threaded portion 126 of corresponding one of indexing pins 100.

Barrel 210 forms or otherwise defines a protective-clamping-member-interface portion of each one of nuts 204. In one or more examples, barrel 210 extends along second central axis 208 opposite head 212. In one or more examples, barrel 210 is configured to interface and be frictionally coupled with corresponding one of protective clamping members 206. In one or more examples, barrel 210 has a circular cross-sectional shape in a plane, perpendicular to second central axis 208 of each one of nuts 204 and has a diameter that is constant along its length.

Collar 220 forms or otherwise defines a protective-clamping-member-engagement portion of each one of nuts 204. In one or more examples, collar 220 extends along second central axis 208 between head 212 and barrel 210. Maximum collar dimension 222 of collar 220, being greater than external barrel diameter 218 of barrel 210, extends collar 220 outward from barrel 210, perpendicular to second central axis 208. With each one of nuts 204 and corresponding one of protective clamping members 206 coupled together, collar 220 is configured to contact corresponding one of protective clamping members 206 when each one of nuts 204 is threadably coupled with threaded portion 126 of corresponding one of indexing pins 100 and pre-loaded against corresponding one of protective clamping members 206 to clamp first body 302 and second body 304 between flange 136 of each one of indexing pins 100 and corresponding one of protective clamping members 206.

In one or more examples, collar 220 also forms or otherwise defines another operator-engagement portion of each one of nuts 204. In one or more examples, engagement of collar 220, for example, via application of torque to collar 220 manually by an operator, rotates each one of nuts 204 about second central axis 208, such as when threadably coupling each one of nut 204 with threaded portion 126 of corresponding one of indexing pins 100.

Through passage 262 forms or otherwise defines an indexing pin-engagement portion of each one of nuts 204. Through passage 262 extends along second central axis 208 through barrel 210. Through passage 262 is configured to receive threaded portion 126 of corresponding one of indexing pins 100 when each one of nuts 204 is threadably coupled with corresponding one of indexing pins 100. Internal thread 260 is configured to matingly engage threaded portion 126 when each one of nuts 204 is threadably coupled with threaded portion 126 of corresponding one of indexing pins 100.

As illustrated in FIG. 16, in one or more examples, through passage 262 extends only through barrel 210, and not through head 212 (i.e., head 212 is a solid element). Such a configuration of nuts 204 prevents over tightening of each one of nuts 204, when each one of nuts 204 is threadably coupled with threaded portion 126 of corresponding one of indexing pins 100, by providing a physical stop that limits movement of each one of nuts 204 along central axis 154 of corresponding one of indexing pins 100 when an end of threaded portion 126 contacts head 212.

As illustrated in FIGS. 15 and 17-20, in one or more examples, through passage 262 extends through collar 220 and head 212 of each one of nuts 204. Through passage 262 extending through collar 220 and head 212 of each one of nuts 204 provides increased adjustability of each one of nuts 24 relative to corresponding one of indexing pins 100 and enables threaded portion 126 of corresponding one of indexing pins 100 to extend through each one of nuts 204 when each one of nuts 204 is threadably coupled with threaded portion 126 of corresponding one of indexing pins 100. In one or more examples, through passage 262 extending through head 212 also enables the fourth tool (not shown) to access fourth means 166 of each one of indexing pins 100 through head 212 of corresponding one of nuts 204 when threadably coupling each one of nuts 204 with threaded portion 126 of corresponding one of indexing pins 100.

As illustrated in FIGS. 13 and 15-20, in one or more examples, internal thread 260 of through passage 262 extends along all of through passage 262. Internal thread 260 extends along all of through passage 262 and thereby increases the size of a mating interface between each one of nuts 204 and threaded portion 126 of corresponding one of indexing pins 100 when each one of nuts 204 is threadably coupled with threaded portion 126 of corresponding one of indexing pins 100.

In one or more examples, complementary engagement of the fifth tool with fifth means 264 rotates each one of nuts 204 about second central axis 208 at first end 150 (FIG. 2) of corresponding one of indexing pins 100, for example, when threadably coupling each one of nuts 204 with threaded portion 126 of corresponding one of indexing pins 100.

Generally, fifth means 264 is any structural feature that provides complementary engagement with the fifth tool, and the fifth tool includes, or takes the form of, any implement or instrument that engages the particular structural feature, corresponding to fifth means 264 and that enables manipulation of each one of nuts 204. In one or more examples, fifth means 264 is a polygon structure or head, with a plurality of planar sides, that forms at least portion of head 212 and has a polygonal cross-sectional shape in a plane, perpendicular to second central axis 208 and the fifth tool is a wrench, having a polygonal socket or pliers. In one or more examples, as illustrated in FIGS. 11 and 12, fifth means 164 is a hexagonal head (e.g., a six-sided head) that forms at least a portion of head 212, and the fifth tool is a wrench, having a hexagonal socket or pliers, configured to engage the hexagonal head in a complementary manner.

In one or more examples, the fifth tool for complementary engagement with fifth means 264 of head 212 of each one of nuts 204 and the fourth tool for complementary engagement with fourth means 166 of threaded portion 126 of each one of indexing pins 100 are integrated into the same combination tool. Such a combination tool is any implement or instrument, configured to engage both the particular structural feature, corresponding to fifth means 264 and fourth means 166, to simultaneously manipulate each one of nuts 204 and corresponding one of indexing pins 100.

In one or more examples, at least portion of an annular sidewall of collar 220, circumscribing second central axis 208, includes knurled surface 232. Knurled surface 232 includes any one of various kinds of knurling patterns formed on an external surface of the annular sidewall of collar 220.

Referring generally to FIGS. 42A, 42B, and 42C and particularly to, e.g., FIGS. 13-20, method 2000 further comprises (block 2050) coupling protective clamping members 206 to corresponding ones of nuts 204. According to method 2000, each one of protective clamping members 206 is cup-shaped and comprises third central axis 272. Each one of protective clamping members 206 further comprises base 274, comprising opening 240. Each one of protective clamping members 206 also comprises cylindrical wall 276, extending from base 274 along third central axis 272. Each one of protective clamping members 206 additionally comprises interior recess 224, at least partially defined by cylindrical wall 276 and communicatively coupled with opening 240. Each one of protective clamping members 206 also comprises internal annular groove 230, formed in cylindrical wall 276. Barrel 210 of each one of nuts 204 comprises external annular groove 226. Each pair of nuts 204 and corresponding ones of protective clamping members 206 holds captive O-ring 228, having circumferentially closed surface 278 that lies in plane, containing second central axis 208 of corresponding one of nuts 204. According to method 2000, (block 2050) coupling protective clamping members 206 to corresponding ones of nuts 204 comprises (block 2052) locating barrel 210 of each one of nuts 204 in interior recess 224 of corresponding one of protective clamping members 206 with a clearance fit, so that one portion of circumferentially closed surface 278 of O-ring 228 is located in external annular groove 226 of corresponding one of nuts 204, and another portion of circumferentially closed surface 278 of O-ring 228 is located in internal annular groove 230 of corresponding one of protective clamping members 206. The preceding subject matter of this paragraph characterizes example 58 of the present disclosure, wherein example 58 also includes the subject matter according to example 57 above.

Base 274, cylindrical wall 276, and interior recess 224 of each one of protective clamping members 206 provide a structural interface for coupling each one of protective clamping members 206 and corresponding one of nuts 204 together. Internal annular groove 230, external annular groove 226, and O-ring 228 provide for frictional coupling of each one of nuts 204 with corresponding one of protective clamping members 206 while allowing each one of nuts 204 and corresponding one of protective clamping members 206 to freely rotate about second central axis 208 relative to each other.

Base 274 forms or otherwise defines a second body-engagement portion of each one of protective clamping members 206. With each one of nuts 204 and corresponding one of protective clamping members 206 coupled together, base 274 is configured to contact second-body second surface 336 of second body 304 when each one of nuts 204 is threadably coupled with threaded portion 126 of corresponding one of indexing pins 100 and pre-loaded against corresponding one of protective clamping members 206. In one or more examples, base 274 has a circular cross-sectional shape in a plane perpendicular to third central axis 272.

Opening 240 enables threaded portion 126 of each one of indexing pins 100 to enter interior recess 224 of corresponding one of protective clamping members 206 when threadably coupling each one of nuts 204 with threaded portion 126 of corresponding one of indexing pins 100. Opening 240 is coaxially aligned with third central axis 272.

Cylindrical wall 276 defines or otherwise forms a nut-engagement portion of each one of protective clamping members 206. Cylindrical wall 276 extends along third central axis 272 from base 274 and circumscribes third central axis 272. In one or more examples, with each one of nuts 204 and corresponding one of protective clamping members 206 coupled together, collar 220 of each one of nuts 204 contacts an end of cylindrical wall 276 of corresponding one of protective clamping members 206 when each one of nuts 204 is threadably coupled with threaded portion 126 of corresponding one of indexing pins 100 and pre-loaded against corresponding one of protective clamping members 206. Cylindrical wall 276 of each one of protective clamping members 206 spaces corresponding one of nuts 204 away from second body 304 and prevents corresponding one of nuts 204 from contacting second-body second surface 336 of second body 304. Cylindrical wall 276 has a circular cross-sectional shape in a plane, perpendicular to third central axis 272 of protective clamping member 206. Cylindrical wall 276 has a diameter that is constant along its length.

Interior recess 224 forms or otherwise defines a nut-receiving portion of each one of protective clamping members 206 that enables each one of nuts 204 to be removably coupled with corresponding one of protective clamping members 206. Interior recess 224 extends along third central axis 272 and is communicatively coupled with opening 240. With each one of nuts 204 and corresponding one of protective clamping members 206 coupled together, interior recess 224 of each one of protective clamping members 206 receives barrel 210 of corresponding one of nuts 204 with a clearance fit. With each one of nuts 204 and corresponding one of protective clamping members 206 coupled together, opening 240 enables threaded portion 126 of each one of indexing pins 100 to be received within interior recess 224 of corresponding one of protective clamping members 206 when each one of nuts 204 is threadably coupled with threaded portion 126 of corresponding one of indexing pins 100. Interior recess 224 is defined by base 274 and cylindrical wall 276.

O-ring 228 frictionally couples each one of nuts 204 and corresponding one of protective clamping members 206 together to prevent inadvertent separation of each one of nuts 204 from corresponding one of protective clamping members 206 and, thus, prevent foreign object debris (FOD), while enabling rotation of each one of nuts 204 and corresponding one of protective clamping members 206 about second central axis 208 relative to each other.

With each one of nuts 204 and corresponding one of protective clamping members 206 coupled together, each one of external annular groove 226 and internal annular groove 230 receives at least portion of circumferentially closed surface 278 of O-ring 228. External annular groove 226 and internal annular groove 230 are configured to enable each one of nuts 204 and corresponding one of protective clamping members 206 to freely rotate about second central axis 208 relative to each other. External annular groove 226 and internal annular groove 230 are configured to prevent linear movement of O-ring 228 along second central axis 208 relative to each one of nuts 204 and a corresponding one of protective clamping members 206 and thus, prevent linear movement of each one of nuts 204 along second central axis 208 relative to corresponding one of protective clamping members 206.

As best illustrated in FIG. 14, with each one of nuts 204 and corresponding one of protective clamping members 206 coupled together, a cross-sectional diameter of circumferentially closed surface 278 of O-ring 228 is greater than one-half of a cross-sectional dimension of a cross-section of an area, defined by a combination of external annular groove 226 and internal annular groove 230 that lies in the same plane as circumferentially closed surface 278 of O-ring 228. Such a configuration of external annular groove 226 and internal annular groove 230 holds O-ring 228 captive to prevent inadvertent separation of each one of nuts 204 from corresponding one of protective clamping members 206 while allowing free rotation of each one of nuts 204 and corresponding one of protective clamping members 206 about second central axis 208 relative to each other. Such a configuration of external annular groove 226 and internal annular groove 230 also enables forced (i.e., intentional) separation of each one of nuts 204 from corresponding one of protective clamping members 206.

In one or more examples, with each one of nuts 204 and corresponding one of protective clamping members 206 coupled together, O-ring 228 locates each one of nuts 204 relative to corresponding one of protective clamping members 206 so that second central axis 208 of each one of nuts 204 is coincident with third central axis 272 of corresponding one of protective clamping members 206. In one or more examples, with each one of nuts 204 and each corresponding one of protective clamping member 206 coupled together, O-ring 228 locates each one of nuts 204 relative to corresponding one of protective clamping members 206 so that second central axis 208 of each one of nuts 204 is parallel with third central axis 272 of corresponding one of protective clamping members 206.

Further, use of both external annular groove 226 and internal annular groove 230 with O-ring 228 also facilitates a snap-fit connection that provides a tactile verification that each one of nuts 204 and corresponding one of protective clamping members 206 are interlocked.

Referring generally to FIGS. 42A, 42B, and 42C and particularly to, e.g., FIGS. 12, 13, 15, and 16, according to method 2000, each one of protective clamping members 206 further comprises exterior surface 244, surrounding opening 240 of base 274. Each one of protective clamping members 206 also comprises annular surface 236, opposite base 274. According to method 2000, (block 2024) clamping first body 302 and second body 304 between flanges 136 of indexing pins 100 and protective clamping members 206 comprises (block 2054) abutting exterior surface 244 of base 274 of each one of protective clamping members 206 with a portion of second-body second surface 336, surrounding a corresponding one of second openings 308, and (block 2056) abutting annular surface 236 of each one of protective clamping members 206 with collar 220 of a corresponding one of nuts 204. The preceding subject matter of this paragraph characterizes example 59 of the present disclosure, wherein example 59 also includes the subject matter according to example 58 above.

Exterior surface 244 provides contact interface between each one of protective clamping members 206 and second body 304. Annular surface 236 provides contact surface between each one of protective clamping members 206 and corresponding one of nuts 204. Contact engagement between annular surface 236 of each one of protective clamping members 206 and collar 220 of corresponding one of nuts 204 limits linear movement of each one of nuts 204 along second central axis 208 relative to corresponding one of protective clamping members 206 while allowing each one of nuts 204 and corresponding one of protective clamping members 206 to rotate about second central axis 208 relative to each other.

In one or more examples, with each one of nuts 204 and corresponding one of protective clamping members 206 coupled together, at least portion of exterior surface 244 contacts portion of second-body second surface 336 when each one of nuts 204 is threadably coupled with threaded portion 126 of corresponding one of indexing pins 100 and pre-loaded against corresponding one of protective clamping members 206.

In one or more examples, annular surface 258 forms or otherwise defines at least portion of an end of cylindrical wall 276 of protective clamping member 206. In one or more examples, annular surface 258 is configured to reduce friction between annular surface 258 and portion of a surface of collar 220, in contact with annular surface 258, due to rotation of a corresponding one of nuts 204 relative to protective clamping member 206. In one or more examples, annular surface 258 is highly polished to reduce friction from contact between annular surface 258 and collar 220 rotating relative to each other. In one or more examples, annular surface 258 includes a friction-reducing coating to reduce friction from contact between annular surface 258 and collar 220 rotating relative to each other.

Referring generally to FIGS. 42A, 42B, and 42C and particularly to, e.g., FIGS. 12, 13, 15, and 16, according to method 2000, each one of protective clamping members 206 further comprises second O-ring 266, located on exterior surface 244 of base 274. According to method 2000, (block 2028) preventing rotation of protective clamping members 206 relative to second-body second surface 336 comprises (block 2058) frictionally engaging second O-ring 266 of each one of protective clamping members 206 with a portion of second-body second surface 336, surrounding the corresponding one of second openings 308, and with exterior surface 244 of base 274 of each of protective clamping members 206. The preceding subject matter of this paragraph characterizes example 60 of the present disclosure, wherein example 60 also includes the subject matter according to example 59 above.

Second O-ring 266 prevents rotation of each one of protective clamping member 206 relative to second body 304 when corresponding one of nuts 204 is removably coupled with corresponding one of indexing pins 100.

In one or more examples, with each one of nuts 204 and corresponding one of protective clamping members 206 coupled together, second O-ring 266 engages portion of second-body second surface 336 of second body 304, surrounding corresponding one of second openings 308, when each one of nuts 204 is threadably coupled with threaded portion 126 of corresponding one of indexing pins 100 and pre-loaded against corresponding one of protective clamping members 206. Engagement between second O-ring 266 and second-body second surface 336 provides sufficient frictional force to resist rotation of each one of protective clamping members 206 about second central axis 208 relative to second-body second surface 336 when each one of nuts 204 is rotated relative to corresponding one of protective clamping members 206.

Referring generally to FIGS. 42A, 42B, and 42C and particularly to, e.g., FIGS. 13, 16-18, and 20, according to method 2000, portions of second-body second surface 336, surrounding second openings 308, are planar. Exterior surface 244 of base 274 of each one of protective clamping members 206 is planar. According to method 2000, (block 2024) clamping first body 302 and second body 304 between flanges 136 of indexing pins 100 and protective clamping members 206 further comprises (block 2060) abutting exterior surface 244 of each one of protective clamping members 206 against portions of second-body second surface 336, surrounding the corresponding one of second openings 308. The preceding subject matter of this paragraph characterizes example 61 of the present disclosure, wherein example 61 also includes the subject matter according to example 59 or 60, above.

Method 2000 facilitates use of each one of protective clamping members 206 with second body 304 having portions of second-body second surface 336, surrounding second openings 308, that are planar.

Exterior surface 244 of base 274 being planar enables each one of protective clamping members 206 to make substantially flush contact with second-body second surface 336 of second body 304 when portion of second-body second surface 336 surrounding corresponding one of second openings 308 is planar.

In one or more examples, exterior surface 244 of base 274 being planar enables portion of each one of protective clamping members 206 to abut portion of second-body first surface 332, surrounding corresponding one of second openings 308, that is planar when each one of nuts 204 is threadably coupled with threaded portion 126 of corresponding one of indexing pins 100 and pre-loaded against corresponding one of protective clamping members 206.

Referring generally to FIGS. 42A, 42B, and 42C and particularly to, e.g., FIGS. 15, 19, and 29-31, according to method 2000, portions of second-body second surface 336, surrounding second openings 308, are second countersinks 322. Barrel 210 of each one of nuts 204 comprises frustoconical barrel portion 254. Interior recess 224 of each one of protective clamping members 206 comprises frustoconical recess portion 256. Exterior surface 244 of base 274 of each one of protective clamping members 206 is frustoconical. Frustoconical barrel portion 254 of each one of nuts 204 is located in frustoconical recess portion 256 of a corresponding one of protective clamping members 206 when nuts 204 are coupled to corresponding ones of protective clamping members 206. According to method 2000, (block 2024) clamping first body 302 and second body 304 between flanges 136 of indexing pins 100 and protective clamping members 206 further comprises (block 2062) abutting exterior surface 244 of each one of protective clamping members 206 against a corresponding one of second countersinks 322. The preceding subject matter of this paragraph characterizes example 62 of the present disclosure, wherein example 62 also includes the subject matter according to example 59 or 60 above.

Method 2000 facilitates use of each one of protective clamping members 206 with second body 304 having portions of second-body second surface 336, surrounding second openings 308, that include second countersinks 322.

For the purpose of the present disclosure, the term "complementary" describes geometric shapes that fit together with precision in a hand-and-glove arrangement, like a shank and a receiver or a tenon and a mortise.

Exterior surface 244 of base 274 being frustoconical enables each one of protective clamping members 206 to make substantially flush contact with second-body second surface 336 of second body 304 when portion of second-body second surface 336, surrounding corresponding one of second openings 308, includes second countersink 322. Exterior surface 244 of base 274 being frustoconical prevents each one of protective clamping members 206 from moving, in a direction, transverse to fifth central axis 340 of corresponding one of second openings 308, when each one of nuts 204 is threadably coupled with threaded portion 126 of corresponding one of indexing pins 100 and pre-loaded against corresponding one of protective clamping members 206.

Frustoconical recess portion 256 receives frustoconical barrel portion 254 to substantially center each one of nuts 204 relative to corresponding one of protective clamping members 206. As illustrated in FIGS. 29-31, in one or more examples, with each one of nuts 204 and corresponding one of protective clamping members 206 coupled together, frustoconical barrel portion 254 of barrel 210 of each one of nuts 204 is received by frustoconical recess portion 256 of interior recess 224 of corresponding one of protective clamping members 206. With each one of nuts 204 and corresponding one of protective clamping members 206 coupled together, complementary engagement between frustoconical barrel portion 254 of barrel 210 and frustoconical recess portion 256 of interior recess 224 locates second central axis 208 of each one of nuts 204 coincident with third central axis 272 of corresponding one of protective clamping members 206 when each one of nuts 204 is threadably coupled with threaded portion 126 of corresponding one of indexing pin 100 and pre-loaded against corresponding one of protective clamping members 206.

As illustrated in FIGS. 29-31, in one or more examples, portion of second-body first surface 332 surrounding corresponding one of second openings 308 includes second countersink 322. In one or more examples, exterior surface 244 of base 274 being frustoconical enables portion of protective clamping member 206 to abut and be received within second countersink 322 of corresponding one of second openings 308 when each one of nuts 204 is threadably coupled with threaded portion 126 of corresponding one of indexing pins 100 and pre-loaded against corresponding one of protective clamping members 206. With each one of nuts 204 and corresponding one of protective clamping members 206 coupled together, complementary engagement between exterior surface 244 of base 274 and countersink 320 locates third central axis 272 of protective clamping member 206 coincident with fourth central axis 338 of corresponding one of second openings 308 when each one of nuts 204 is threadably coupled with threaded portion 126 of corresponding one of indexing pins 100 and pre-loaded against corresponding one of protective clamping members 206.

As illustrated in FIGS. 17-20 and 29-31, according to the examples, disclosed herein, with each one of nuts 204 coupled to corresponding one of protective clamping members 206 and each one of nuts 204 threadably coupled with threaded portion 126 of corresponding one of indexing pins 100 and pre-loaded against corresponding one of protective clamping members 206, complementary engagement between exterior surface 244 of base 274 and countersink 320 locates third central axis 272 of each one of protective clamping members 206 and fifth central axis 340 of corresponding one of second openings 308 (i.e., centers each one of protective clamping members 206 relative to corresponding one of second openings 308). With each one of nuts 204 coupled to corresponding one of protective clamping members 206 and each one of nuts 204 threadably coupled with threaded portion 126 of corresponding one of indexing pins 100 and pre-loaded against corresponding one of protective clamping members 206, complementary engagement between frustoconical barrel portion 254 of barrel 210 and frustoconical recess portion 256 of interior recess 224 locates second central axis 208 of each one of nuts 204 and third central axis 272 of corresponding one of protect clamping members 206 coincident with each other (i.e., centers each one of nuts 204 relative to corresponding one of protective clamping members 206) and, thus, locates second central axis 208 of each one of nuts 204 and fifth central axis 340 of corresponding one of second openings 308 coincident with each other (i.e., centers each one of nuts 204 relative to corresponding one of protective clamping members 206).

As illustrated in FIGS. 17-20 and 29-31, in one or more examples, each one of indexing pins 100 includes flange 136 having frustoconical flange surface 162, barrel 210 of each one of nuts 204 includes frustoconical barrel portion 254, interior recess 224 of each one of protective clamping members 206 includes frustoconical recess portion 256, and exterior surface 244 of base 274 of each one of protective clamping members 206 is frustoconical. In such a configuration, with each one of nuts 204 coupled to corresponding one of protective clamping members 206 and each one of nuts 204 threadably coupled with threaded portion 126 of corresponding one of indexing pins 100 and pre-loaded against corresponding one of protective clamping members 206, central axis 154 of each one of indexing pins 100, fourth central axis 338 of corresponding one of first openings 306, second central axis 208 of corresponding one of nuts 204, third central axis 272 of corresponding one of protective clamping member 206, and fifth central axis 340 of corresponding one of second openings 30 are located coincident with each other. In other words, in such a configuration, fourth central axis 338 of one of first openings 306 and fifth central axis 340 of corresponding one of second openings 308 are urged into coaxial alignment with each other, when each one of indexing pins 100 is inserted through one of first openings 306 and corresponding one of second openings 308, each one of nuts 204 is coupled to corresponding one of protective clamping members 206, and each one of nuts 204 threadably coupled with threaded portion 126 of corresponding one of indexing pins 100 and pre-loaded against corresponding one of protective clamping members 206 to clamp first body 302 and second body 304 together between flange 136 of corresponding one of indexing pins 100 and corresponding one of protective clamping members 206.

Referring generally to FIGS. 42A, 42B, and 42C and particularly to, e.g., FIG. 20, according to method 2000, sealant 328 is located between first-body second surface 334 and second-body first surface 332. Upon contact between first-body second surface 334 and second-body first surface 332, quantities of sealant 328 are forced inside first openings 306. Each one of indexing pins 100 further comprises channel 172, formed in at least a portion of cylindrical surface 104 and extending helically about central axis 154. According to method 2000, (block 2012) inserting each one of indexing pins 100 into a corresponding one of first openings 306 comprises (block 2064) routing at least portions of quantities of sealant 328 along channel 172 of each one of indexing pins 100. The preceding subject matter of this paragraph characterizes example 63 of the present disclosure, wherein example 63 also includes the subject matter according to any one of examples 58 to 62 above.

Method 2000 facilitates collecting portions of quantities of sealant 328, located within corresponding one of first openings 306, when each one of indexing pins 100 is inserted in corresponding one of first openings 306 with first body 302 and second body 304 in contact with each other.

As illustrated in FIG. 20, in one or more examples, sealant 328 is applied to at least one of first-body second surface 334 and second-body first surface 332 and is located between first body 302 and second body 304. In one or more examples, sealant 328 is an adhesive, used to bond first body 302 and second body 304 together following alignment of structure 300. According the examples disclosed herein, quantities of sealant 328 are forced inside first openings 306 upon contact between first-body second surface 334 and second-body first surface 332.

In one or more examples, portions of quantities of sealant 328, located within corresponding one of first openings 306, are routed along channel 172 of each one of indexing pins 100 when each one of indexing pins 100 is inserted through corresponding one of first openings 306. Collecting excess portions of quantities of sealant 328 in channel 172 and/or routing portions of quantities of sealant 328 along cylindrical surface 104 within channel 172 prevents hydraulic locking between cylindrical surface 104 and corresponding one of first openings 306 when each one of indexing pins 100 is inserted through corresponding one of first openings 306.

Channel 172 enables portions of quantities of sealant 328, located within corresponding one of first openings 306 between cylindrical surface 104 of each one of indexing pins 100 and first wall 310 of corresponding one of first openings 306, to fill channel 172 and to be routed along channel 172 when each one of indexing pins 100 is inserted through corresponding one of first openings 306.

In one or more examples, channel 172 has any one of a variety of different helix angles. Similarly, channel 172 may have any one of a variety of different widths and/or depths. The helix angle, the width, and/or the depth of channel 172 may depend on various factors including, but not limited to, the material characteristics of sealant 328, the volume of sealant 328 applied between first body 302 and second body 304, the volume of quantities of sealant 328 forced into one of first openings 306 and/or corresponding one of second openings 308, and the like.

Generally, a portion of quantities of sealant 328, located within corresponding one of first openings 306, is routed along channel 172 in a direction opposite to a direction of insertion of indexing pin 100.

As illustrated in FIGS. 5A and 6A, in one or more examples, channel 172 terminates prior to tapered surface 112. Channel 172 being formed only in cylindrical surface 104, rather than also being formed in tapered surface 112, ensures that there are no sharp edges formed on tapered surface 112 that could potentially damage first wall 310 of corresponding one of first openings 306 when each one of indexing pins 100 is inserted in corresponding one of first openings 306.

As illustrated in FIGS. 5A-6B, in one or more examples, channel 172 includes channel first end 182 and channel second end 184, opposite channel first end 182. Channel second end 184 is proximate to flange 136. Extending channel 172 to flange 136 of corresponding one of indexing pins 100 lengthens channel 172 and provides an increased volume to receive portions of quantities of sealant 328 when each one of indexing pins 100 is inserted in corresponding one of first openings 306. Terminating channel second end 184 of channel 172 at flange 136 enables portions of quantities of sealant 328 to be routed along cylindrical surface 104 up to flange 136, for example, in the direction, opposite the direction of insertion of corresponding one of indexing pins 100, when each one of indexing pins 100 is inserted into one of first openings 306.

Referring generally to FIGS. 42A, 42B, and 42C and particularly to, e.g., FIG. 20, according to method 2000, upon contact between first-body second surface 334 and second-body first surface 332, second quantities of sealant 328 are forced inside second openings 308. According to method 2000, (block 2012) inserting each one of indexing pins 100 into a corresponding one of second openings 308 comprises (block 2066) routing at least portions of second quantities of sealant 328 along channel 172 of each one of indexing pins 100. The preceding subject matter of this paragraph characterizes example 64 of the present disclosure, wherein example 64 also includes the subject matter according to example 63 above.

Method 2000 facilitates collecting portions of second quantities of sealant 328, located within corresponding one of second openings 308, when each one of indexing pins 100 is inserted in corresponding one of second openings 308 with first body 302 and second body 304 in contact with each other.

According to the examples disclosed herein, second quantities of sealant 328 may be forced inside second openings 308 upon contact between first-body second surface 334 and second-body first surface 332.

In one or more examples, portions of second quantities of sealant 328, located within corresponding one of second openings 308, are routed along channel 172 of each one of indexing pins 100 when each one of indexing pins 100 is inserted through corresponding one of second openings 308. Collecting excess portions of second quantities of 328 in channel 172 and/or routing portions of second quantities of sealant 328 along cylindrical surface 104 within channel 172 prevents hydraulic locking between cylindrical surface 104 and corresponding one of second openings 308 when each one of indexing pins 100 is inserted through corresponding one of second openings 308.

Channel 172 enables portions of second quantities of sealant 328, located within corresponding one of second openings 308 between cylindrical surface 104 of each one of indexing pins 100 and second wall 312 of corresponding one of second openings 308, to fill channel 172 and to be routed along channel 172 when each one of indexing pins 100 is inserted through corresponding one of second openings 308.

Generally, portion of second quantities of sealant 328, located within corresponding one of second openings 308, is routed along channel 172 in a direction, opposite to a direction of insertion of indexing pin 100.

Channel 172 being formed only in cylindrical surface 104, rather than also being formed in tapered surface 112, ensures that there are no sharp edges formed on tapered surface 112 that could potentially damage second wall 312 of corresponding one of second openings 308 when each one of indexing pins 100 is inserted in corresponding one of second openings 308.

Extending channel 172 to flange 136 of corresponding one of indexing pins 100 lengthens channel 172 and provides an increased volume to receive portions of second quantities of sealant 328 when each one of indexing pins 100 is inserted in corresponding one of second openings 308. Terminating channel second end 184 of channel 172 at flange 136 enables portions of second quantities of sealant 328 to be routed along cylindrical surface 104 up to flange 136, for example, in the direction, opposite to the direction of insertion of corresponding one of indexing pins 100, when each one of indexing pins 100 is inserted into corresponding one of second openings 308.

Referring generally to FIGS. 42A, 42B, and 42C and particularly to, e.g., FIGS. 5B, 6B, and 20, according to method 2000, channel 172 is formed in at least a portion of tapered surface 112. According to method 2000, (block 2066) routing at least portions of second quantities of sealant 328 along channel 172 of each one of indexing pins 100 comprises (block 2068) routing at least portions of second quantities of sealant 328 along channel 172 of each one of indexing pins 100 from tapered surface 112 to cylindrical surface 104 of each one of indexing pins 100. The preceding subject matter of this paragraph characterizes example 65 of the present disclosure, wherein example 65 also includes the subject matter according to example 64 above.

Method 2000 facilitates routing portions of second quantities of sealant 328, located within corresponding one of second openings 308, along channel 172 when each one of indexing pins 100 is inserted in corresponding one of second openings 308 with first body 302 and second body 304 in contact with each other.

Collecting excess portions of second quantities of sealant 328 in channel 172 and/or routing portions of second quantities of sealant 328 along tapered surface 112 within channel 172 prevents hydraulic locking between tapered surface 112 and corresponding one of second openings 308. In one or more examples, portions of second quantities of sealant 328 located within located within corresponding one of second openings 308 between tapered surface 112 of each one of indexing pins 100 and second wall 312, fills channel 172 and is routed along channel 172 when each one of indexing pins 100 is inserted into corresponding one of second openings 308.

Channel 172 also enables portions of quantities of sealant 328, located within corresponding one of first openings 306 and/or portions of second quantities of sealant 328, located within corresponding one of second openings 308, to be routed from tapered surface 112 to cylindrical surface 104 or to be routed from cylindrical surface 104 to tapered surface 112. In one or more examples, channel 172 being formed in both cylindrical surface 104 and tapered surface 112 provides a flow path for portions of quantities of sealant 328 and/or portions of second quantities of sealant 328 to exit corresponding one of second openings 308, at second-body second surface 336, when each one of indexing pins 100 is fully inserted in corresponding one of second openings 308.

As illustrated in FIGS. 5B and 6B, in one or more examples, channel first end 182 is proximate to threaded portion 126. Terminating channel first end 182 of channel 172 proximate (e.g., at or near) threaded portion 126 provides a flow path for portions of quantities of sealant 328, located within corresponding one of first openings 306, and/or portions of second quantities of sealant 328, located within corresponding one of second openings 308, to flow out of channel 172 from channel first end 182 of corresponding one of indexing pins 100 and exit corresponding one of second openings 308 at second-body second surface 336 when each one of indexing pins 100 is fully inserted in corresponding one of second openings 308.

Referring generally to FIGS. 42A, 42B, and 42C and particularly to, e.g., FIG. 20, according to method 2000, (block 2024) clamping first body 302 and second body 304 between flanges 136 of indexing pins 100 and protective clamping members 206 comprises (block 2070) routing third quantities of sealant 328, additionally forced inside first openings 306 and second openings 308, along channel 172 of each one of indexing pins 100. The preceding subject matter of this paragraph characterizes example 66 of the present disclosure, wherein example 66 also includes the subject matter according to example 65 above.

Method 2000 facilitates collecting portions of third quantities of sealant 328, located within corresponding one of first openings 306 and corresponding one of second openings 308, when each one of indexing pins 100 is inserted in corresponding one of first openings 306 and corresponding one of second openings 308 with first body 302 and second body 304 in contact with each other.

According the examples disclosed herein, third quantities of sealant 328 are forced inside first openings 306 when first body 302 and second body 304 are clamped together.

In one or more examples, portions of third quantities of sealant 328, located within corresponding one of first openings 306 and corresponding one of second openings 308, are routed along channel 172 of each one of indexing pins 100 when first body 302 and second body 304 are clamped between flange 136 of each one of indexing pins 100 and corresponding one of protective clamping members 206. Collecting excess portions of third quantities of sealant 328 in channel 172 and/or routing portions of third quantities of sealant 328 along cylindrical surface 104 within channel 172 prevents hydraulic locking between cylindrical surface 104 and corresponding one of first openings 306 and/or between cylindrical surface 104 and corresponding one of second openings 308 when first body 302 and second body 304 are clamped between flange 136 of each one of indexing pins 100 and corresponding one of protective clamping members 206.

Channel 172 enables portions of third quantities of sealant 328, located within corresponding one of first openings 306 between cylindrical surface 104 of each one of indexing pins 100 and first wall 310 of corresponding one of first openings 306 and/or within corresponding one of second openings 308 between cylindrical surface 104 of each one of indexing pins 100 and second wall 312 of corresponding one of second openings 308, to fill channel 172 and to be routed along channel 172 when first body 302 and second body 304 are clamped between flange 136 of each one of indexing pins 100 and corresponding one of protective clamping members 206.

Referring generally to FIGS. 42A, 42B, and 42C and particularly to, e.g., FIGS. 6A, 6B, and 20, according to method 2000, each one of indexing pins 100 further comprises annular recess 174, located between cylindrical surface 104 and flange 136. Channel 172 and annular recess 174 of each one of indexing pins 100 intersect each other.

Method 2000 further comprises (block 2072) directing at least portions of at least one of quantities of sealant 328 or second quantities of sealant 328 from channel 172 of each one of indexing pins 100 into annular recess 174 of each one of indexing pins 100. The preceding subject matter of this paragraph characterizes example 67 of the present disclosure, wherein example 67 also includes the subject matter according to example 66 above.

Annular recess 174 provides an increased volume to receive portions of quantities of sealant 328 and/or portions of second quantities of sealant 328 when each one of indexing pins 100 is inserted in corresponding one of first openings 306 and corresponding one of second openings 308 and first body 302 and second body 304 are clamped together between flange 136 of each one of indexing pins 100 and corresponding one of protective clamping members 206.

For the purpose of the present disclosure, the term "intersects," in reference to the channel second end 184 intersecting annular recess 174, refers to a junction, common to both channel 172 and annular recess 174.

In one or more examples, terminating channel first end 182 of channel 172 at annular recess 174 enables excess portions of quantities of sealant 328, located within corresponding one of first openings 306, and/or excess portions of second quantities of sealant 328 located within corresponding one of second openings 308, to be routed out from channel second end 184 and to collect within annular recess 174 of corresponding one of indexing pins 100 when each one of nuts 204 is threadably coupled with threaded portion 126 of corresponding one of indexing pins 100 to clamp first body 302 and second body 304 together between flange 136 of each one of indexing pins 100 and corresponding one of protective clamping members 206.

Referring generally to FIGS. 42A, 42B, and 42C and particularly to, e.g., FIG. 20, method 2000 further comprises (block 2074) directing at least portions of third quantities of sealant 328 from channel 172 of each one of indexing pins 100 into annular recess 174 of each one of indexing pins 100. The preceding subject matter of this paragraph characterizes example 68 of the present disclosure, wherein example 68 also includes the subject matter according to example 67 above.

Annular recess 174 provides an increased volume to receive portions of third quantities of sealant 328 when each one of indexing pins 100 is inserted in corresponding one of first openings 306 and corresponding one of second openings 308 and first body 302 and second body 304 are clamped together between flange 136 of each one of indexing pins 100 and corresponding one of protective clamping members 206.

In one or more examples, terminating channel first end 182 of channel 172 at annular recess 174 enables excess portions of third quantities of sealant 328, located within corresponding one of first openings 306 and/or corresponding one of second openings 308, to be routed out from channel second end 184 and to collect within annular recess 174 of corresponding one of indexing pins 100 when each one of nuts 204 is threadably coupled with threaded portion 126 of corresponding one of indexing pins 100 to clamp first body 302 and second body 304 together between flange 136 of each one of indexing pins 100 and corresponding one of protective clamping members 206.

Referring generally to FIGS. 42A, 42B, and 42C and particularly to, e.g., FIG. 20, method 2000 further comprises (block 2076) directing at least portions of third quantities of sealant 328 from channel 172 of each one of indexing pins 100 into captive volume 238, formed between each one of nuts 204 and a corresponding one of protective clamping members 206. The preceding subject matter of this paragraph characterizes example 69 of the present disclosure, wherein example 69 also includes the subject matter according to any one of examples 66 to 68, above.

Method 2000 facilitates routing portions of third quantities of sealant 328, located within a corresponding one of first openings 306 and/or a corresponding one of second openings 308, along channel 172 and receiving excess portions of third quantities of sealant 328, routed along channel 172, within captive volume 238.

As illustrated in FIG. 20, in one or more examples, captive volume 238 is defined by portion of interior recess 224 formed by base 274, portion of cylindrical wall 276, and an end of barrel 210. In one or more examples, portion of third quantities of sealant 328 exits portion of channel 172 formed in tapered surface 112, for example, from channel first end 182, and fills captive volume 238, when each one of indexing pins 100 is fully inserted in corresponding one of second openings 308 and first body 302 and second body 304 are clamped together between flange 136 of each one of indexing pins 100 and corresponding one of protective clamping members 206.

Examples of the present disclosure may be described in the context of aircraft manufacturing and service method 1100 as shown in FIG. 43 and aircraft 1102 as shown in FIG. 44. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 44, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An indexing pin, comprising:
    a central axis;
    a threaded portion, extending along the central axis and having a major diameter;
    a stem, extending along the central axis opposite the threaded portion;
    a cylindrical surface, extending along the central axis between the threaded portion and the stem and having a diameter that is greater than the major diameter of the threaded portion;
    a tapered surface, having a frustoconical shape and extending between the threaded portion and the cylindrical surface, wherein a largest diameter of the tapered surface is equal to the diameter of the cylindrical surface and a smallest diameter of the tapered surface is greater than the major diameter of the threaded portion; and
    a flange, located between the stem and the cylindrical surface,
    wherein the cylindrical surface, the tapered surface, and the threaded portion form a unitary structure.

2. The indexing pin according to claim 1, wherein the stem comprises first means for providing complementary engagement with a first tool.

3. The indexing pin according to claim 1, wherein the stem comprises second means for providing complementary engagement with a second tool.

4. The indexing pin according to claim 1, wherein the stem comprises third means for providing complementary engagement with a third tool.

5. The indexing pin according to claim 1, wherein the tapered surface has a taper angle that is between two degrees and ten degrees, inclusively, relative to the central axis.

6. The indexing pin according to claim 1, wherein the tapered surface extends from the cylindrical surface to the threaded portion.

7. The indexing pin according to claim 1, further comprising a corner surface, extending from the tapered surface to the threaded portion, wherein the corner surface is annular and has a curvilinear cross-section in a plane, containing the central axis.

8. The indexing pin according to claim 1, wherein the flange comprises:
    a frustoconical flange surface, located between the stem and the cylindrical surface; and
    a planar flange surface, extending from the frustoconical flange surface to the cylindrical surface, perpendicular to the central axis.

9. The indexing pin according to claim 8, wherein a smallest diameter of the frustoconical flange surface is greater than the diameter of the cylindrical surface.

10. The indexing pin according to claim 9, wherein:
    the stem has a stem dimension, measured perpendicularly to the central axis; and
    the stem dimension is equal to a largest diameter of the frustoconical flange surface.

11. The indexing pin according to claim 1, wherein the threaded portion comprises fourth means for providing complementary engagement with a fourth tool.

12. The indexing pin according to claim 1, further comprising a channel, formed in at least a portion of the cylindrical surface and extending helically about the central axis.

13. The indexing pin according to claim 12, wherein:
    the channel comprises a channel first end and a channel second end, opposite the channel first end; and
    the channel second end is proximate to the flange.

14. The indexing pin according to claim 13, wherein the channel is formed in at least a portion of the tapered surface.

15. The indexing pin according to claim 13, wherein the channel first end is proximate to the threaded portion.

16. The indexing pin according to claim 13, further comprising an annular recess, located between the cylindrical surface and the flange, and wherein the channel second end intersects the annular recess.

17. An indexing clamp, comprising:
    an indexing pin, comprising:
        a central axis;
        a threaded portion, extending along the central axis;
        a stem, extending along the central axis;
        a cylindrical surface, extending along the central axis between the threaded portion and the stem;
        a tapered surface, extending between the threaded portion and the cylindrical surface; and
        a flange, located between the stem and the cylindrical surface;
    a nut, having a second central axis and configured to be threadably coupled with the threaded portion of the indexing pin; and
    a protective clamping member, configured to be coupled to the nut and configured be located between the nut and the flange,
    wherein:

the second central axis of the nut is coincident with the central axis of the indexing pin when the nut is threadably coupled with the threaded portion of the indexing pin; and the nut and the protective clamping member are rotatable relative to each other when the protective clamping member is coupled to the nut.

18. The indexing clamp according to claim 17, wherein, when the protective clamping member is coupled to the nut, the nut is bi-directionally rotatable relative to the protective clamping member about the second central axis without moving relative to the protective clamping member along the second central axis.

19. An indexing pin, comprising:
a central axis;
a threaded portion, extending along the central axis;
a stem, extending along the central axis opposite the threaded portion;
a cylindrical surface, extending along the central axis between the threaded portion and the stem;
a tapered surface, extending between the threaded portion and the cylindrical surface;
a flange, located between the stem and the cylindrical surface; and
a channel, formed in at least a portion of the cylindrical surface and extending helically about the central axis.

20. The indexing pin according to claim 19, further comprising an annular recess, located between the cylindrical surface and the flange.

\* \* \* \* \*